United States Patent
Ferla et al.

(10) Patent No.: US 12,333,953 B2
(45) Date of Patent: Jun. 17, 2025

(54) END-TO-END UNMANNED CONTROL SYSTEM OF AIRCRAFT NAVIGATION AND SURVEILLANCE SYSTEMS

(71) Applicant: Thales USA, Inc., Arlington, VA (US)

(72) Inventors: Massimiliano Ferla, Credera (IT); David Carsenat, Brive-la-gaillarde (FR); Andrea Cucurachi, Gorgonzola (IT); Nathan Deloffre, Cholet (FR); Kevin L. McGahee, Shawnee, KS (US); Christopher Giacoponello, Pottstown, PA (US); Scott Hauswald, Overland Park, KS (US); William Hubert, Cholet (FR); Paolo Lunardi, Varedo (IT); Holger Neufeldt, Vaihingen (DE); Michel Procoudine-Gorsky, Rungis (FR); Edwin Schackmann, Hemmingen (DE); Marcello Sordelli, Guanzate (IT); André Schüttpelz, Bad Liebenzell (DE); Andrija Velimirovic, Korntal (DE); Stephen Rowson, Parkville, MO (US); Mark Cagle, Kansas City, MO (US); Matthew Timothy McNally, Edgerton, KS (US); Joseph Eugene Parsons, Shawnee, KS (US); Brendon Conroy, Arlington, VA (US); Anthony James Albanese, Hutchinson IS, FL (US)

(73) Assignee: Thales USA, Inc., Arlington, VA (US)

( * ) Notice: Subject to any disclaimer, the term of this patent is extended or adjusted under 35 U.S.C. 154(b) by 393 days.

(21) Appl. No.: 17/776,626

(22) PCT Filed: Jun. 11, 2020

(86) PCT No.: PCT/US2020/037203
§ 371 (c)(1),
(2) Date: May 13, 2022

(87) PCT Pub. No.: WO2021/096565
PCT Pub. Date: May 20, 2021

(65) Prior Publication Data
US 2022/0406203 A1  Dec. 22, 2022

Related U.S. Application Data

(60) Provisional application No. 62/936,065, filed on Nov. 15, 2019.

(51) Int. Cl.
G08G 5/00 (2025.01)
G08G 5/26 (2025.01)
(Continued)

(52) U.S. Cl.
CPC ............. G08G 5/54 (2025.01); G08G 5/26 (2025.01); G08G 5/55 (2025.01); G08G 5/57 (2025.01); G08G 5/59 (2025.01)

(58) Field of Classification Search
None
See application file for complete search history.

(56) References Cited

U.S. PATENT DOCUMENTS

2009/0109085 A1* 4/2009 Needham ............ G01S 13/762
                                                                342/174
2011/0264307 A1* 10/2011 Guyette ................ G01S 19/54
                                                                  701/3

(Continued)

FOREIGN PATENT DOCUMENTS

CN       101093617 A    12/2007
CN       107272028 A    10/2017
(Continued)

OTHER PUBLICATIONS

Machine Translation of WO2018230815 (Year: 2018).*

(Continued)

*Primary Examiner* — James M McPherson
(74) *Attorney, Agent, or Firm* — Sage Patent Group

(57) ABSTRACT

A control system in communication with one of an aircraft navigational aid system and an aircraft surveillance system is described. The control system obtains measurement data associated with radio frequency (RF) signals transmitted by (Continued)

the one of the aircraft navigational aid system and the aircraft surveillance system from an unmanned aerial vehicle (UAV) reporting the measurement data. The control system also determines whether the measurement data indicates the RF signals are within a range of values based on a location of the UAV in an airspace proximate to the one of the aircraft navigational aid system and the aircraft surveillance system. The control system further controls the RF signals transmitted by the one of the aircraft navigational aid system and the aircraft surveillance system based on the measurement data and the location of the UAV. Methods performed by the control system are also described.

38 Claims, 57 Drawing Sheets

(51) Int. Cl.
| | | |
|---|---|---|
| *G08G 5/54* | (2025.01) | |
| *G08G 5/55* | (2025.01) | |
| *G08G 5/57* | (2025.01) | |
| *G08G 5/59* | (2025.01) | |

(56) References Cited

U.S. PATENT DOCUMENTS

| | | | |
|---|---|---|---|
| 2015/0292887 A1* | 10/2015 | Haglund | G05D 1/08 |
| | | | 701/523 |
| 2016/0035225 A1* | 2/2016 | Berckefeldt | G08G 5/0021 |
| | | | 342/32 |
| 2017/0092137 A1 | 3/2017 | Hiebl | |
| 2017/0293034 A1 | 10/2017 | Otsubo et al. | |
| 2018/0061251 A1 | 3/2018 | Venkatraman et al. | |
| 2018/0061252 A1* | 3/2018 | Feng | G01S 13/878 |
| 2018/0362158 A1* | 12/2018 | Zhang | G05D 1/0088 |
| 2019/0113593 A1 | 4/2019 | Bazile et al. | |

FOREIGN PATENT DOCUMENTS

| | | |
|---|---|---|
| CN | 107478244 A | 12/2017 |
| CN | 109642796 A | 4/2019 |
| CN | 109671303 A | 4/2019 |
| EP | 2980775 A1 | 2/2016 |
| RU | 2608183 C1 | 1/2017 |
| RU | 2621827 C2 | 6/2017 |
| RU | 2769017 C2 | 3/2022 |
| WO | 2014169354 A1 | 10/2014 |
| WO | 2018230815 A1 | 12/2018 |
| WO | 2018230816 A1 | 12/2018 |

OTHER PUBLICATIONS

European Search Report for European Patent Application No. 20888616.8 dated Dec. 22, 2023, 8 pages.
Office Action for Chinese Patent Application No. 202080092208.4 dated Apr. 26, 2024, 12 pages.
International Search Report and Written Opinion mailed Mar. 2, 2021 for International Patent Application No. PCT/US2020/037203, 22 pages.
Office Action mailed Jan. 24, 2023 for Russian Patent Application No. 2022112476/11, 5 pages.

\* cited by examiner

END-TO-END UNMANNED CONTROL SYSTEM OF AIRCRAFT NAVIGATION AND SURVEILLANCE SYSTEMS

CROSS-REFERENCE TO RELATED APPLICATIONS

The present application is a 35 U.S.C § 371 national stage application for International Application No. PCT/US2020/037203, entitled "END-TO-END UNMANNED CONTROL SYSTEM OF AIRCRAFT NAVIGATION AND SURVEILLANCE SYSTEMS", filed on Jun. 11, 2020, which claims the benefit of and priority to U.S. Provisional Patent Application No. 62/936,065, filed Nov. 15, 2019, entitled "PORTABLE INSTRUMENT LANDING SYSTEM (PILS)," the disclosures of which are hereby incorporated herein by reference in their entireties.

TECHNICAL FIELD OF THE INVENTION

The presently disclosed subject matter relates generally to navigation aid systems and aircraft surveillance system including instrument landing systems (ILS) and more particularly to portable instrument landing systems (PILS). The present disclosed subject matter also relates generally to the control of RF signals transmitted by aircraft navigational aid systems and aircraft surveillance systems.

BACKGROUND

Deployable ILS (D-ILS) systems include a traditional ILS that can be mobilized, deployed and flight checked within 5-7 days. This solution is ideal for setting up aircraft runways for disaster recovery and temporary military basing. Now in production, these systems are providing militaries a viable aircraft precision approach solution for military aircraft utilizing traditional ILS systems.

In the meantime, the mission has evolved and the requirements for tactical systems now demand a much smaller footprint for transport, and highly agile deployment capabilities. Some solutions include new avionics, which is undesirable as some existing aircraft cannot communicate with these systems. Other solutions include a Transponder Landing Systems (TLS). While a TLS solution theoretically promises a smaller footprint relative to traditional D-ILS, it has serious operational restrictions and risks similar to a Precision Approach Radar (PAR). TLS requires active communications from the aircraft with Air Traffic Control. In a hostile environment, this means that the aircraft must broadcast radio frequencies. Even if using Mode-5 transponders, this potentially places a stealthy aircraft at risk of localization through passive detection. TLS also limits the number of aircraft on approach at any one time. Lastly, it requires that pilots be trained and certified for this non-traditional approach—which, like PAR, results in significant cost implications over time.

When a navigational aid is installed or modified, it must be calibrated using airborne equipment. Traditionally, this requires a pilot/crew in an airplane, as well as a technician on the ground. The pilot/air crew uses a communication radio to communicate required changes to signal in space to the ground technician, who then manually changes the system parameters to effect the change. Flight checks are difficult to schedule, time-consuming, expensive, and dangerous to perform in hostile environments, such as military applications. The human technician on the ground making system changes may require some patterns to be flown several times to verify changes, extending flying time. The human's adjustments may be incorrect, which may extend flight check time even longer. Thus, existing manual-tuning processes are cumbersome, potentially error-prone, and dangerous to execute in hostile environments.

SUMMARY OF THE INVENTION

According to embodiments of the inventive concepts of the present disclosure, a portable instrument landing system (PILS) is described. The PILS includes a plurality of antenna radio units, each antenna radio unit configured to set transmission parameters for an antenna element. The PILS also includes a glideslope comprising a glideslope non-imaging antenna array of antenna elements, each antenna element of the glideslope non-imaging antenna array being directly coupled to a respective antenna radio unit of the plurality of antenna radio units. The glideslope is configured to communicate, to the respective antenna radio units directly coupled to each antenna element of the glideslope non-imaging antenna array, transmission parameters for RF signals to be generated by the respective antenna radio units directly coupled to each antenna element of the glideslope non-imaging antenna array. The PILS also includes a localizer comprising a localizer antenna array of antenna elements, each antenna element of the localizer antenna array being directly coupled to a respective antenna radio unit of the plurality of antenna radio units. The localizer is configured to communicate, to the respective antenna radio units directly coupled to each antenna element of the localizer antenna array, transmission parameters for RF signals to be generated by the respective antenna radio units directly coupled to each antenna element of the glideslope non-imaging antenna array. The PILS also includes a control system configured to configured to communicate, to one of the localizer and the glideslope, data to be used by one of the localizer and the glideslope to generate the transmission parameters for RF signals to be generated by the plurality of antenna radio units.

According to embodiments, an antenna radio unit of a portable instrument landing system (PILS) is also described. The antenna radio unit comprises transmission circuitry that is configured to receive a communication comprising transmission parameters for a radio frequency (RF) signal to be transmitted using an antenna element directly coupled to the antenna radio unit. The transmission circuitry is also configured to generate the RF signal using the transmission parameters. The transmission circuitry is further configured to transmit the RF signal using the antenna element directly coupled to the antenna radio unit.

According to embodiments, a glideslope of a portable landing system (PILS) is also described. The glideslope comprises a non-imaging antenna array, each antenna element of the non-imaging antenna array directly coupled to a respective antenna radio unit of a plurality of antenna radio units of the PILS. The glideslope also comprises processing circuitry coupled to each respective antenna radio unit directly coupled to a respective antenna element of the non-imaging antenna array. The processing circuitry is configured to receive, from a control system of the PILS, data to be used to generate transmission parameters for radio frequency (RF) signals to be generated by the plurality of antenna radio units. The processing circuitry is also configured to generate transmission parameters for radio frequency (RF) signals to be transmitted by the antenna elements of the non-imaging antenna array based on the received data. The processing circuitry is further configured to communicate the transmission parameters to the antenna radio units to generate the RF signals for transmission from the antenna elements of the non-imaging antenna array.

According to embodiments, a localizer of a portable landing system (PILS) is also described. The localizer comprises an antenna array, each antenna element of the antenna array directly coupled to a respective antenna radio unit of the plurality of antenna radio units of the PILS. The localizer also comprises processing circuitry coupled to each respective antenna radio unit directly coupled to a respective antenna element of the antenna array. The processing circuitry is configured to receive, from a control system of the PILS, data to be used to generate transmission parameters for radio frequency (RF) signals to be generated by each respective radio unit of the PILS. The processing circuitry is also configured to generate transmission parameters for radio frequency (RF) signals to be transmitted by the antenna elements of the antenna array based on the received data. The processing circuitry is further configured to communicate the transmission parameters to the respective antenna radio units to generate the RF signals for transmission from the antenna elements of the antenna array.

According to embodiments, a method performed by an antenna radio unit of a portable instrument landing system (PILS) is described. The method includes receiving a communication comprising transmission parameters for a radio frequency (RF) signal to be transmitted using an antenna element directly coupled to the antenna radio unit. The method also includes generating a radio frequency (RF) signal using the transmission parameters. The method further includes transmitting the RF signal using the antenna element directly coupled to the antenna radio unit.

According to embodiments, a method performed by a glideslope of a portable landing system (PILS) is described. The glideslope comprises a non-imaging antenna array, each antenna element of the non-imaging antenna array directly coupled to a respective antenna radio unit of a plurality of antenna radio units of the PILS. The method includes receiving, from a control system of the PILS, data to be used to generate transmission parameters for radio frequency (RF) signals to be generated by each respective radio unit of the PILS. The method also includes generating transmission parameters for radio frequency (RF) signals to be transmitted by the antenna elements of the non-imaging antenna array based on the received data. The method further includes communicating the transmission parameters to the respective antenna radio units to generate the RF signals for transmission from the antenna elements of the non-imaging antenna array.

According to embodiments, a method performed by a localizer of a portable landing system (PILS) is described. The localizer comprising an antenna array, each antenna element of the antenna array directly coupled to a respective antenna radio unit of a plurality of antenna radio units of the PILS. The method includes receiving, from a control system of the PILS, data to be used to generate transmission parameters for radio frequency (RF) signals to be generated by a plurality of antenna radio units of the PILS. The method also includes generating transmission parameters for radio frequency (RF) signals to be transmitted by the antenna elements of the antenna array based on the received data. The method also includes communicating the transmission parameters to the respective antenna radio units to generate the RF signals for transmission from the antenna elements of the non-imaging antenna array.

According to some other embodiments, a control system of a portable landing system (PILS) is also described. The control system comprises transceiver configured to communicate with an unmanned aircraft system (UAS). The control system also comprises a processor and a memory, the memory comprising executable instructions that when executed by the processor causes the processor to operate to receive, from the UAS using the transceiver, measurement data associated with first radio frequency (RF) signals transmitted by one of a localizer and a glideslope of the PILS. The memory also comprises executable instructions that when executed by the processor causes the processor to operate to generate data to be used by one of the localizer and the glideslope to generate transmission parameters to be used by antenna radio units of the PILS directly coupled to the respective antenna elements of one of a localizer antenna array and a glideslope non-imaging antenna array to generate second RF signals to be transmitted by the antenna elements of the one of the localizer antenna array and the glideslope non-imaging antenna array. The memory further comprises executable instructions that when executed by the processor causes the processor to operate to communicate, to one of the localizer and the glideslope, the data to be used by one of the localizer and the glideslope to generate the transmission parameters.

According to some other embodiments, a method performed by a control system of a portable landing system (PILS) is described. The method includes receiving, from an unmanned aircraft system (UAS) using a transceiver of the control system, measurement data associated with first radio frequency (RF) signals transmitted by one of a localizer and a glideslope of the PILS. The method also includes generating data to be used by one of the localizer and the glideslope to generate transmission parameters to be used by antenna radio units of the PILS directly coupled to the respective antenna elements of one of a localizer antenna array and a glideslope non-imaging antenna array to generate second RF signals to be transmitted by the antenna elements of the one of the localizer antenna array and the glideslope non-imaging antenna array. The method further includes communicating, to one of the localizer and the glideslope, the data to be used by one of the localizer and the glideslope to generate the transmission parameters.

As described herein, the Portable ILS (PILS) solution includes a lightweight, low power Localizer using a Software Defined Radio (SDR) transceiver. SDR's provide the dynamic flexibility in a small package to allow the performance of traditional antenna arrays to be realized through a distributed architecture allowing tuning control of individual antenna elements.

The PILS also utilizes an adaptive beam-forming network of ground-placed antennas to provide a conventional ILS glide-slope. The glide-slope electronics will incorporate the identical, field proven transceiver building blocks utilized for the Localizer. By eliminating the traditional glide-slope mast and the complexities associated with set-up, adjustment, and calibration—as well as the restrictions on airfield topography—we are able to introduce a system that is much faster to deploy, much smaller to transport and suitable for use in the most challenging airfield terrain conditions.

The entire solution will be deployable in less than 2 hours, with 2 personnel. As part of the design experiment, Thales will design a mechanical packaging of these field proven technologies and demonstrate that the solution is capable of being stored on a single 463L pallet position. In order to support the 2 hour set-up time, Thales will leverage research and development already underway on using drones to calibrate ILS signal-in-space prior to flight-check. For the PILS or Small Footprint Precision Approach Landing Capability (SF-PALC) application, a drone localization solution for GPS denied environments needs to be developed and tested. Finally, the use of the calibration drone will be extended to real-time tuning and calibrating of the ILS signal-in-space. Given a fully digital, adaptive design, real-time feedback from the drone at several down-range locations and altitudes will enable rapid tuning of the Localizer and Glide-slope signals-in-space to eliminate site specific reflections and deployment.

According to some embodiments, a method performed by a control system in communication with one of an aircraft navigational aid system and an aircraft surveillance system is described. The method includes obtaining measurement data associated with radio frequency (RF) signals transmitted by the one of the aircraft navigational aid system and the aircraft surveillance system from an unmanned aerial vehicle (UAV) reporting the measurement data. The method also includes determining whether the measurement data indicates the RF signals are within a range of values based on a location of the UAV in an airspace proximate to the one of the aircraft navigational aid system and the aircraft surveillance system. The method further includes controlling the RF signals transmitted by the one of the aircraft navigational aid system and the aircraft surveillance system based on the measurement data and the location of the UAV.

According to some embodiments, a control system in communication with one of an aircraft navigational aid system and an aircraft surveillance system is described. The control system comprises a processor and a memory comprising executable instructions that when executed by the processor causes the processor to perform operations comprising obtaining measurement data associated with radio frequency (RF) signals transmitted by the one of the aircraft navigational aid system and the aircraft surveillance system from an unmanned aerial vehicle (UAV) reporting the measurement data. The memory also comprises executable instructions that when executed by the processor causes the processor to perform operations comprising determining whether the measurement data indicates the RF signals are within a range of values based on a location of the UAV in an airspace proximate to the one of the aircraft navigational aid system and the aircraft surveillance system. The memory further comprises executable instructions that when executed by the processor causes the processor to perform operations comprising controlling the RF signals transmitted by the one of the aircraft navigational aid system and the aircraft surveillance system based on the measurement data and the location of the UAV.

According to some embodiments, a computer program product comprised on non-transitory computer readable medium is described. The computer program product includes executable instructions that when executed by a processor of a control system in communication with one of an aircraft navigational aid system and an aircraft surveillance system, causes the control system to perform operations of the various methods described herein.

Other objects, features and advantages of the present invention will become apparent from the following detailed description. It should be understood, however, that the detailed description and specific examples, while indicating preferred embodiments of the invention, are given by way of illustration only, since various changes and modifications within the scope and spirit of the invention will become apparent to one skilled in the art from this detailed description.

BRIEF DESCRIPTION OF THE DRAWINGS

The accompanying drawings, which are incorporated into and constitute a part of this specification, illustrate one or more example aspects of the invention and, together with the detailed description, serve to explain their principles and implementations.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

Figure 1:
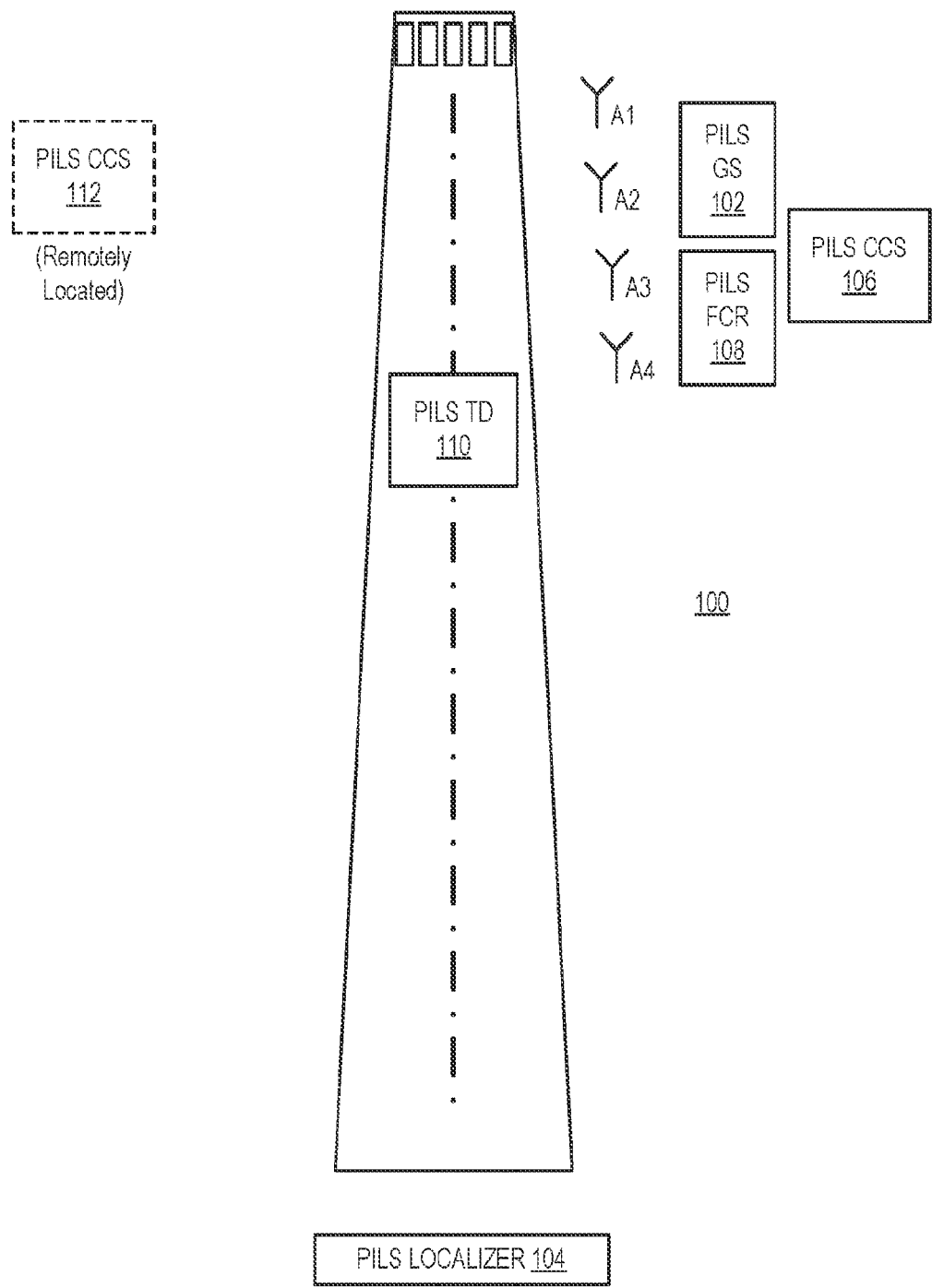
FIG. 1 is a block diagram illustrating an example portable instrument landing system (PILS) in accordance with embodiments of the present disclosure.

According to embodiments of the inventive concepts of the present disclosure, a portable instrument landing system (PILS) is described. The PILS includes a plurality of antenna radio units, each antenna radio unit configured to generate a radio frequency (RF) signal for transmission by an antenna element directly coupled to the antenna radio unit. The PILS also includes a glideslope comprising a glideslope non-imaging antenna array of antenna elements, each antenna element of the glideslope non-imaging antenna array being directly coupled to a respective antenna radio unit of the plurality of antenna radio units. For example, FIG. 1 illustrates an example PILS 100 that includes a plurality of antenna radio units (not shown), each antenna radio unit configured to set transmission parameters for an antenna element. Example implementations of the antenna radio units (ARUs) are described herein below. FIG. 1 also illustrates an example PILS glideslope (GS) 102 comprising a glideslope non-imaging antenna array of antenna elements A1-A4. Each antenna element A1-A4 of FIG. 1 is directly coupled to a respective antenna radio unit (not shown) of a plurality of antenna radio units of PILS 100.

The glideslope of the PILS is configured to communicate, to the respective antenna radio units directly coupled to each antenna element of the glideslope non-imaging antenna array, transmission parameters for RF signals to be generated by the respective antenna radio units directly coupled to each antenna element of the glideslope non-imaging antenna array according to embodiments. For example, GS 102 may be configured to communicate, to the respective antenna radio units directly coupled to antenna elements A1-A4, transmission parameters for RF signals to be generated by the respective antenna radio units directly coupled to antenna elements A1-A4.

According to embodiments, the PILS also includes a localizer comprising a localizer antenna array of antenna elements, each antenna element of the localizer antenna array being directly coupled to a respective antenna radio unit of the plurality of antenna radio units. FIG. 1 illustrates an example PILS localizer 104 comprising a localizer antenna array (not shown) of antenna elements, each antenna element of the localizer antenna array being directly coupled to a respective antenna radio unit (not shown) of the plurality of antenna radio units of PILS 100. Example implementations of the localizer antenna array are described herein below.

The PILS also includes a control system configured to communicate, to one of the localizer and the glideslope, data to be used by one of the localizer and the glideslope to generate the transmission parameters for RF signals to be generated by the plurality of antenna radio units. Continuing the example, FIG. 1 illustrates PILS 100 includes PILS Command and Control System (CCS) 106 configured to communicate, to one of localizer 104 and glideslope 102, data to be used by one of localizer 104 and glideslope 102 to generate the transmission parameters for RF signals to be generated by the plurality of antenna radio units (not shown) of PILS 100.

In some embodiments, the transmission parameters comprise one or more of a power, modulation indexes, and phase of an RF signal for transmission by an antenna element. According to some embodiments, the glideslope non-imaging antenna array is configured to be arranged in parallel to an aircraft runway. For example, FIG. 1 illustrates antenna elements A1-A4 arranged in parallel to an aircraft runway. In some embodiments, the localizer antenna array is configured to one collapse and expand. Examples of the localizer antenna array are discussed in further detail below in reference to FIG. 23. In some embodiments, the plurality of antenna radio units, glideslope, glideslope non-imagining antenna array, localizer, localizer antenna array, and control system are configured to be transported on a cargo pallet prior to deployment. Example configurations of the plurality of antenna radio units, glideslope, glideslope non-imagining antenna array, localizer, localizer antenna array, and control system on a cargo pallet prior to deployment are discussed in further detail below with reference to FIGS. 21-22 and 24-25.

The Portable Instrument Landing System solution is made possible through advancement in electronics technology and innovative thinking from a cross-section of Thales engineers from several disciplines and backgrounds. The solution provides a conventional ILS signal in space for reception of all presently equipped aircraft but in a greatly reduced package over prior conventional or deployable ILS solutions.

As shown in FIG. 1, the PILS 100 solution is comprised of Localizer 104 and Glide Slope (GS) 102 (also known as Glide Path) subsystems, augmented with a Flight Check Radio (FCR) 108 solution and supplied with an automated, Tuning Drone (TD) 110 that is managed by a Command and Control Subsystem (CCS) 106. The solution provides for full deployment at two locations (Loc 104 & GS 102) to expedite setup by collocating the FCR 108 and CCS 106 functions at the GP 102 location. In an alternative implementation, the CCS function includes the overall status of the ILS operation, it is also designed to be separated from the GP 102 if base operations are better supported by being collocated with other airfield equipment and personnel. For example, FIG. 1 illustrates a CCS 112 configured to be remotely located from the GP 102.

One key advancement in technology that makes such solution feasible today is the introduction of software defined radio (SDR) transmitters/receivers, or transceivers. SDR's provide the dynamic flexibility in a small package to allow the performance of some traditional antenna arrays and inventive antenna arrays described herein to be realized through a distributed architecture allowing tuning control of individual antenna elements and monitoring of performance through an Antenna Radio Unit (ARU).

Figure 2:
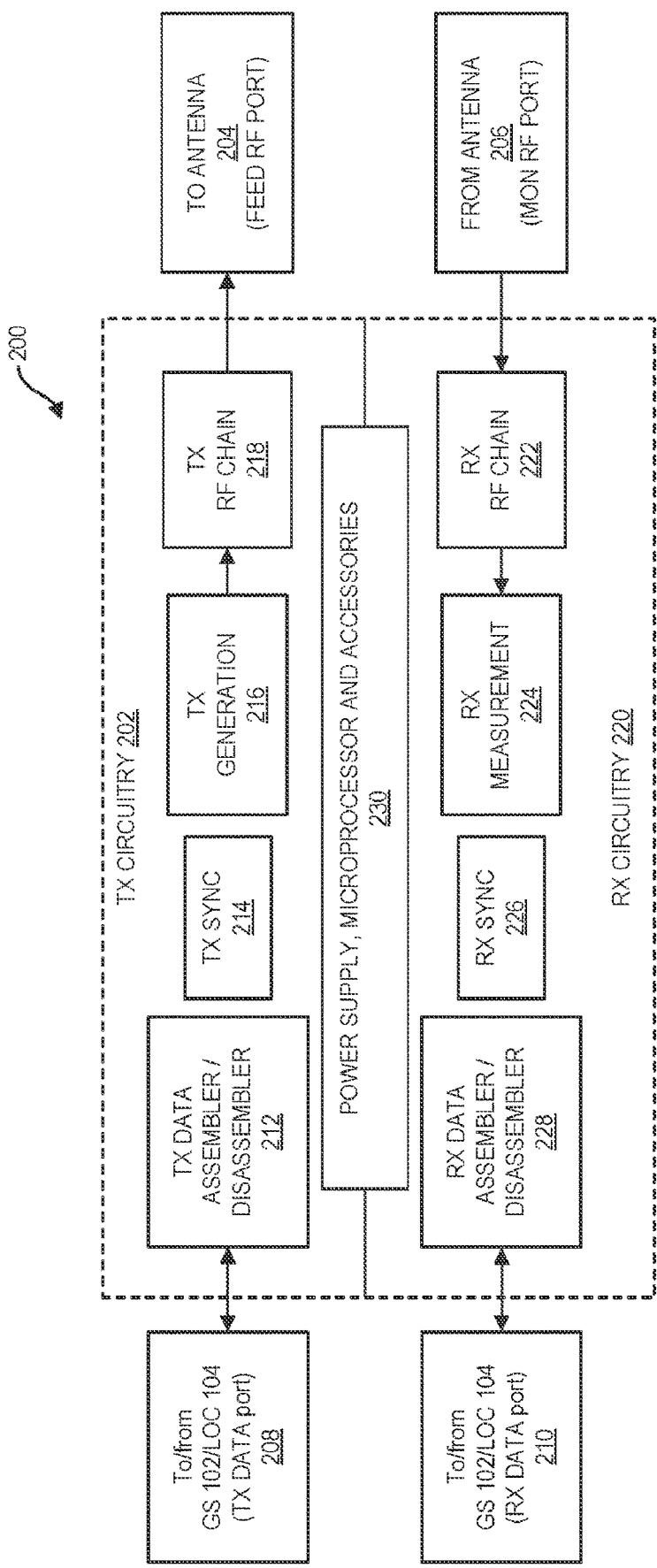
FIG. 2 is a block diagram illustrating an example antenna radio unit in accordance with embodiments of the present disclosure.

According to embodiments, an antenna radio unit of a portable instrument landing system (PILS) is also described. For example, FIG. 2 illustrates an example antenna radio unit (ARU) 200 as described above with regards to FIG. 1. The antenna radio unit comprises transmission circuitry that is configured to receive a communication comprising transmission parameters for a radio frequency (RF) signal to be transmitted using an antenna element directly coupled to the antenna radio unit. For example, ARU 200 of FIG. 2 is configured to receive, from one of GS 102 or LOC 104 of FIG. 1 via TX Data Port 208, a communication comprising transmission parameters for a radio frequency (RF) signal to be transmitted using an antenna element directly coupled to the antenna radio unit, such as one of antenna elements A1-A4 illustrated in FIG. 1.

The antenna radio unit 200 may be directly coupled to an antenna element via two RF cables—one for transmission of the RF signal via the antenna element and the other to receive the transmitted signal for monitoring. No other signal processing components intervene between the antenna radio unit 200 and the antenna element. The ARU 200 may be comprised within a housing or package that is configured to be attached to a structure supporting the antenna element or the antenna element structure.

In one embodiment, the antenna radio unit may receive a communication comprising transmission parameters for a RF signal to be transmitted from an antenna element of the glideslope non-imaging antenna array directly coupled to the antenna radio unit. For example, ARU 200 may receive transmission parameters for a RF signal to be transmitted using one of antenna elements A1-A4 illustrated in FIG. 1 directly coupled to ARU 200. In another embodiment, the antenna radio unit may receive a communication comprising transmission parameters for a RF signal to be transmitted from an antenna element of the localizer antenna array directly coupled to the antenna radio unit. For example, ARU 200 may receive transmission parameters for a RF signal to be transmitted using one of antenna elements of a localizer antenna array of localizer 104 illustrated in FIG. 1 directly coupled to ARU 200.

According to some embodiments, the transmission circuitry is also configured to generate the RF signal using the transmission parameters. For example, the TX circuitry 202 may be configured generate the RF signal using the transmission parameters communicated by one of GS 102 and LOC 104. The transmission circuitry is further configured to transmit the RF signal using the antenna element directly coupled to the antenna radio unit in accordance with some embodiments. Continuing the example, TX circuitry 202 may be further configured to transmit the RF signal towards an RF feed port 204 of one of an antenna element directly coupled to ARU 200, such as one of antenna elements A1-A4.

According to embodiments, the antenna radio unit further comprises reception circuitry configured to receive the RF signal transmitted by the antenna element. For example, FIG. 2 illustrates ARU 200 comprises RX circuitry 220 configured to receive a RF signal from a monitor port 206 of an antenna element directly coupled to ARU 200, such as one of antenna elements A1-A4. The reception circuitry is also configured to generate measurement data based on the received RF signal according to embodiments. Continuing the example, RX circuitry 220 is also configured generate measurement data based on the received RF signal. The reception circuitry is further configured to communicate the measurement data to one of a localizer and a glideslope of the PILS. For example, FIG. 2 illustrates RX circuitry 220 is configured to communicate the measurement data to one of GS 102 and LOC 104 via a RX Data Port 210 of ARU 200.

Figure 3:
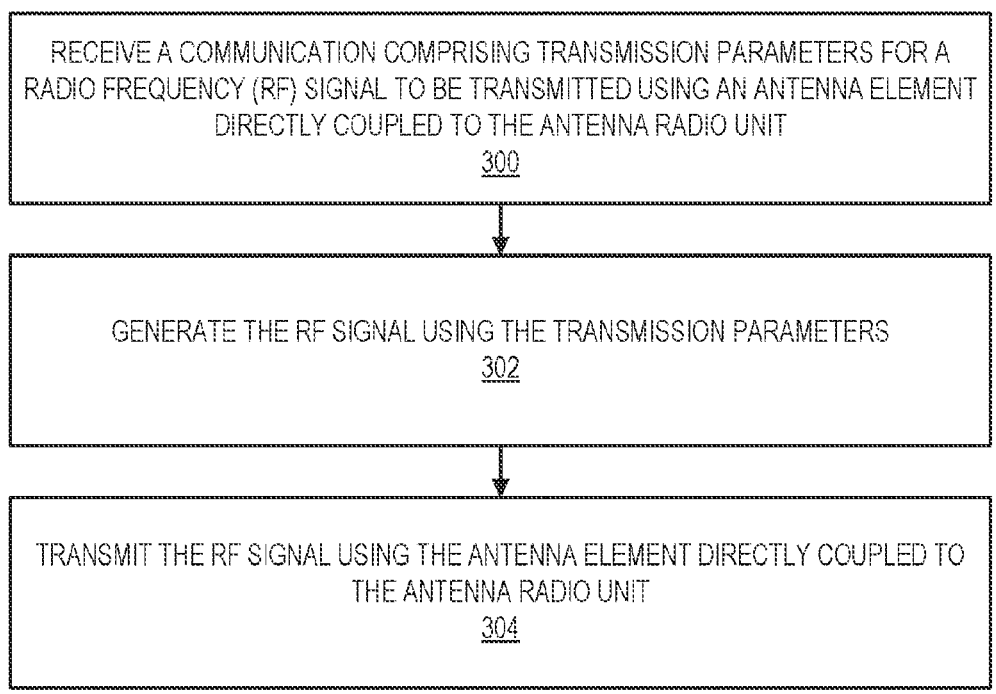
FIG. 3 is a flowchart illustrating a method performed by an antenna radio unit of the portable instrument landing system (PILS) in accordance with embodiments of the present disclosure.

FIG. 3 illustrates a method performed by an antenna radio unit of a portable instrument landing system (PILS) according to embodiments. FIG. 3 illustrates the method includes receiving 300 a communication comprising transmission parameters for a radio frequency (RF) signal to be transmitted using an antenna element directly coupled to the antenna radio unit. FIG. 3 also illustrates the method also includes generating 302 a radio frequency (RF) signal using the transmission parameters. The method further includes transmitting 303 the RF signal using the antenna element directly coupled to the antenna radio unit as illustrated in FIG. 3. The method may also include receiving the transmission parameters from one of a localizer and a glideslope of the PILS. The method may also include receiving the RF signal transmitted by the antenna element, generating measurement data based on the received RF signal, and communicating the measurement data to one of a localizer and a glideslope of the PILS.

The incorporation and application of the ARU's 200 into the Localizer 104 and Glide Slope 102 subsystems is described herein below. Monitor & control, solution power scheme, remote maintenance and the approach to satisfying the requirements for flight check radio are also described herein below.

The Antenna Radio Unit 200 is in charge to generate and to measure the radio frequency signal irradiated by its associated antenna. All the ARUs in the PILS system 100 are identical in HW/FW, but each ARU 200 will produce a different RF signal according to the configuration set by the Digital Processing Unit (DPU) 404 (Localizer) or 1004 (Glide Slope) (mainly power, phase and modulation indexes). The ARU 200 is a small box with two mono-directional RF ports 204, 206 (to the antenna "feed" 204 and from the antenna "mon" 206) and two bi-directional DATA ports 208, 210 (to/from the DPU, one for the RX section (210), the other for the TX section (208)). The data cables of each ARU converge to the dedicated ports of the DPU 404 (Localizer)/1004 (GP), which manages all the ARUs of the localizer of glideslope, respectively. FIG. 2 illustrates an example functional block diagram of one ARU 200. FIG. 2 also illustrates an example upper TX section comprising TX circuitry 202 that comprises:

The assembler/disassembler block 212 configured to:
 disassemble from the TX DATA PORT the synchronization pulses and the configuration data.
 assemble to the TX DATA PORT the synchronization returns and the messages.

The sync block 214 that manages the sync pulses produced by DPU 404 or DPU 1004

The TX generation block 216 may comprise an FPGA which generates the baseband RF signal, based on the configuration data (power, phase, modulation indexes . . . ) set by DPU 404 or DPU 1004.

The TX RF chain block 218 that may comprise a RF D/A converter followed by a Power Amplifier and a control loop.

In the lower RX section comprising RX circuitry 220 that comprises:

The RF chain block 222 that may comprise a RF A/D converter.

The RX measurement block 224 may comprise an FPGA which analyses the baseband RF signal and returns the estimated values (expected to be the same as the TX configuration data) to DPU 404 or DPU 1004.

The RF sync block 226 manages the sync pulses produced by the Central Unit 106.

The assembler/disassembler block 228 configured to:
  disassemble from the RX DATA PORT 210 the synchronization pulses and the messages.
  assemble to the RX DATA PORT 210 the synchronization returns and the measurement data.

DC Power for the entire ARU may be provided from the DPU 404 or 1004 via the ARU's RX Data Port 210. The power solution includes also the prioritization and sequencing logic to automatically switch from primary power to secondary power (e.g. generator) upon loss of primary power. The solution also included the capability to automatically switch back to primary power once restored. In addition to primary and secondary AC power inputs, the PILS power solution will provide battery backup so that all navigation and communications components remain operational during power transitions or complete loss of external power. Battery backup will be sized to provide enough of operation from a full charge which is consistent with fixed navaid solutions. For example, processing and power management circuitry 230 illustrated in FIG. 2 may be configured to automatically switch from primary power to secondary power (e.g. generator) upon loss of primary power and switch back to primary power once restored.

As regards to some technological aspects, the following considerations (risk and opportunities) can apply:

Since the RF signal delivered to each antenna can be individually programmed by its associated ARU 200, the PILS system 100 has the opportunity to produce a signal-in-space with more flexibility than the existing ILS system, in which the array patterns are fixed. (Also the alignment procedure can be totally or partially based on software instead of cutting the RF antenna cables).

Since each ARU 200 is able to individually measure the RF signal irradiated by its associated antenna, the PILS system 100 has the opportunity to estimate the signal-in-space with more flexibility than the existing ILS system, in which the estimation is performed at fixed angles.

The RF generation and measurement in the ARU 200 may be performed utilizing Software Defined Radio technology. The signal produced by each ARU 200 for the PILS (LOC or GP signals), with the single frequency assumption, is:

$$s(t)=V_o*[1+\Sigma_i m_i*\cos(2\pi f_i t+\varphi_i)]*\cos[2\pi f_o*t+\varphi_o]$$

In essence, a carrier at frequency $f_0$ (about 110 MHz for LOC and 330 MHz for GP), modulated by a sum of low frequency signals $f_i$ (90 Hz, 150 Hz and 1020 Hz), with different modulation indexes, phases and power. Since this signal is very similar to a Doppler-VOR (DVOR) signal, it was quite easy to implement during experiments utilizing a basic 4 element Localizer and re-programming a RF board formerly designed for the DVOR (but with the simplification to drive the four antennas with the same reference clock).

This experiment has demonstrated that the ILS signal can be easily generated with the SDR technology. The monitoring function in the PILS 100 system is distributed among all the ARUs of PILS 100 and the Central Unit 106.

Figure 4:
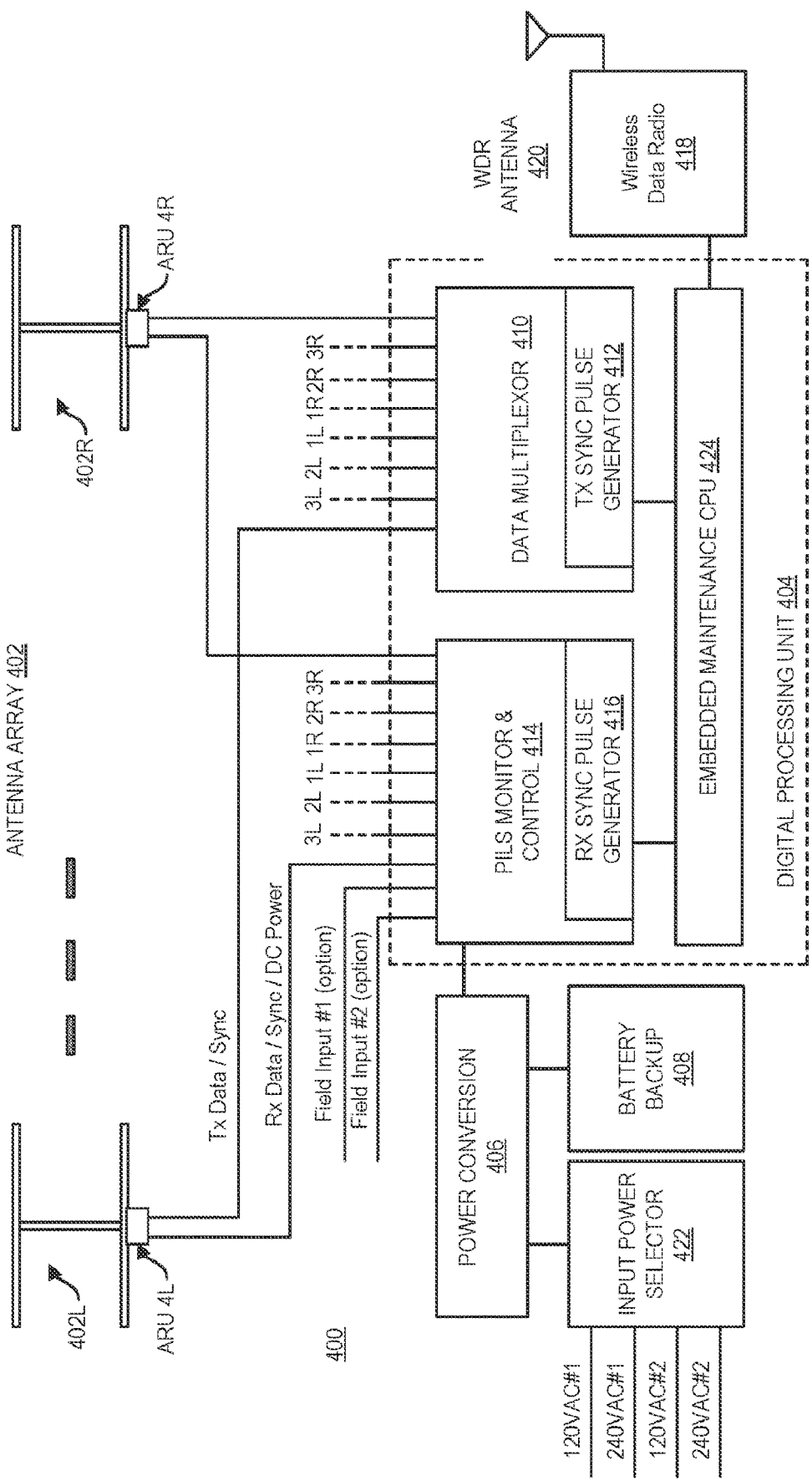
FIG. 4 is a block diagram illustrating an example localizer of the PILS in accordance with embodiments of the present disclosure.

According embodiments, a localizer of a portable instrument landing system (PILS) is also described. FIG. 4 illustrates an example localizer 400 of PILS 100. The localizer comprises an antenna array, each antenna element of the antenna array directly coupled to a respective antenna radio unit of the plurality of antenna radio units of the PILS according to embodiments. Continuing the example, FIG. 4 illustrates localizer 400 comprises an antenna array 402, each antenna element 402L . . . 402R of antenna array 402 are directly coupled to a respective ARUs 4L . . . 4R of the PILS 100. The localizer also comprises processing circuitry coupled to each respective antenna radio unit directly coupled to a respective antenna element of the antenna array. For example, FIG. 4 illustrates localizer 400 comprises a digital processing unit 404 coupled to ARUs 402L . . . 402R directly coupled to respective antenna elements 402L . . . 402R of antenna array 402.

The processing circuitry is configured to receive, from a control system of the PILS, data to be used to generate transmission parameters for radio frequency (RF) signals to be generated by each respective radio unit of the PILS according to embodiments. Continuing the previous example, FIG. 4 illustrates digital processing unit 404 may be configured to receive, from CCS 106 of the PILS 100, data to be used to generate transmission parameters for radio frequency (RF) signals to be generated by ARU 4L-4R. The processing circuitry is also configured to generate transmission parameters for radio frequency (RF) signals to be transmitted by the antenna elements of the antenna array based on the received data according to embodiments. For example, DPU 404 illustrated in FIG. 4 may be configured to generate transmission parameters for radio frequency (RF) signals to be transmitted by the antenna elements 402L-402R of antenna array 402 based on the received data. According to embodiments, the processing circuitry is further configured to communicate the transmission parameters to the respective antenna radio units to generate the RF signals for transmission from the antenna elements of the antenna array. FIG. 4 further illustrates example DPU 404 may be configured to communicate the transmission parameters to ARU 4L and/or ARU 4R units to generate the RF signals for transmission from the antenna elements 402L and/or 402R of the antenna array.

The PILS Localizer Subsystem 100 design brings a field-proven, 8-element localizer antenna array distribution in a quickly deployable, compact package. This includes a compact antenna design over conventional, fixed base ILS localizer solutions with each antenna driven by a dedicated Antenna Radio Unit 200. As shown in FIG. 4, the Localizer Subsystem 400 includes circuitry and/or software modules that provide capabilities required for:

power conversion/battery backup (e.g., Input Power Selector 422, Power Conversion Circuity/Module 406, Battery Backup Circuity/Module 408), signal generation and radiation (e.g., Data Multiplexor 410, TX Sync Pulse Generator 412, Embedded Maintenance CPU 424), monitoring of signal performance and associated control action (e.g., PILS Monitor & Control Circuitry/Module 414, RX Sync Pulse Generator 416, Embedded Maintenance CPU 424) and remote interface for antenna tuning and status reporting to Air Traffic Control personnel or remote system maintainer (e.g., Wireless Data Radio 418 and Antenna 420).

The data interface between the functions contained in the Digital Processing Unit (DPU) 404 include:

Dedicated data communication to each ARU 4L . . . 4R for configuring and adjusting transmitter parameters on a per-antenna basis, Synchronization signal for maintaining phase coherence of the RF carrier of the individual elements, Dedicated data communication from each ARU 4L . . . 4R for providing monitor data sets for constructing the signal-in-space for measure of system performance, Independent synchronization signal for alignment of individual monitor measurements and DC power source that is removed by the control circuits if alarm condition is detected. Alternatively, or in combination, this function can be performed by power conversion circuitry 406.

Figure 5:
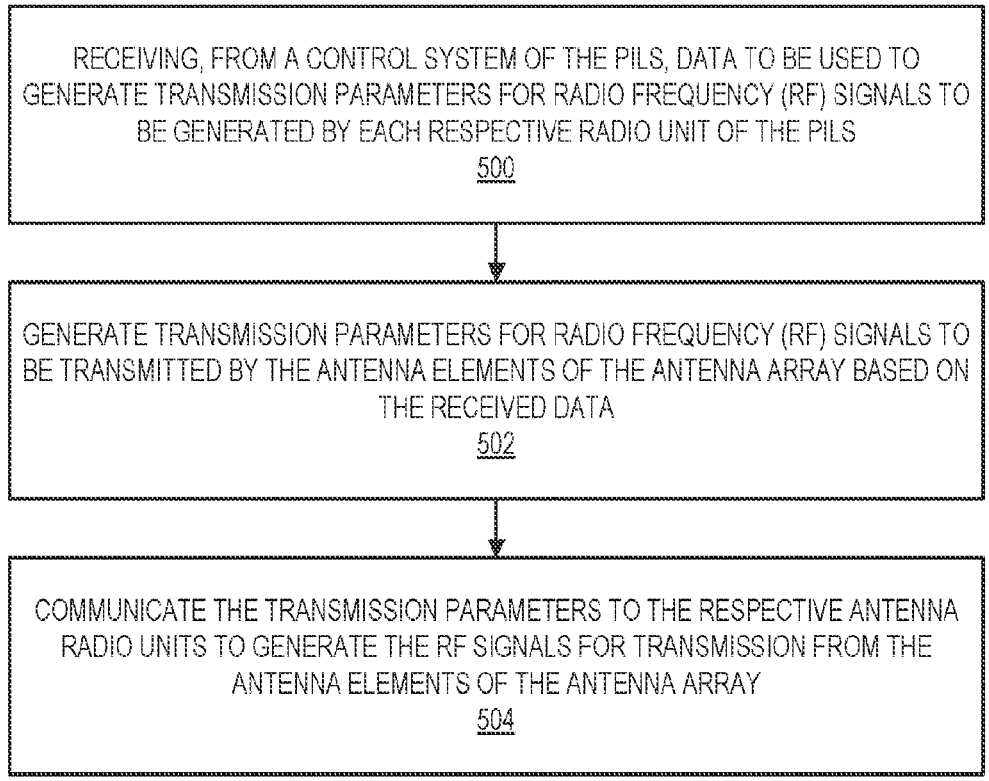
FIG. 5 is a flowchart illustrating a method performed by a localizer of a portable instrument landing system (PILS) in accordance with embodiments of the present disclosure.

FIG. 5 illustrates a method performed by a localizer of a portable instrument landing system (PILS) according to embodiments. The method includes receiving 500, data to be used to generate transmission parameters for radio frequency (RF) signals to be generated by a plurality of antenna radio units of the PILS. The method also includes generating 502 transmission parameters for radio frequency (RF) signals to be transmitted by the antenna elements of the antenna array based on the received data. The method also includes communicating 504 the transmission parameters to the respective antenna radio units to generate the RF signals for transmission from the antenna elements of the non-imaging antenna array.

Figure 6:
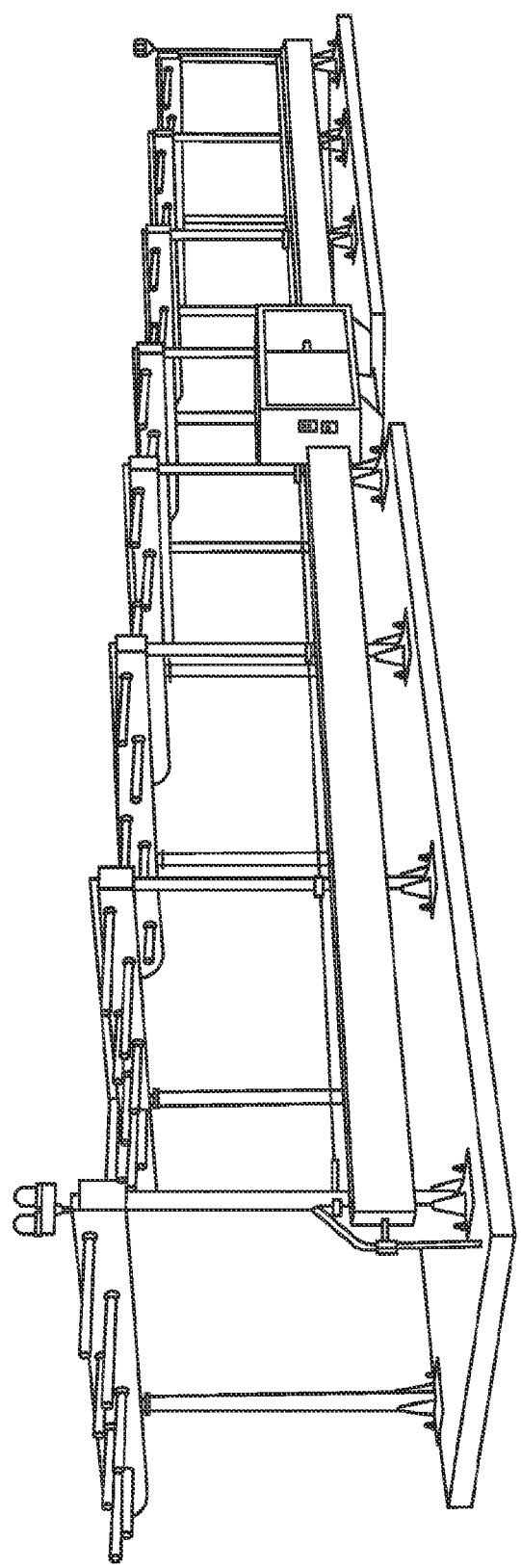
FIG. 6 is a diagram illustrating an example of a fixed-base, 8-element installed localizer array consisting of a row of antenna elements known in the art.

The proposed localizer antenna component is a phased array that, in conjunction with its associated transmitters, radiates a signal in space that complies with all ICAO Annex requirements for ILS localizer systems. The localizer antenna array is typically the physically largest component of an ILS. In contrast to traditional localizer antenna arrays, the PILS localizer array is designed to optimize the tradeoffs between performance and packaging size. FIG. 6 illustrates a fixed-base, 8-element installed localizer array consisting of a row of antenna elements sited a few hundred feet beyond the stop end of the runway. The localizer antenna elements shown in FIG. 6 are log periodic dipoles (LPD) which provide good directivity and front-to-back ratio.

A critical parameter affecting localizer performance is the array aperture, i.e. the total width of the array. The angular width of the transmitted beam is inversely proportional to the aperture size. The wider the beam, the greater potential there is for reflections from structures or large aircraft near the runway to interfere with the direct signal-in-space and distort it, introducing bends into the approach course. Localizer antenna arrays may include 8, 14, 20, or 32 elements, with apertures ranging from 51 ft for an 8-element array up to 246 ft for a 32-element array. However, it should be understood that the above different number of elements and spacing may be utilized. For example, different antenna elements and spacing might be applied to shape the antenna radio diagram according to specific needs.

Figure 7:
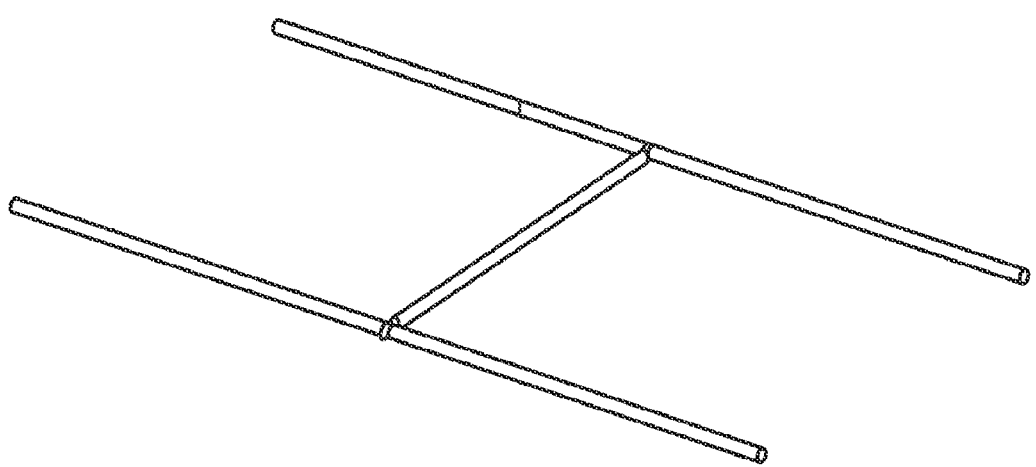
FIG. 7 is a diagram illustrating an example dual dipole antenna as an example antenna element of an antenna array of localizer of the PILS in accordance with embodiments of the present disclosure.

The localizer antenna array of the PILS 100 may be configured to utilize an 8-element single frequency localizer antenna array with a new element design in place of the LPDs described above. The LPDs described above are typically large and heavy. According to some embodiments, the antenna elements of the localizer antenna array includes a dual dipole antenna. For example, FIG. 7 illustrates an example dual dipole antenna as an antenna element of an antenna array of localizer 400 described above.

Figure 8:
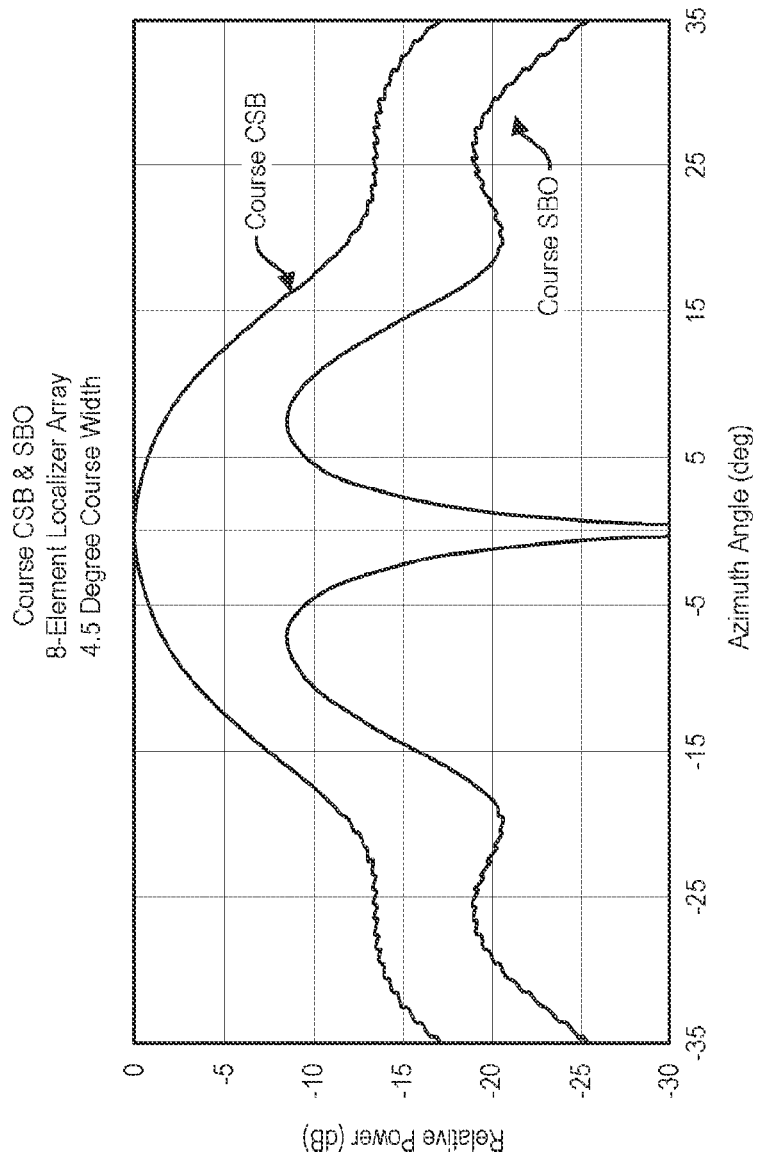
FIG. 8 is a plot chart illustrating an example relative power vs. azimuth angle for the course plus sideband (CSB) and sideband only (SBO) signals radiated by the 8-element array in accordance with embodiments of the present disclosure.
Figure 9:
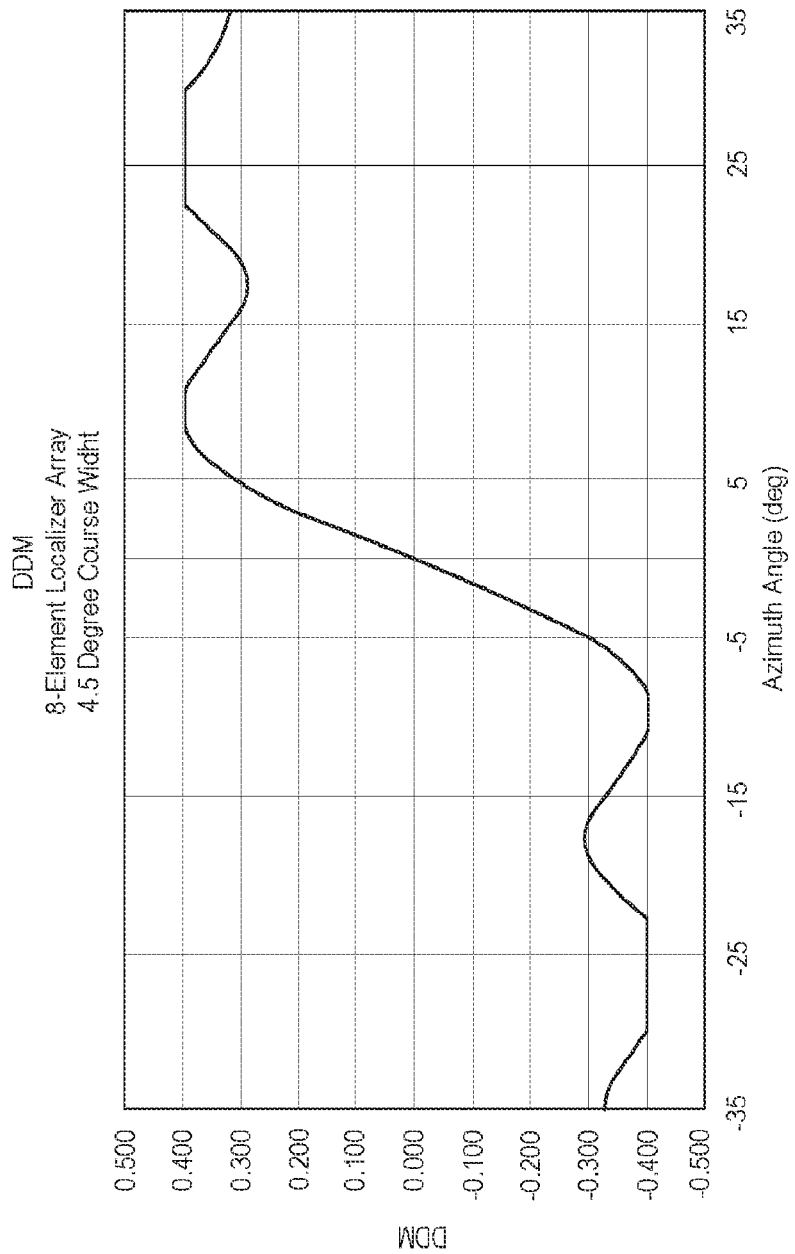
FIG. 9 is a plot chart illustrating an example difference in depth of modulation (DDM) over the same range of azimuth angle in accordance with embodiments of the present disclosure.

The two dipoles are fed in quadrature. The essential characteristics of this antenna may comprise a gain of 4.9 dBi, a front-to-back ratio of 15.3 dB, and a half-power beam width of 76°. The dual dipole antenna has slightly less directivity than the LPD described above, which has negligible effect on the localizer array pattern. The virtue of the dual dipole antenna is its small size and weight and ability to be packaged compactly. FIG. 8 shows relative power vs. azimuth angle for the course plus sideband (CSB) and sideband only (SBO) signals radiated by the 8-element array. FIG. 8 illustrates a theoretical pattern generated by a computer model with course width (a measure of displacement sensitivity) set to 4.5°. FIG. 9 shows difference in depth of modulation (DDM) over the same range of azimuth angle. DDM is measured by the aircraft ILS avionics to determine the aircraft angular offset from the extended runway centerline.

Figure 10:
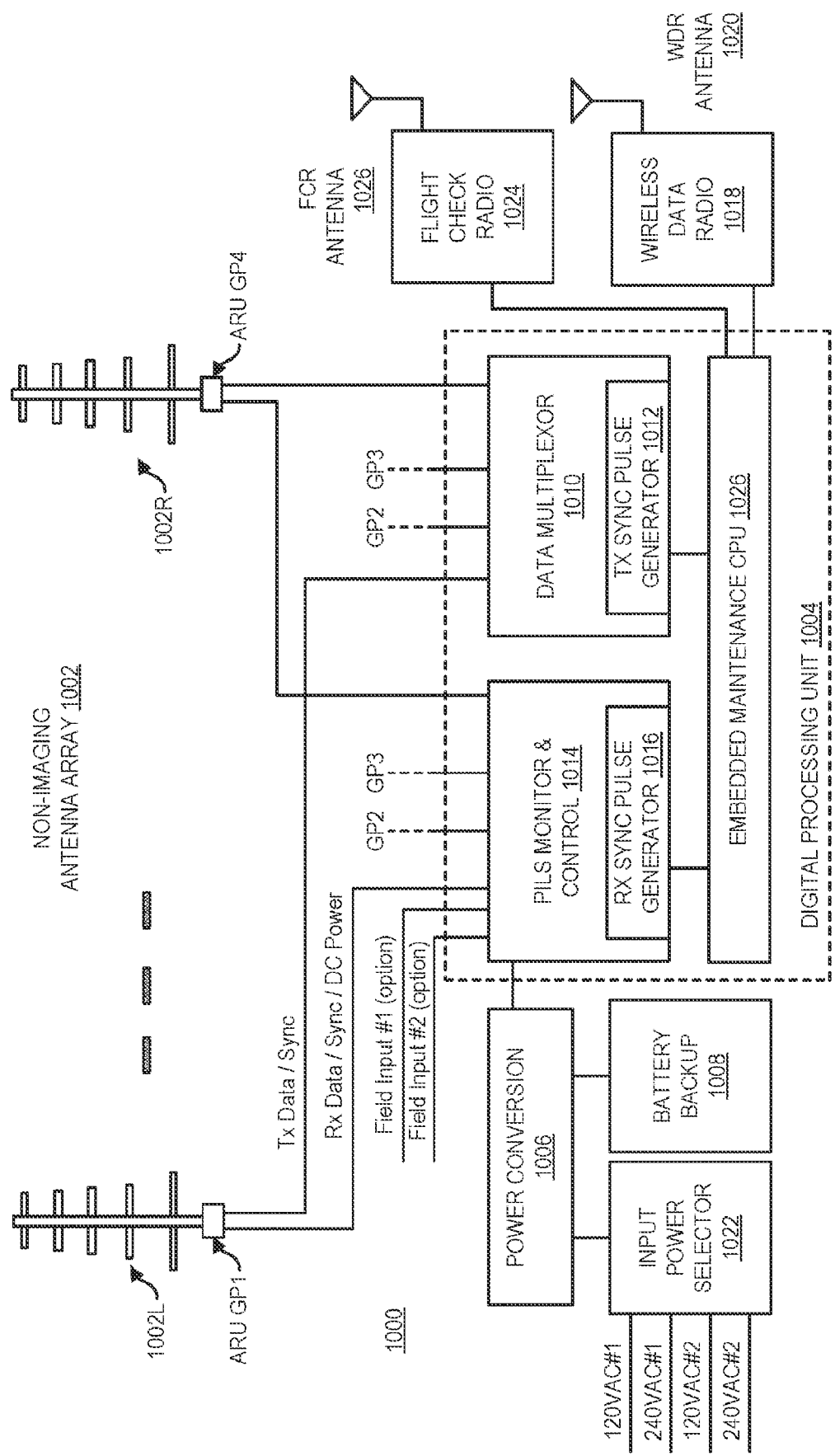
FIG. 10 is a block diagram of an example a glideslope of a portable landing system (PILS) in accordance with embodiments of the present disclosure.

According to embodiments, a glideslope of a portable landing system (PILS) is also described. For example, FIG. 10 illustrates an example glideslope 1000 of PILS 100. The glideslope comprises a non-imaging antenna array, each antenna element of the non-imaging antenna array directly coupled to a respective antenna radio unit of a plurality of antenna radio units of the PILS. For example, FIG. 10 illustrates glideslope 1000 comprises a non-imaging antenna array 1002, each antenna element 1002L . . . 1002R of antenna array 1002 are directly coupled to a respective ARUs GP1 . . . GP4 of the PILS 100. The glideslope also comprises processing circuitry coupled to each respective antenna radio unit directly coupled to a respective antenna element of the non-imaging antenna array. Continuing the example, FIG. 10 also illustrates glideslope 1000 comprises a digital processing unit (DPU) 1004 coupled to each respective ARUs GP1 . . . GP4 directly coupled to a respective antenna elements 1002L . . . 1002R of the non-imaging antenna array 1002. It should be noted that the number of antenna elements illustrated are provided as an example and that the number different antenna elements and spacing may be utilized to apply shape of antenna radiation diagram according to specific needs.

The processing circuitry is configured to receive, from a control system of the PILS, data to be used to generate transmission parameters for radio frequency (RF) signals to be generated by the plurality of antenna radio units according to embodiments. Continuing the previous example, FIG. 10 illustrates DPU 1004 may be configured to receive, from CCS 106 of the PILS 100, data to be used to generate transmission parameters for radio frequency (RF) signals to be generated by ARUs GP1 . . . GP4. The processing circuitry is further configured to communicate the transmission parameters to the antenna radio units to generate the RF signals for transmission from the antenna elements of the non-imaging antenna array. For example, FIG. 10 further illustrates example DPU 1004 may be configured to communicate the transmission parameters to antenna radio units such as ARUs GP1 . . . GP4 to generate the RF signals for transmission from antenna elements 1002L . . . 1002R of the non-imaging antenna array 1002.

The PILS Glide Slope Subsystem 1000 illustrated in FIG. 10 uses similar building blocks as the Localizer Subsystem 400 illustrated in FIG. 4. Since the design comprises digital circuitry up to the point where the ARU provides the RF signal to its dedicated antenna there are no radio frequency specific components in the remainder of the design. The same power management approach, DPU and Wireless Data Radio perform similar functions as described above with regards to Localizer 400. Since the GP equipment 1000 is offset from the runway (see FIG. 1), the FCR function utilizing the Flight Check Radio 1024 and FCR Antenna 1026 is collocated with the GP 1000 for power and data interface.

Designing a PILS glide slope antenna array that meets the packaging and installation time requirements for a PILS is more challenging than for a localizer array. A typical glide slope antenna array consists of two or three antennas mounted on a vertical tower. The tower can be up to 40 ft tall, depending on slope elevation angle. Most known glide slope arrays are imaging systems: they achieve a proper glide slope signal in space by combining the direct radiation with the radiation reflected from the ground. A two-element glide slope imaging system can be viewed as two upper elements, on the tower, and two mirror image elements, underground. Such a system requires an expanse of ground several hundred feet in front of the tower that is flat and obstruction free in order to function properly.

Figure 11:
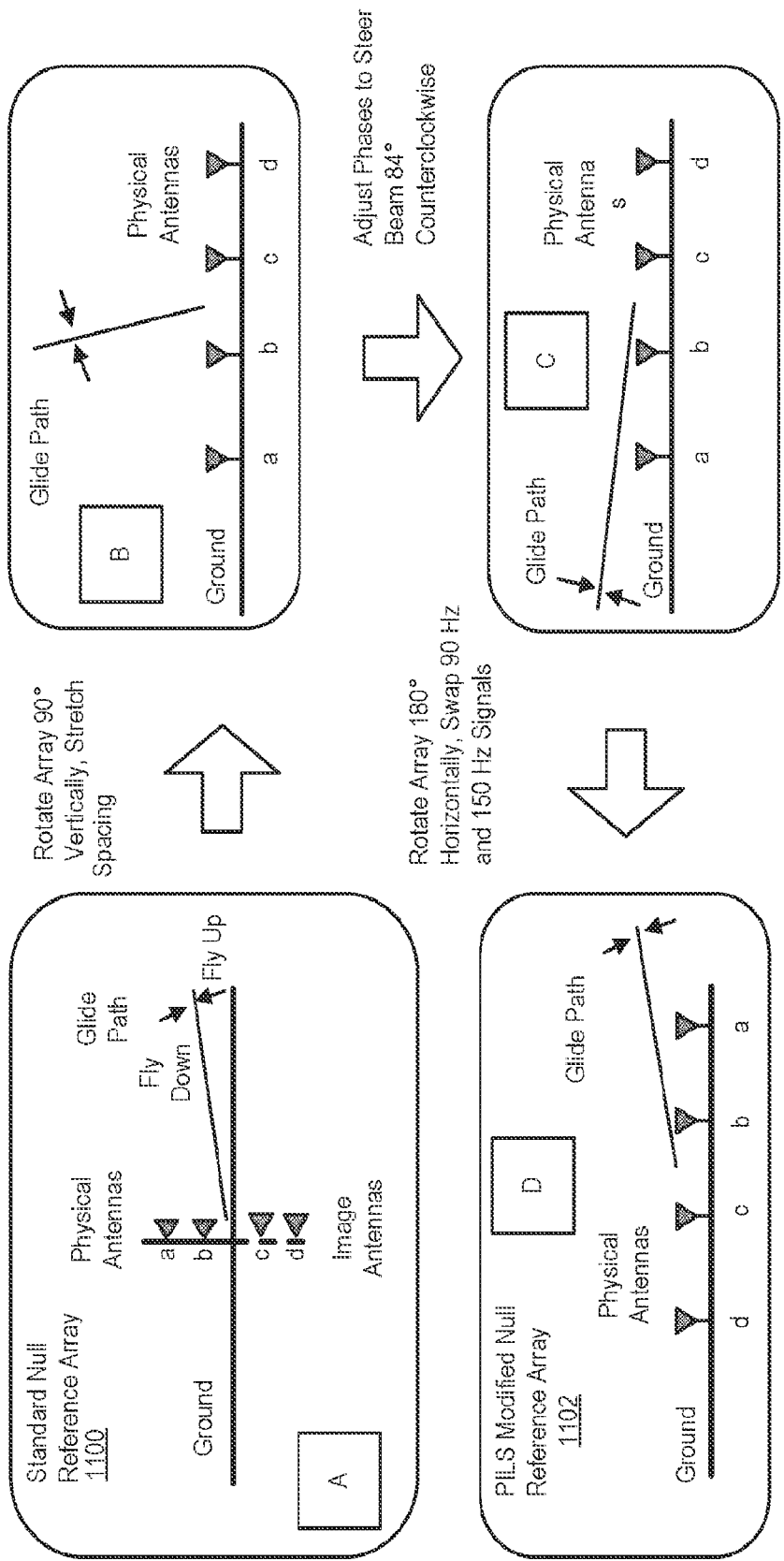
FIG. 11 is a diagram illustrating differences between known imaging antenna arrays and an example of a non-imaging antenna array of the PILS in accordance with embodiments of the present disclosure.

For the PILS application, a tower would be prohibitively large and many SF-PALC sites will not likely have terrain suitable for an imaging system. In contrast to known glide slope imaging systems, the PILS 100 comprises a non-imaging antenna array that is positioned horizontally a few feet above the ground. FIG. 11 illustrates the differences between known imaging antenna arrays 1100 and the PILS non-imaging antenna array 1102. An analysis of the inventive design process from the standard array 1100 to the inventive PILS non-imaging antenna array 1102 is described below.

Consider a standard Null Reference Glide Slope Antenna Array 1100, as shown in Frame A of FIG. 11. The direct signals radiated from antennas a and b combine with the reflected signals appearing to be radiated by the image antennas c and d to produce the glide slope signal-in-space. The usual glide slope elevation angle is 3°, which is determined by the amplitudes and phases of the radiated signals as well as the spacing between antennas. An aircraft below glide slope will see a fly-up signal and an aircraft above the slope will see a fly-down signal.

Now imagine rotating the tower 90° onto its back and replacing the image antennas with real ones (Frame B of FIG. 11). The glide slope angle will have rotated from 3° above the horizon to 3° off zenith, in the direction away from the runway threshold.

In Frame C of FIG. 11 the phases of the individual antenna elements are adjusted to steer the beam an additional 84° counterclockwise, as viewed in FIG. 11, so that it is again 3° above the horizon, albeit in the opposite direction. At this point Frame C maintains the proportionality in element spacing, so that an aircraft on the glide slope sees the same spacing between antennas that it would see from the glide slope to a standard Null Reference array on a vertical tower. Assuming a 3° glide slope angle this increases the aperture from 57 feet to 542 feet.

In Frame D of FIG. 11 the array is rotated horizontally 180° to point the glide slope in the proper direction. It is also necessary to swap the 90 Hz and 150 Hz modulation signals to restore the proper fly-up/fly-down directions. This implementation is a fairly radical departure from the standard glide slope antenna design illustrated in Frame A. What makes it feasible is the availability of software-defined transmitters that can drive the antenna elements with signals having highly accurate amplitudes and phases that can be easily and precisely adjusted during the tuning process.

Figure 12:
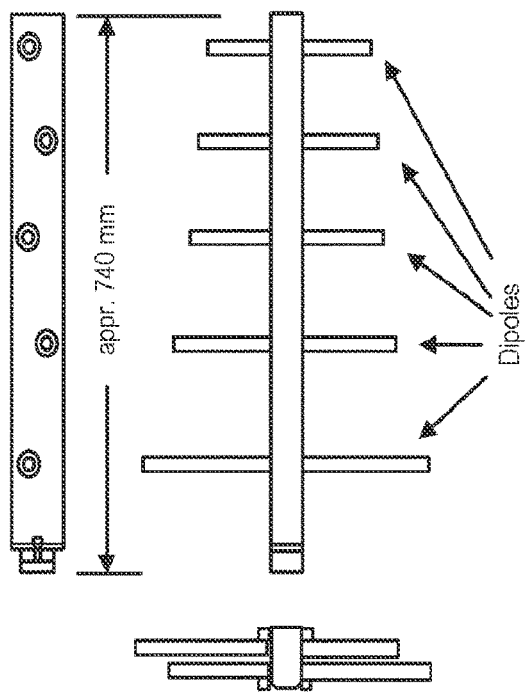
FIG. 12 is a diagram illustrating an example LPD antenna elements of a glideslope non-imaging array in accordance with embodiments of the present disclosure.
Figure 12:
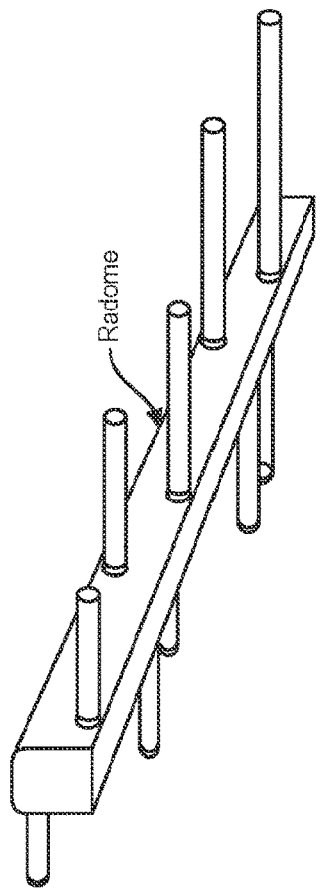

The current selection for the glide slope non-imaging array antenna elements is a log-periodic dipole (LPD) at 330 MHz. A 330 MHz quarter-wavelength dipole is also seen as a viable option for this application. In both options, the small LPDs (by virtue of operating in the UHF glide slope frequency band), are considerably more compact than a typical glide slope antenna used with an imaging system. FIG. 12 illustrates example LPD antenna elements of glideslope non-imaging array. In an alternative embodiment, the non-imaging array antenna elements may comprise Vivaldi type of antenna element.

Figure 13:
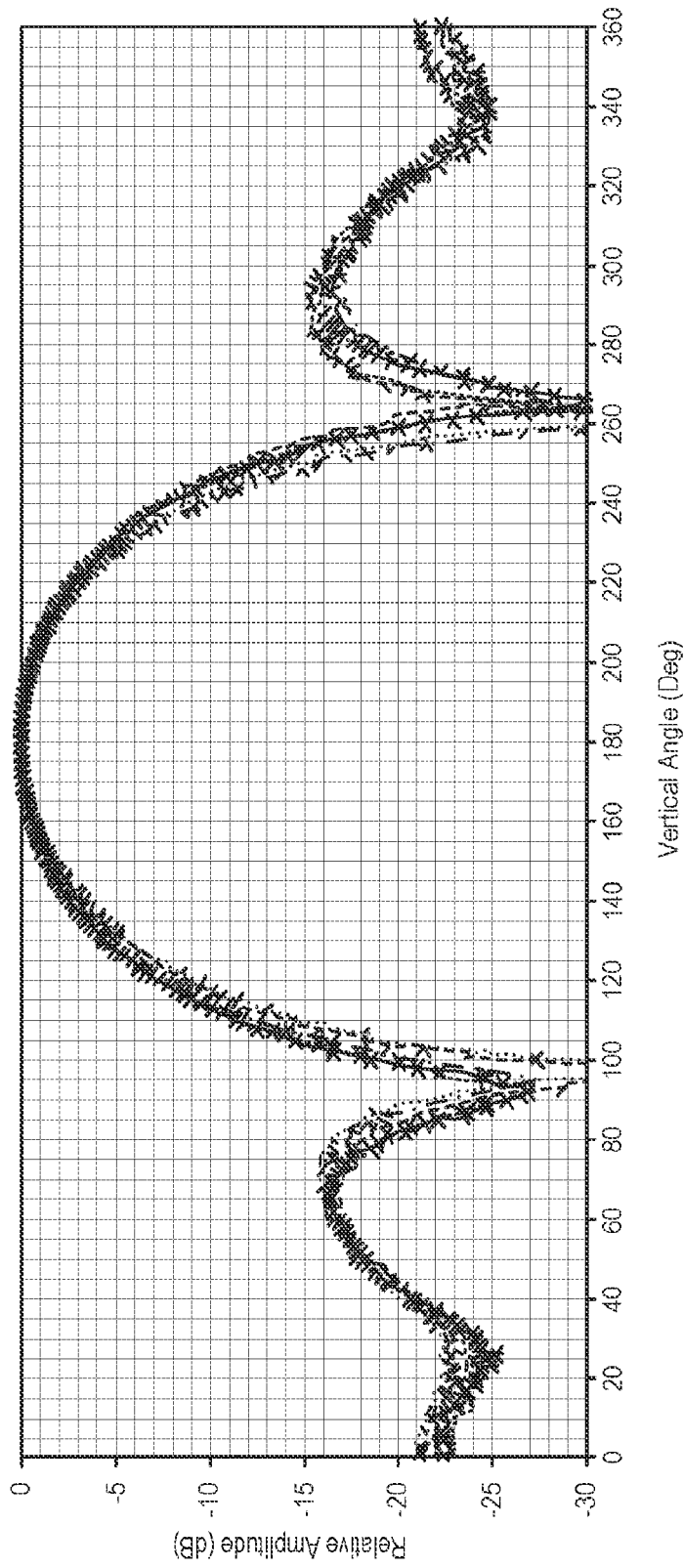
FIG. 13 is a signal plot illustrating experimental results of a vertical radiation pattern of an antenna element of a glideslope of a non-imaging antenna array measured in a chamber.
Figure 14:
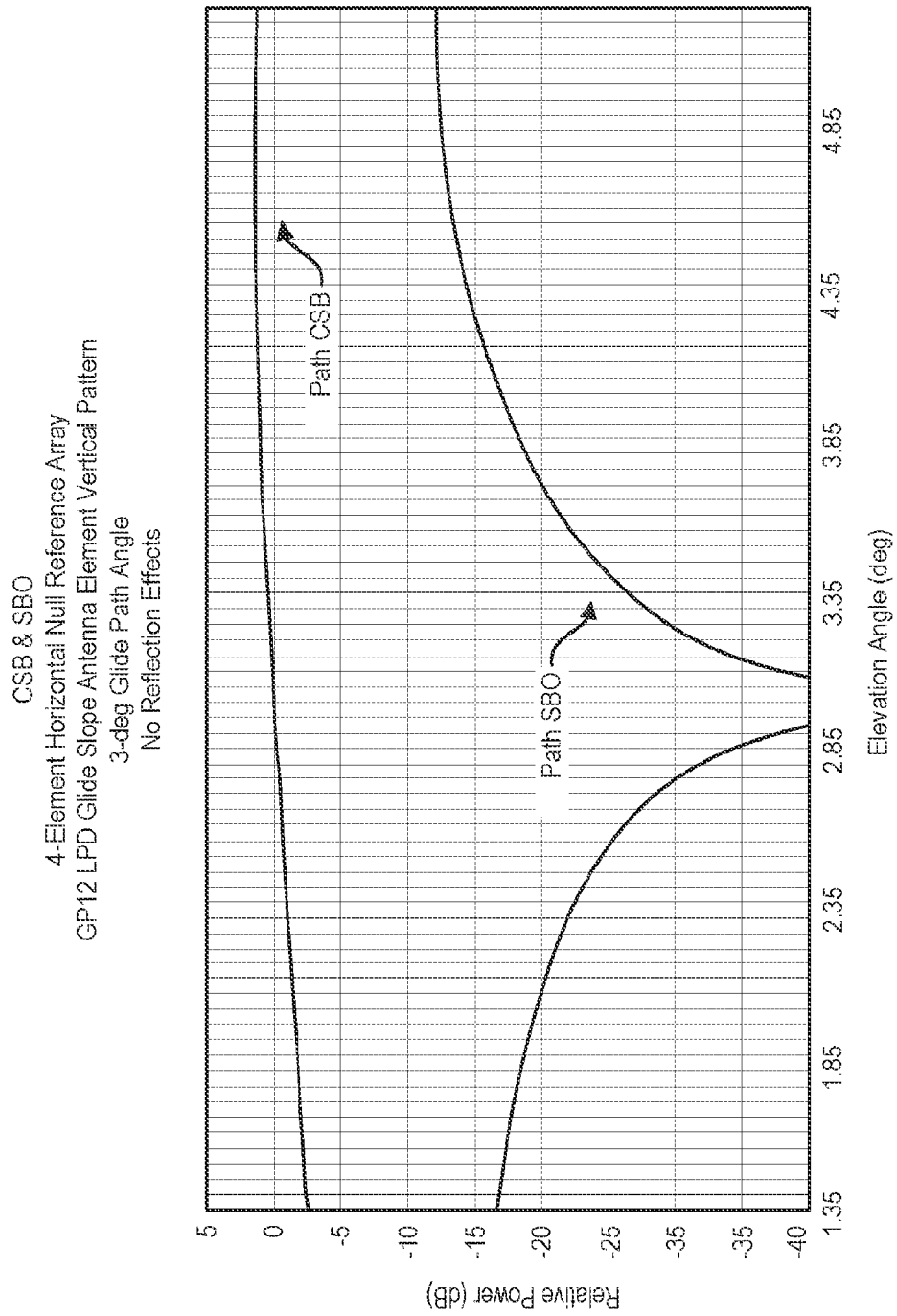
FIG. 14 is a plot chart illustrating an example carrier-plus-sideband (CSB) and sideband-only (SBO) patterns for a glide slope system in accordance with embodiments of the present disclosure.
Figure 15:
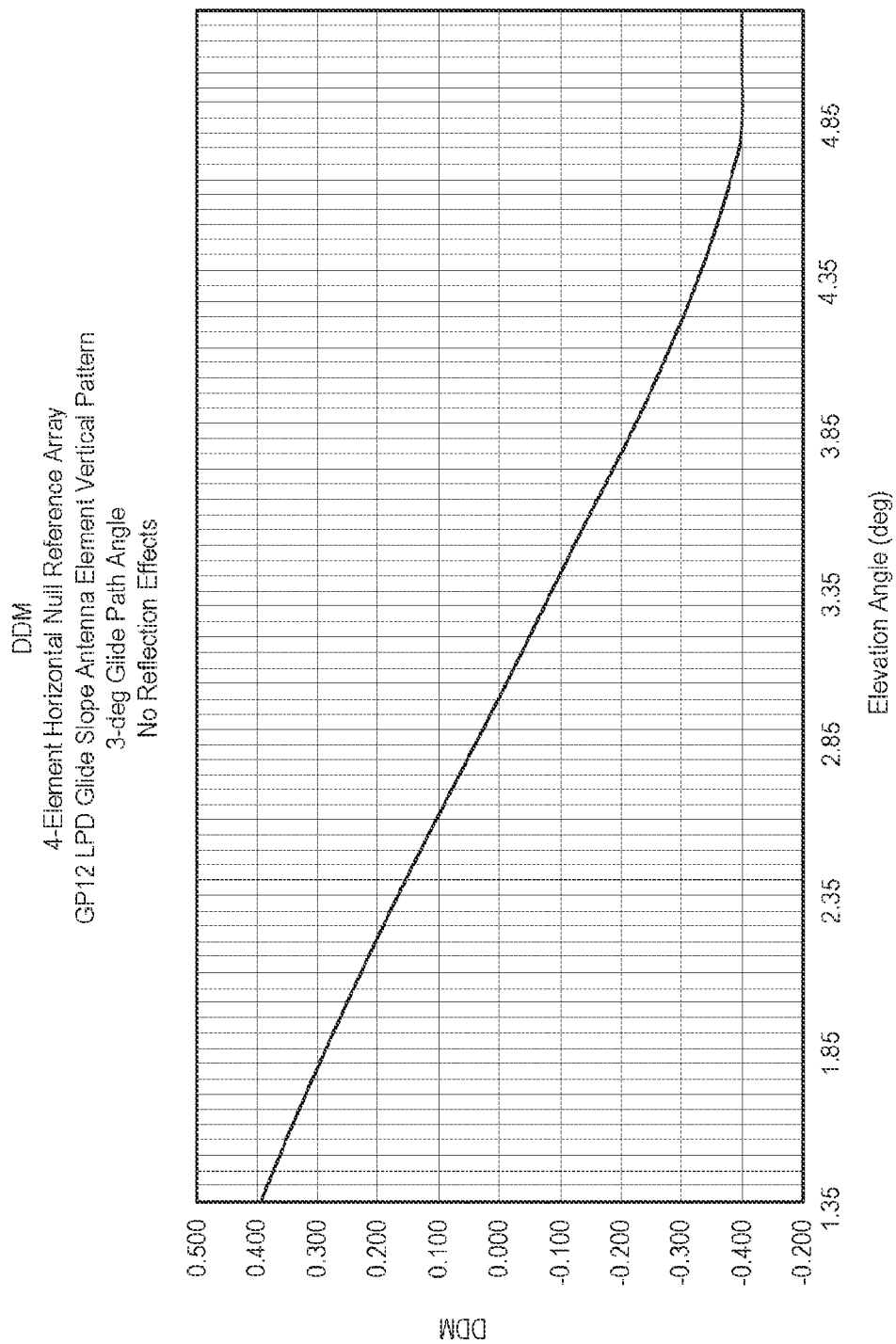
FIG. 15 is a plot chart illustrating an example DDM pattern for a glide slope system in accordance with embodiments of the present disclosure.

FIG. 13 shows the vertical radiation pattern of an AAN 104 measured in a chamber at azimuth angles of 0, ±5° and ±15°. Preliminary computer modeling of the horizontal array derived from the standard Null Reference has been performed with promising results. FIG. 14 shows the theoretical carrier-plus-sideband (CSB) and sideband-only (SBO) patterns for 3° glide slope system. The plot covers the azimuth angle range specified in ICAO Annex 10 as 0.450 to 1.750, or 1.35° to 5.25°. This simulation assumes the AAN 104 vertical radiation pattern and does not include effects of reflection from the ground. FIG. 15 shows the DDM pattern. The plot is linear and symmetrical about the 0 DDM point and complies with Annex 10 displacement sensitivity requirements.

The plots described above are idealized in the sense that the effect of reflections on the signal in space have not been accounted for. Any signals that are reflected from the ground can interfere with the direct signal. The glide slope signal is horizontally polarized, which means it undergoes a 180° phase shift when reflected. The reflected wave will interfere constructively or destructively with the direct wave as a function of elevation angle and antenna height.

Figure 16:
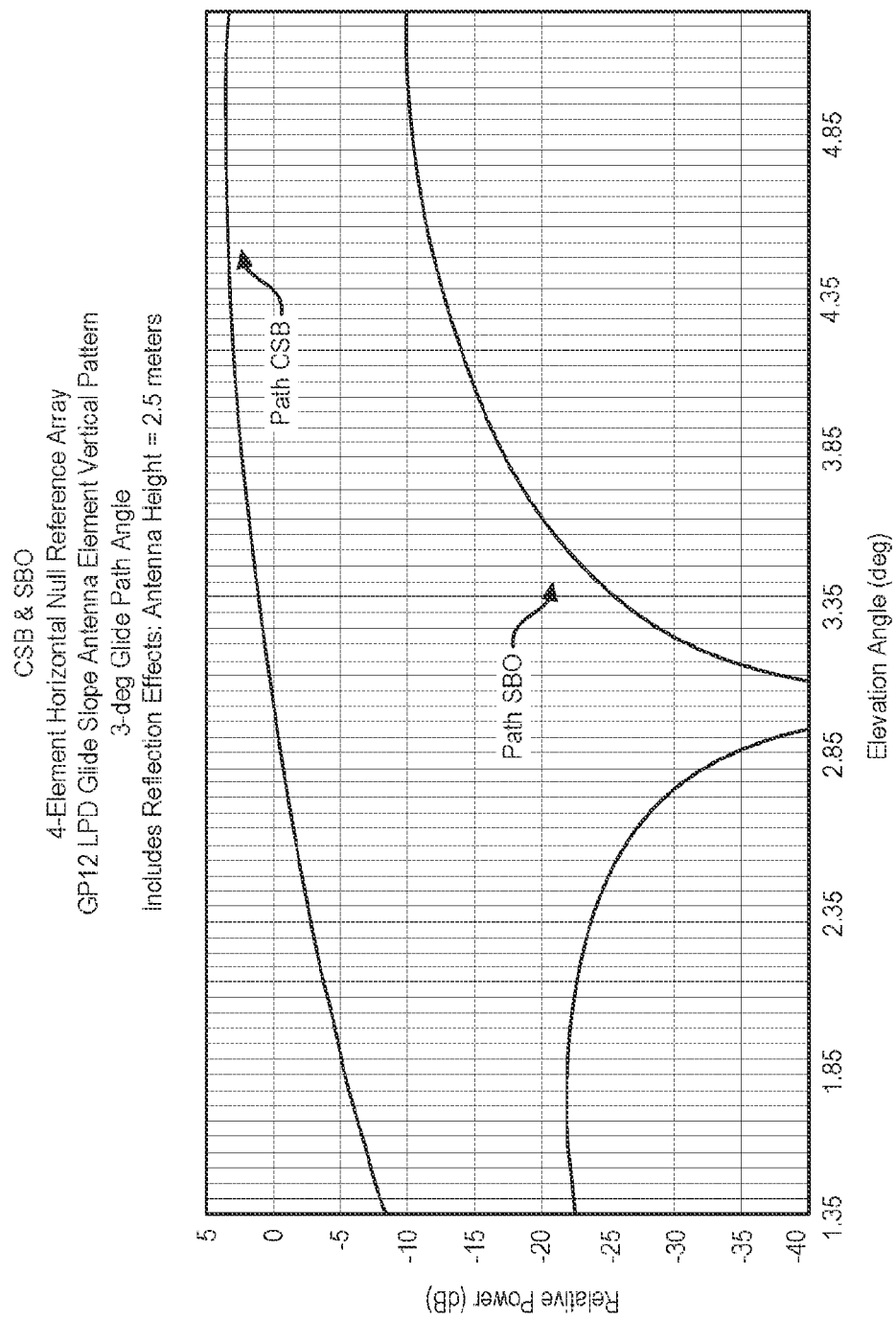
FIG. 16 is a plot chart illustrating an example CSB and SBO radiation pattern of a glide slope antenna element vertical pattern in accordance with embodiments of the present disclosure.

FIG. 16 shows a CSB and SBO radiation pattern generated by a computer model that includes reflections from the ground. The simulation assumes smooth and level ground which magnifies the reflection effects somewhat compared to what would be expected for a real system.

Note that reflections cause a reduction in signal power at elevation angles below 3°. This occurs because at very low elevation angles the difference in slope length from the antenna to the aircraft between the direct and reflected waves is small. Combined with the 180° phase shift of the reflected wave this results in non-negligible destructive interference.

Figure 17:
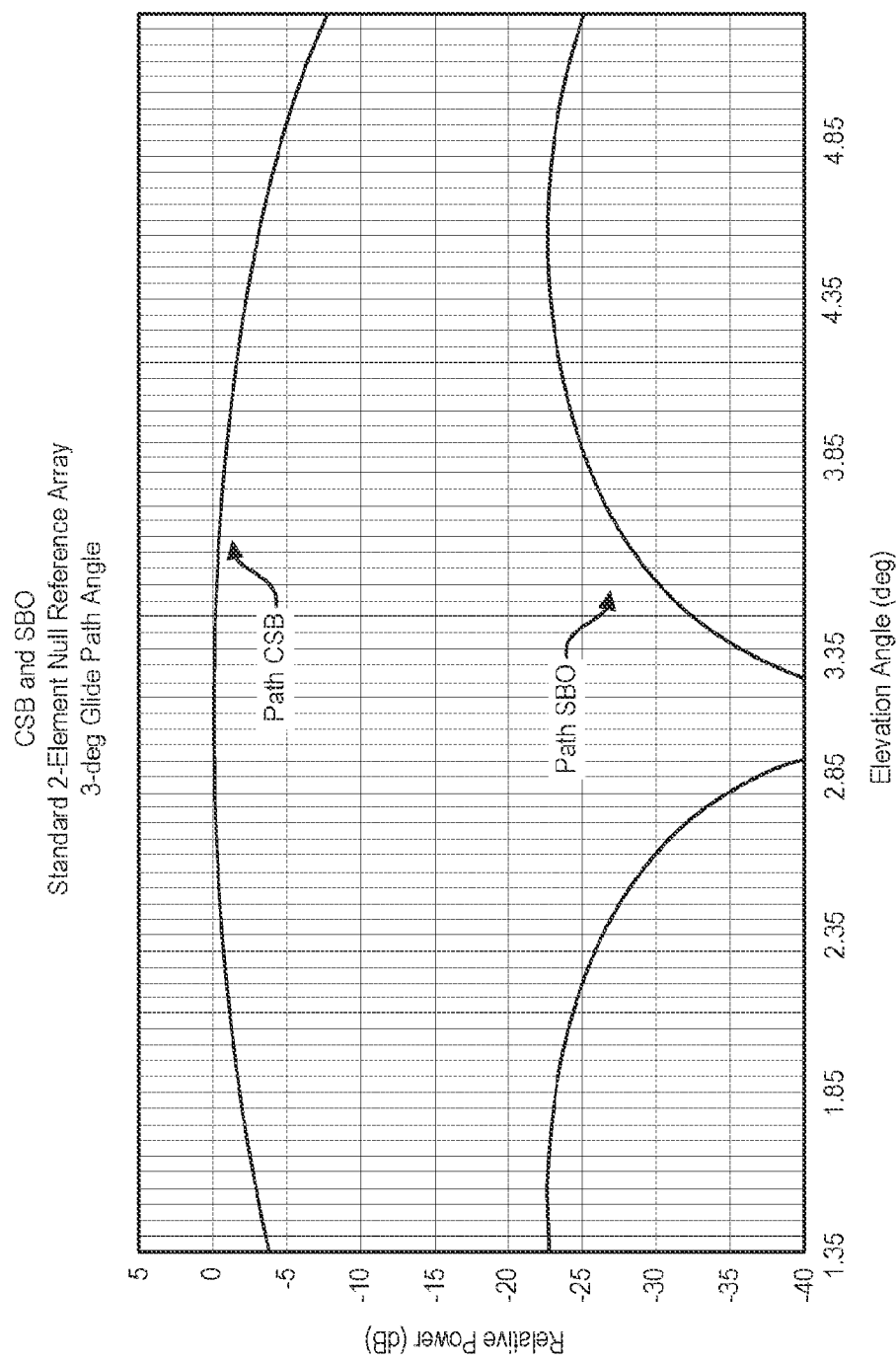
FIG. 17 is a plot chart illustrating an example CSB and SBO radiation pattern of a two-element null reference array of a glide slope in accordance with embodiments of the present disclosure.

FIG. 17 shows the same CSB and SBO radiation patterns for a standard Null Reference glide slope array on a tower. Note that for both the standard and modified array CSB and SBO radiated power are reduced at low elevation angles, with the effect somewhat more pronounced for the modified array. This is to be expected because the modified array antennas are mounted closer to the ground than those of the standard array.

Figure 18:
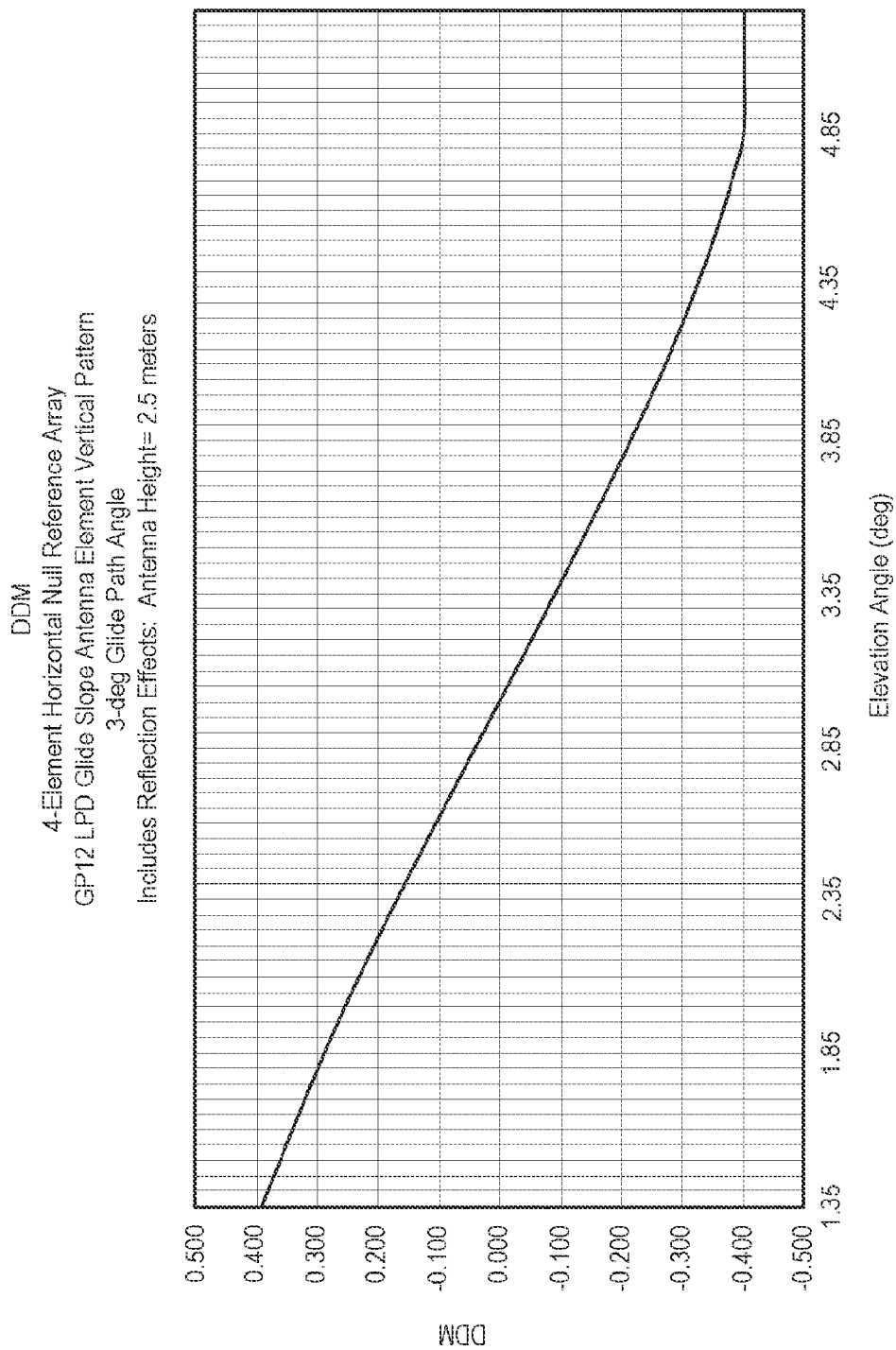
FIG. 18 is a plot chart illustrating an example DDM pattern of a four-element horizontal null reference array of a glide slope in accordance with embodiments of the present disclosure.

FIG. 18 shows DDM for the modified array with reflection effects included. Note that the DDM pattern is identical to the one without reflection effects. For a Null Reference array CSB and SBO are each fed to a single pair of antenna elements. Therefore, under the assumption of smooth and level ground the phase shift caused by interference will be the same for each antenna in the pair with no net effect on DDM. For a real system slightly different phase shifts could occur for each antenna in a pair, resulting in a slight shift in glide slope angle which would be corrected by phase adjustments during the tuning process.

Figure 19:
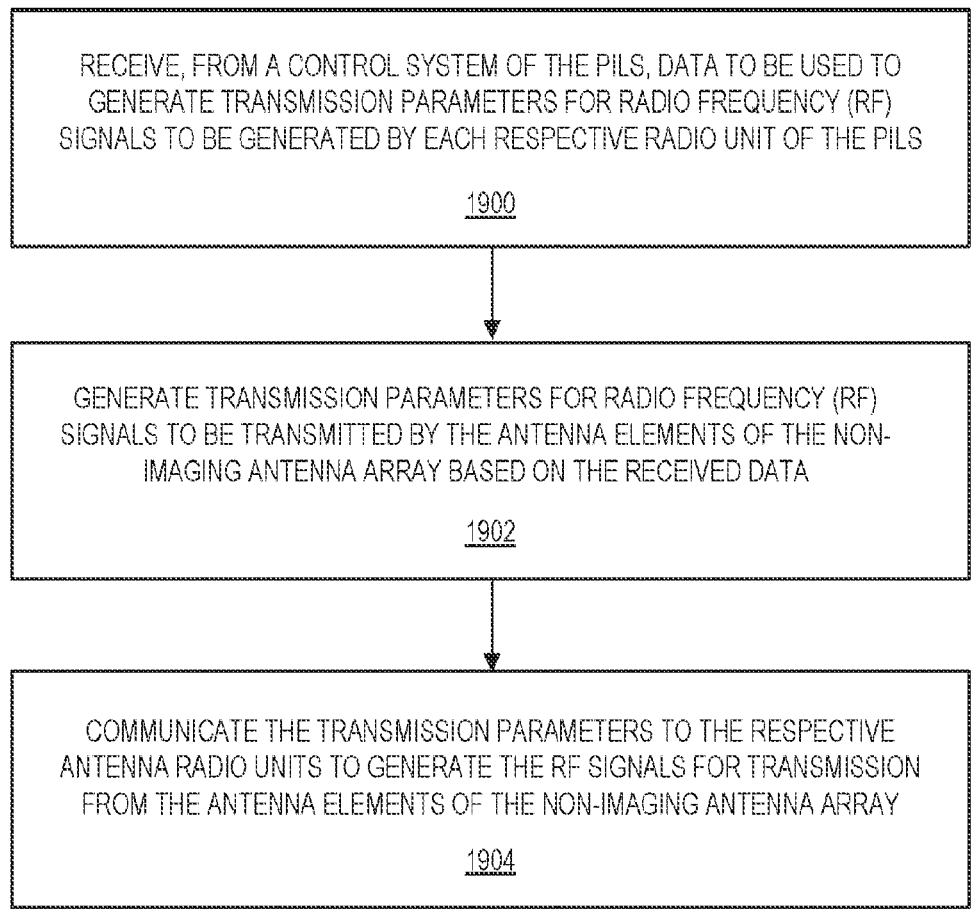
FIG. 19 is a flow chart illustrating a method performed by a glideslope of a portable instrument landing system (PILS) in accordance with embodiments of the present disclosure.

FIG. 19 illustrates a method performed by a glideslope of a portable instrument landing system (PILS) according to embodiments. The method includes receiving 1900, from a control system of the PILS, data to be used to generate transmission parameters for radio frequency (RF) signals to be generated by each respective radio unit of the PILS. The method also includes generating 1902 transmission parameters for radio frequency (RF) signals to be transmitted by the antenna elements of the non-imaging antenna array based on the received data. The method further includes communicating 1904 the transmission parameters to the respective antenna radio units to generate the RF signals for transmission from the antenna elements of the non-imaging antenna array.

Figure 20:
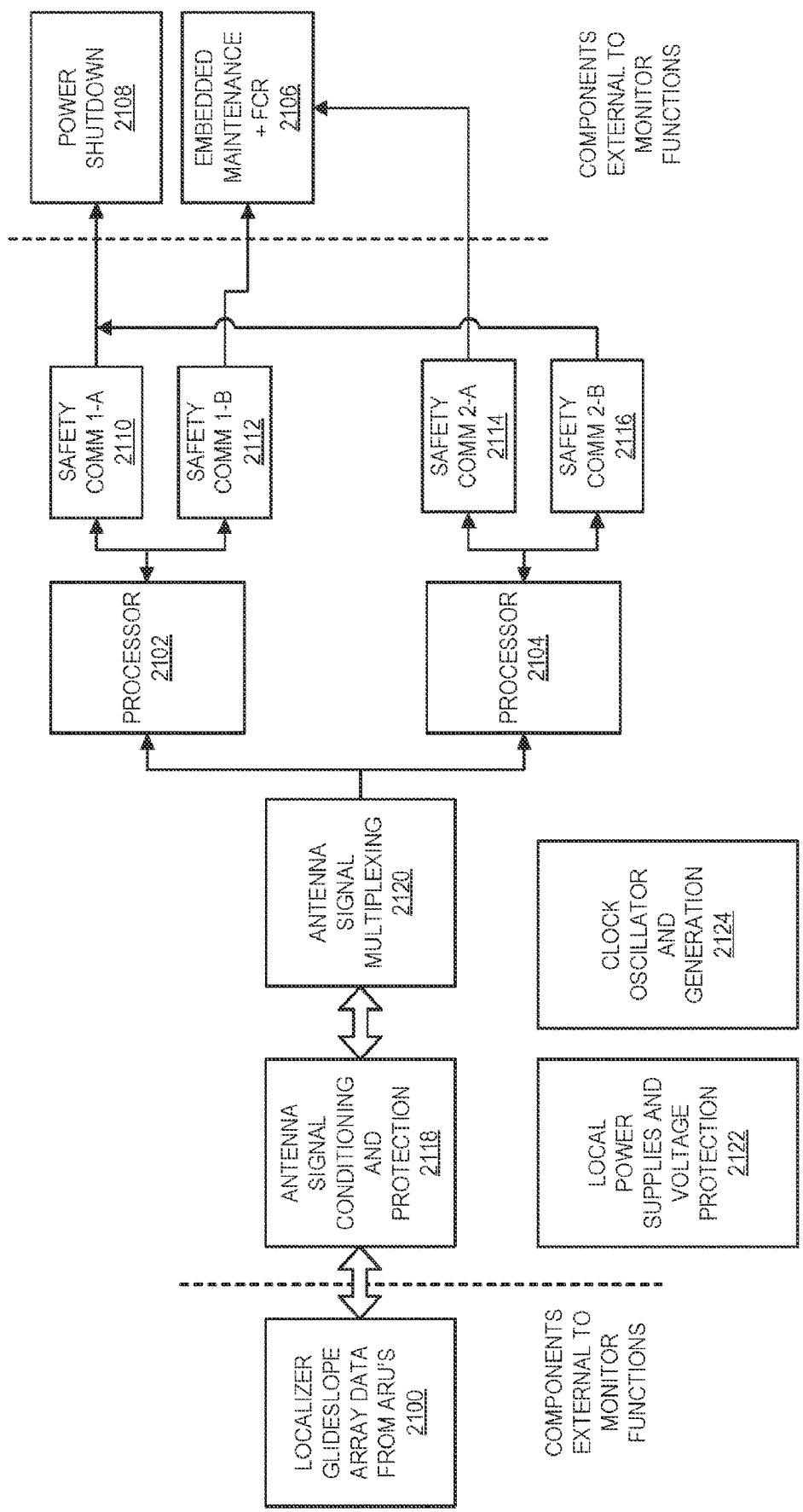
FIG. 20 is a block diagram illustrating an example architecture that performs signal acquisition, digital signal processing, signal conditioning and alarm detection in accordance with embodiments of the present disclosure.

FIG. 20 illustrates monitor architecture of a PILS Monitor and Control system 414 (localizer)/1014 (GP) of the PILS described herein that performs signal acquisition, digital signal processing, signal conditioning and alarm detection. The PILS Monitor architecture illustrated in FIG. 20 performs antenna signal multiplexing, signal conditioning and alarm detection for up to ten low-rate ARU RX channels utilizing the antenna signal conditioning and protection circuitry 2118, antenna signal multi-plexing circuitry 2120, processors 2102 and 2104, and communication interfaces 2110-2116. Local power supplies and voltage protection circuitry 2122 provides DC power and DC voltage signals to portions of the DPU and ultimately also the antenna radio units, as needed. Voltage protection circuitry 2122 also provides voltage protection from power surges and the like. Clock oscillator and generation circuitry 2124 produces the clock signal which is used to keep the DPU and the ARUs in proper synchronization. The PILS Monitor architecture illustrated in FIG. 20 requires significantly less microprocessor resources in comparison to known DVOR Monitor architecture that can signal condition the low-rate ARU RX signal information. The known DVOR data acquisition, digital signal processing and signal conditioning functionality acquires 8 channels of RF information at 240 ksps, performs multiple levels of digital signal processing before recovering the signal information. In contrast, the PILS Monitor architecture illustrated in FIG. 20 only acquires 10 channels of low-rate ARU Signal Information. The Monitor function of the PILS Monitor architecture of FIG. 20 is described below.

Signals 2100 arrive from the antennae's ARU units and are conditioned by circuitry blocks 2118, multiplexed for processing by antenna signal multi-plexing circuitry 2120, and distributed to two processors 2102 and 2104 which analyze the signal data and determine if the Signal in Space is within specification. The processors also communicate with the Embedded Maintenance CPU 2106 via communication interfaces 2112 and 2116. EM CPU 2106 (same as EM CPU 424 or EM CPU 1026 of FIGS. 4 and 10 respectively) is configured to provide flight check radio communication and auto-calibration, as well as performance and maintenance related information to Tower Control and Maintenance Personnel. The processors 2102 and 2104 also provide shutdown commands via communication interfaces 2110 and 2114 respectively to the power control system 2108 (may comprise power conversion circuitry 404 or 1006 of FIGS. 4 and 10 respectively) to remove the signal in space when the signal is detected as out of specification. The Monitor function includes Built-In-Test capability, temperature monitoring, and power protections circuits. The power shutdown provides failsafe shutdown decision and interfacing with the ARU power systems.

Figure 21:
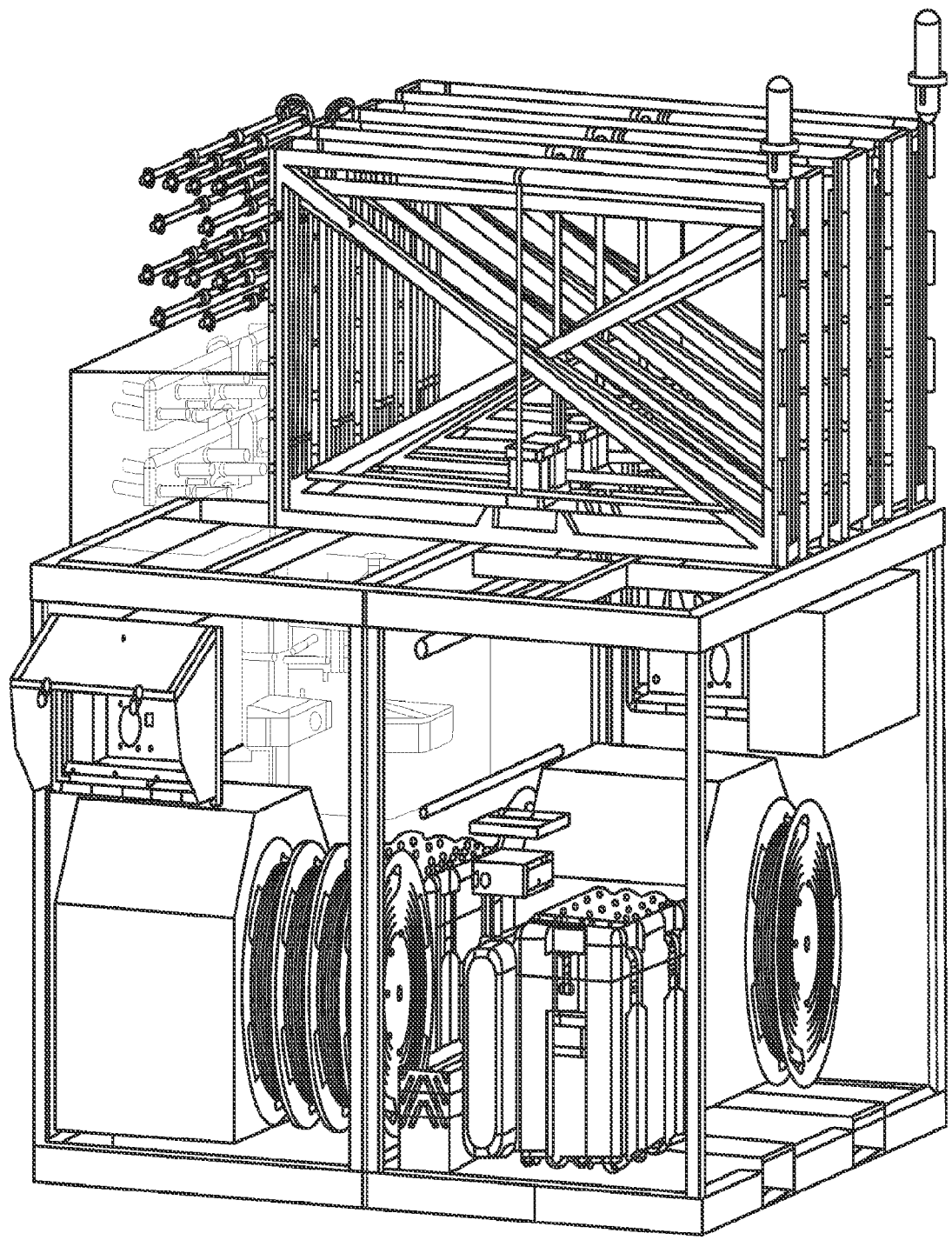
FIG. 21 is a first view of an example packaging solution of a localizer of the PILS system in accordance with embodiments of the present disclosure.
Figure 22:
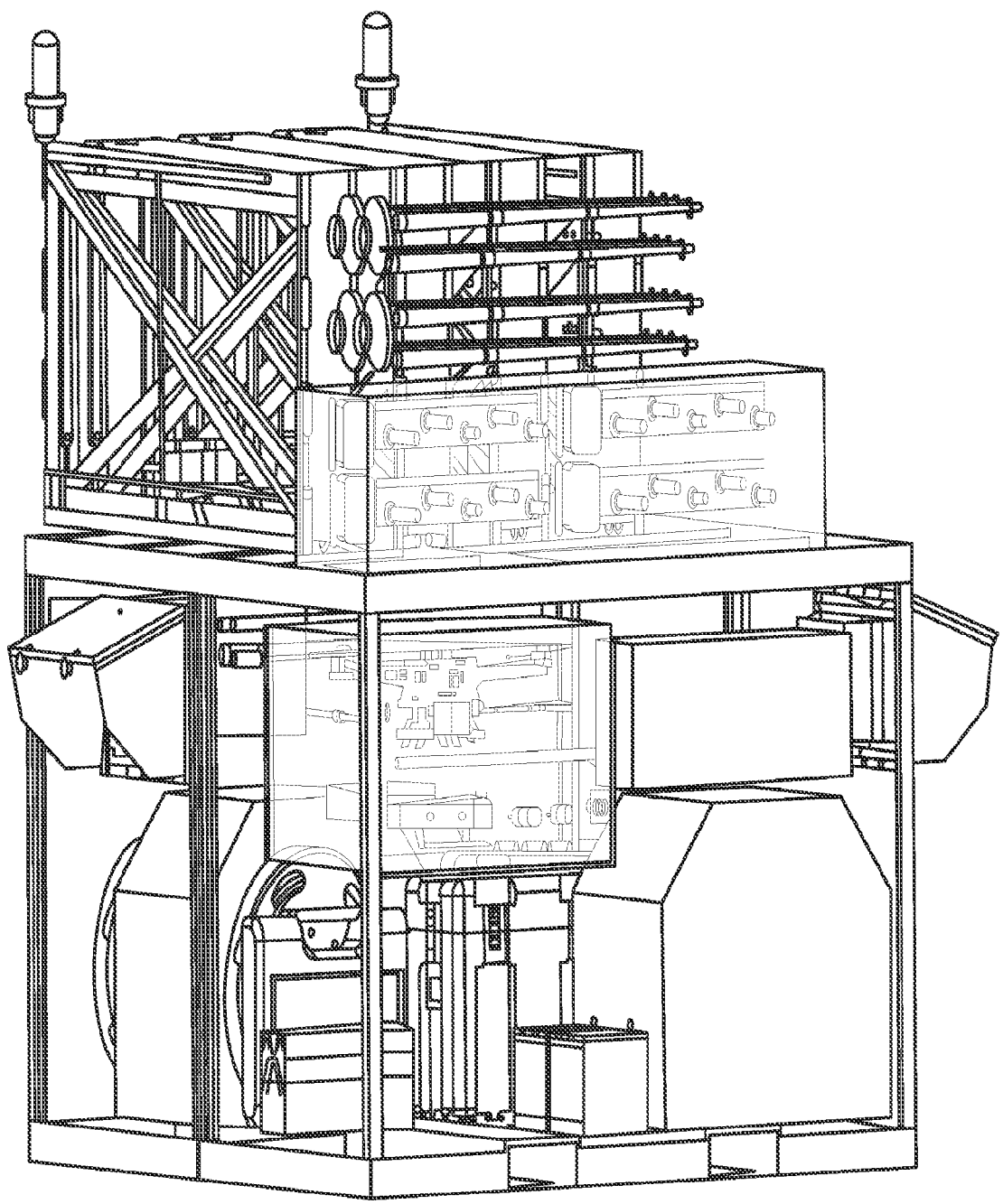
FIG. 22 is a second view of the example packaging solution of the localizer of the PILS system in accordance with embodiments of the present disclosure.

In accordance with embodiments, the plurality of antenna radio units, glideslope, glideslope non-imaging antenna array, localizer, localizer antenna array, and control system are configured to be transported on a cargo pallet prior to deployment. For example, the Portable ILS solution described herein is designed to be compliant with the single 463L pallet objective while including all equipment required to setup, tune and operate the system. FIGS. 21 and 22 illustrate different views of an example packaging solution. FIGS. 21-22 illustrate different views of two individual, fork liftable skids for transport to the fielded location from the air of land drop-off point.

The Localizer skid contains:
Folded localizer array with pre-installed and cabled antenna (with ARU) and single obstruction light at each end.
MEP-015A 1.5 KVA Generator, prewired into power selection control.
Battery backup
"PILS Control Box" that includes:
Input power selection logic
PILS electronics (Monitor & Control, Maintenance Computer . . . )
Wireless Data Radio
WDR antenna and associated mast
Anchor stowage
Installation tools
Spooled AC cable for driving anchors
The Glide Slope skid contains:
Four GP Elements in protective case with ARU
Four Tripods for GP element installation
Cable spools
MEP-015A 1.5 KVA Generator, prewired into power selection control.
Battery backup
"PILS Control Box" that includes:
  Input power selection logic
  PILS electronics (Monitor & Control, Maintenance Computer . . . )
  Wireless Data Radio
  Flight Check Radio
WDR antenna and associated mast
FCR antenna and associated mast
Anchor stowage
Installation tools
Spooled AC cable for driving anchors
Command and Control Subsystem:
  Ruggedized Laptop
  Drone with payload
  Drone control radio.
  Qty 2, Two-way radio set The purpose of this concept design activity was to ensure that the defined components of the system could be packaged in the defined space. The complete PILS packaging solution is designed as two skids of equipment that are separated at the drop-off point and moved to their respective Localizer and Glide Slope locations. Although the solution is shown to utilize a forklift, the solution could also be equipped with wheels and extractable tow bar in an alternative embodiment.

Figure 23:
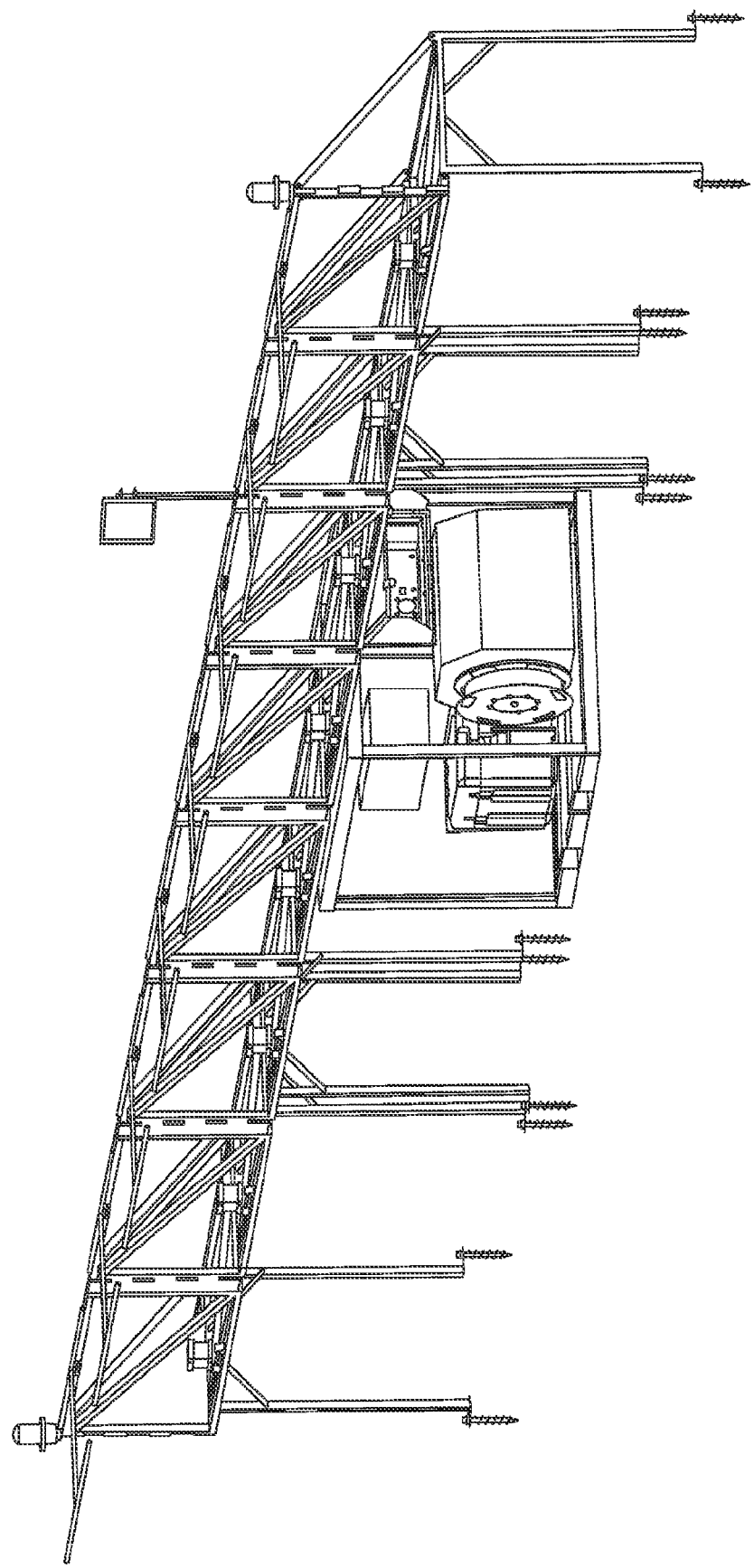
FIG. 23 is a view of an expansion of the packaged localizer of the PILS system in accordance with embodiments of the present disclosure.

According to some embodiments, the localizer antenna array is configured to one of collapse and expand. As illustrated in FIG. 23, the Localizer deployment is straight forward and easily accomplished by two trained personnel given that it involves a minimal set of tasks, including:
Unfolding each half of the array until fully extended
Expanding the back support of each frame section
Lowering of height adjustable frame supports (provided to accommodate uneven ground)

Anchoring of support of the support feet using augur-style anchors ideally suited for course-grained and fine-grained soil conditions Raising and locking of reach localizer antenna Raising and fastening of the directional WDR antenna and align in the direction of the Glideslope subsystem location Connection of any available shore power (but not required)

Powering of the Localizer subsystem through use of charged batteries for generator.

With the minimal set of tasks and use of provided impact driver to expedite installation of the anchors, the Localizer Subsystem with the packaging described above may be installed and ready for tuning in 30 to 45 minutes by a properly trained crew.

Figure 24:
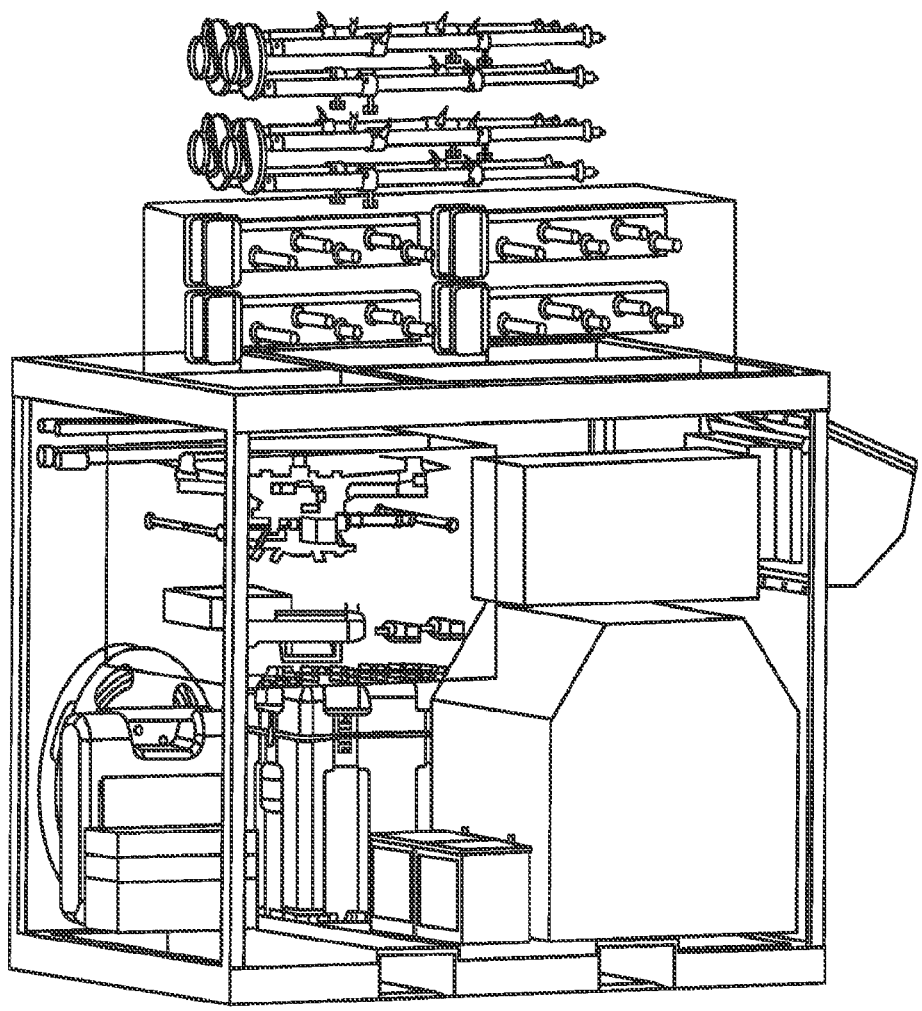
FIG. 24 is a first view of the example packaging solution of a glideslope of the PILS system in accordance with embodiments of the present disclosure.
Figure 25:
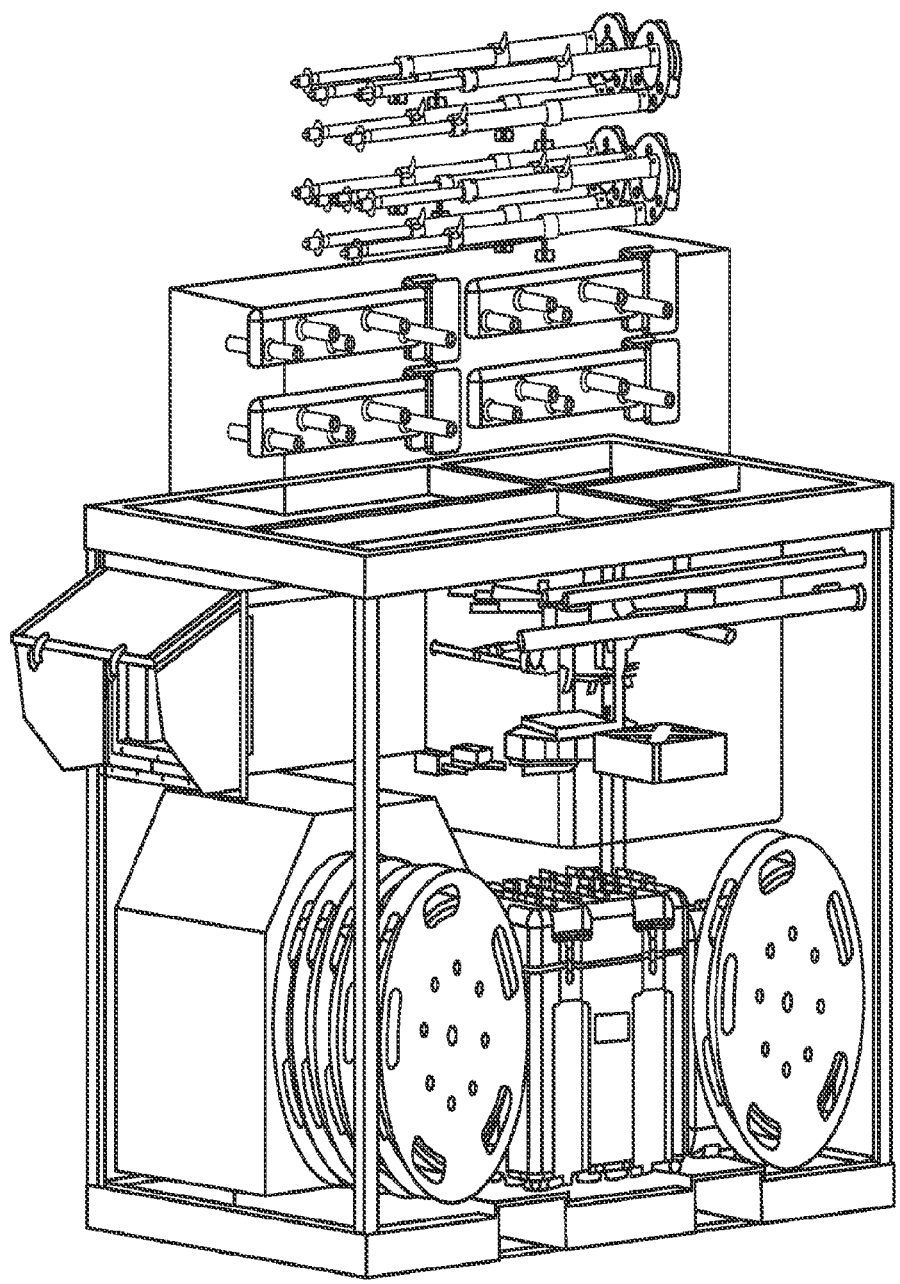
FIG. 25 is a second view of the example packaging solution of the glideslope of the PILS system in accordance with embodiments of the present disclosure.

FIGS. 24-25 illustrate two different views of the packed configuration of the Glide Slope and Command and Control Subsystems as staged for deployment. While the actual equipment shown (e.g. tripods) will be specifically designed to match the program needs for ground fastening (using auger style anchors as with Localizer) and payload, anticipated size has been used to ensure that the equipment can be stowed in the space allotted.

Deployment of the GP Antenna will utilize an installation aid that allows for a straight line to be established to align the four antenna with measurement marks to establish correct position parallel to an aircraft runway. Tripods will then be anchored, and antenna installed using a quick connect mounting shoe before being cabled and raised to its 2.5-meter desired height.

Once all four antenna are installed and cabled back to the GP Digital Processing Unit (e.g., DPU 1004 of FIG. 10), power is applied using battery power, on-board generator or shore power if available. As with the Localizer, installation of the GP antenna and cabling may be accomplished and ready for tuning in 30-45 minutes by properly trained personnel.

The PILS solution strives to minimize installation time as described above. As such, tear-down and repack is minimized by:

Use of the auger style anchors which are quickly removed using the supplied impact wrench Cables spools with cranking mechanism to quickly re-spool cables on their assigned drums Defined customized stowage locations for each piece of equipment that has to be stowed.

Minimizing the number of parts that have to be removed from the skids during deployment.

Figure 26:
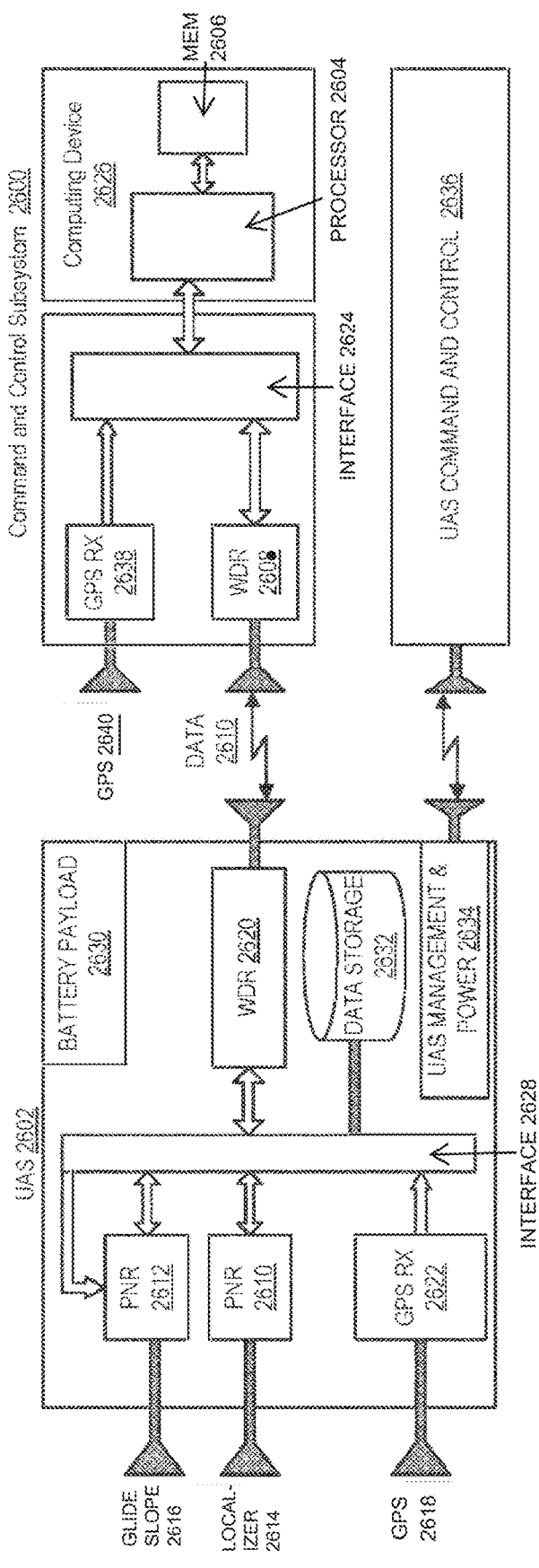
FIG. 26 is a block diagram illustrating an example command and control system (CCS) of the PILS system in accordance with embodiments of the present disclosure.

According to some other embodiments, a control system of a portable instrument landing system (PILS) is also described. The control system comprises a transceiver configured to communicate with an unmanned aircraft system (UAS). For example, FIG. 26 illustrates command and control system (CCS) 2600 configured to communicate with UAS 2602. The control system also comprises a processor and a memory, the memory comprising executable instructions that when executed by the processor causes the processor to operate to receive, from the UAS using the transceiver, measurement data associated with a first radio frequency (RF) signal transmitted by one of a localizer and a glideslope of the PILS. For example, CCS 2600 comprises a computing device 2626 comprising a processor 2704 and a memory 2706 that may comprise executable instructions that when executed by the processor 2604 causes processor 2604 to operate to receive, from UAS 2602 using Wireless Data Radio (WDR) transceiver 2608, measurement data associated with a first radio frequency (RF) signal (localizer 2614 and or glideslope 2616) transmitted by one of a localizer (102) and a glideslope (104) of PILS 100 of FIG. 1. FIG. 26 also illustrates CCS 2600 may comprise a GPS receiver 2638 configured to receive GPS signals 2640. Data from GPS RX 2638 and WDR 2608 are gathered by Interface 2624, which communicates the data to the Computing Device 2626.

According to embodiments, the memory also comprises executable instructions that executed by the processor causes the processor to operate to generate data to be used by one of the localizer and the glideslope to generate transmission parameters to be used by antenna radio units of the PILS directly coupled to the respective antenna elements of one of a localizer antenna array and a glideslope non-imaging antenna array to generate second RF signals to be transmitted by the antenna elements of the one of the localizer antenna array and the glideslope non-imaging antenna array. Continuing the above example, memory 2606 may also comprise executable instructions that when executed by processor 2604 causes processor 2604 to operate to generate data to be used by one of localizer 104 and glideslope 106 to generate transmission parameters to be used by antenna radio units of the PILS 100 directly coupled to the respective antenna elements of one of a localizer antenna array (e.g., antenna array 402 of FIG. 4) and a glideslope non-imaging antenna array (e.g. non-imaging antenna array 1002 of FIG. 10) to generate second RF signals to be transmitted by the antenna elements of the one of antenna array 402 and non-imaging antenna array 1002.

The memory also comprises executable instructions that when executed by the processor causes the processor to operate to communicate, to one of the localizer and the glideslope, the data to be used by one of the localizer and the glideslope to generate the transmission parameters. Continuing the above example, memory 2606 may also comprise executable instructions that when executed by processor 2604 causes processor 2604 to operate to communicate, to one of localizer 104 and the glideslope 102, the data to be used by one of localizer 104 and glideslope 102 to generate the transmission parameters.

According to some embodiments, the memory may also comprise executable instructions that when executed by the processor causes the processor to operate to communicate, to the UAS using the transceiver, an instruction to fly to specific locations relative to an aircraft runway co-located with the PILS and obtain measurement data associated with the second RF signals transmitted by one of the localizer and the glideslope. For example, memory 2606 may also comprise executable instructions that when executed by processor 2604 causes processor 2604 to operate to communicate, to UAS 2602 (see also Tuning Drone 110 of FIG. 1) using WDR 2608, an instruction to fly to specific locations relative to an aircraft runway, illustrated in FIG. 1, co-located with the PILS and obtain measurement data associated with the second RF signals transmitted by one of the localizer 104 and the glideslope 102. The memory may also comprise executable instructions that when executed by the processor causes the processor to operate to receive, from the UAS using the transceiver, the obtained measurement data responsive to communicating the instruction. In this example, processor 2704 receives, from UAS 2602/Tuning Drone 110 using WDR 2608, the obtained measurement data responsive to communicating the instruction. The memory may also comprise executable instructions that when executed by the processor causes the processor to operate to determine whether parameters of the second RF signals are within a range of values based on the obtained measurement data. Continuing the example, processor 2604 may determine whether parameters of the second RF signals are within a range of values based on the obtained measurement data.

The memory may also comprise executable instructions that when executed by the processor causes the processor to operate to determine the parameters of the second RF signals are not within a range of values based on the obtained measurement data. Continuing the previous example, processor 2604 may determine the parameters of the second RF signals are not within a range of values based on the obtained measurement data. The memory may also comprise executable instructions that when executed by the processor causes the processor to operate to generate maintenance data to be used by one of the localizer and the glideslope to generate maintenance transmission parameters to be used by the antenna radio units directly coupled to the respective antenna elements of the one of the localizer antenna array and the glideslope non-imaging antenna array to generate third RF signals to be transmitted by the antenna elements of the one of the localizer antenna array and the glideslope non-imaging antenna array.

For example, processor 2604 may generate maintenance transmission parameters to be used by the antenna radio units of PILS 100 directly coupled to the respective antenna elements of the one of the localizer antenna array (e.g., antenna array 402) and the glideslope non-imaging antenna array (e.g. non-imaging array 1002) to generate third RF signals to be transmitted by the antenna elements (e.g., 402L-402R, 1002 GP1-GP4) of the one of the localizer antenna array 402 and the glideslope non-imaging antenna array 1002 of PILS 100.

Figure 27:
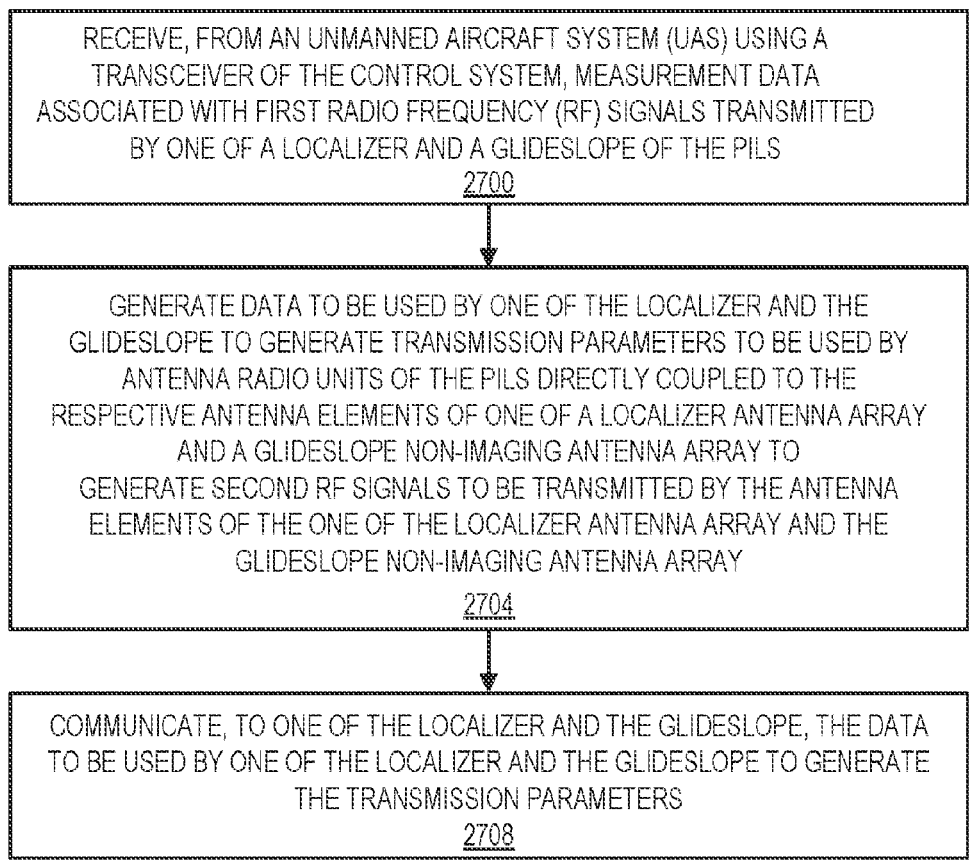
FIG. 27 is a flowchart illustrating a method performed by the command and control system of the PILS system in accordance with embodiments of the present disclosure.

FIG. 27 illustrates a method performed by a control system of a portable instrument landing system (PILS) in accordance with embodiment of the present disclosure. FIG. 27 illustrates the method includes receiving 2700, from an unmanned aircraft system (UAS) using a transceiver of the control system, measurement data associated with first radio frequency (RF) signals transmitted by one of a localizer and a glideslope of the PILS. The method also includes generating 2704 data to be used by one of the localizer and the glideslope to generate transmission parameters to be used by antenna radio units of the PILS directly coupled to the respective antenna elements of one of a localizer antenna array and a glideslope non-imaging antenna array to generate second RF signals to be transmitted by the antenna elements of the one of the localizer antenna array and the glideslope non-imaging antenna array. The method further includes communicating 2708, to one of the localizer and the glideslope, the data to be used by one of the localizer and the glideslope to generate the transmission parameters.

Figure 28:
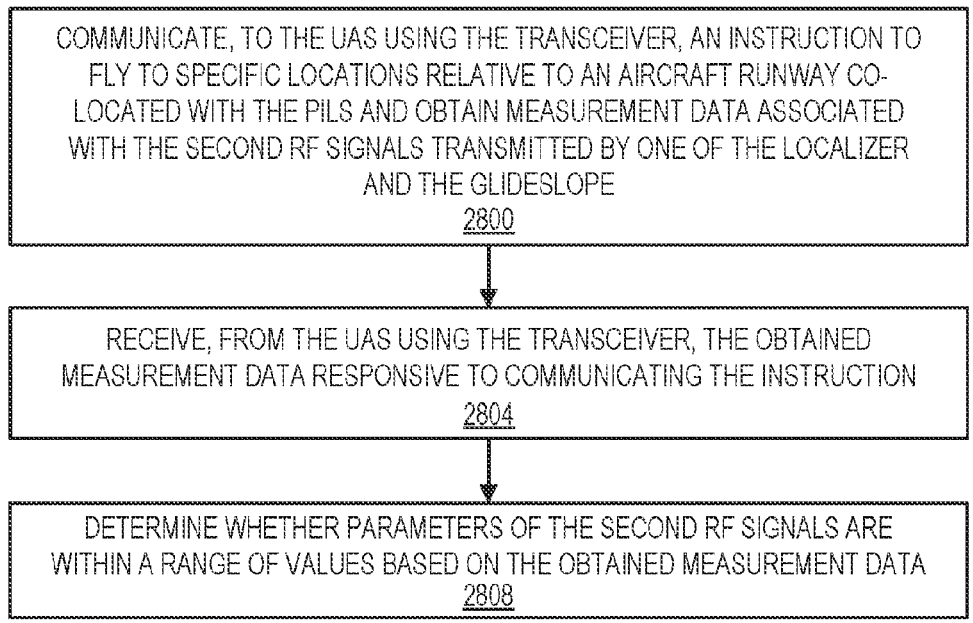
FIG. 28 is a flowchart illustrating a method of determining whether parameters of second RF signals are within a range of values based on obtained measurement data in accordance with embodiments of the present disclosure.

FIG. 28 illustrates the method may include communicating 2800, to the UAS using the transceiver, an instruction to fly to a specific location relative to an aircraft runway co-located with the PILS and obtain measurement data associated with the second RF signals transmitted by one of the localizer and the glideslope according to some embodiments. For example, CCS 2600 may communicate, to UAS 2602 using WDR 2608, an instruction to fly to a specific location relative to an aircraft runway co-located with PILS 100 and obtain measurement data associated with the second RF signals transmitted by one of localizer 104 and glideslope 102. The method may also include receiving 2804, from the UAS using the transceiver, the obtained measurement data responsive to communicating the instruction. Continuing the example, CCS 2600 may receive, from UAS 2602 using WDR 2608, the obtained measurement data responsive to communicating the instruction. The method may also include determining 2808 whether parameters of the second RF signals are within a range of values based on the obtained measurement data. For example, CCS 2600 may determine whether parameters of the second RF signals are within a range of values based on the obtained measurement data.

Figure 29:
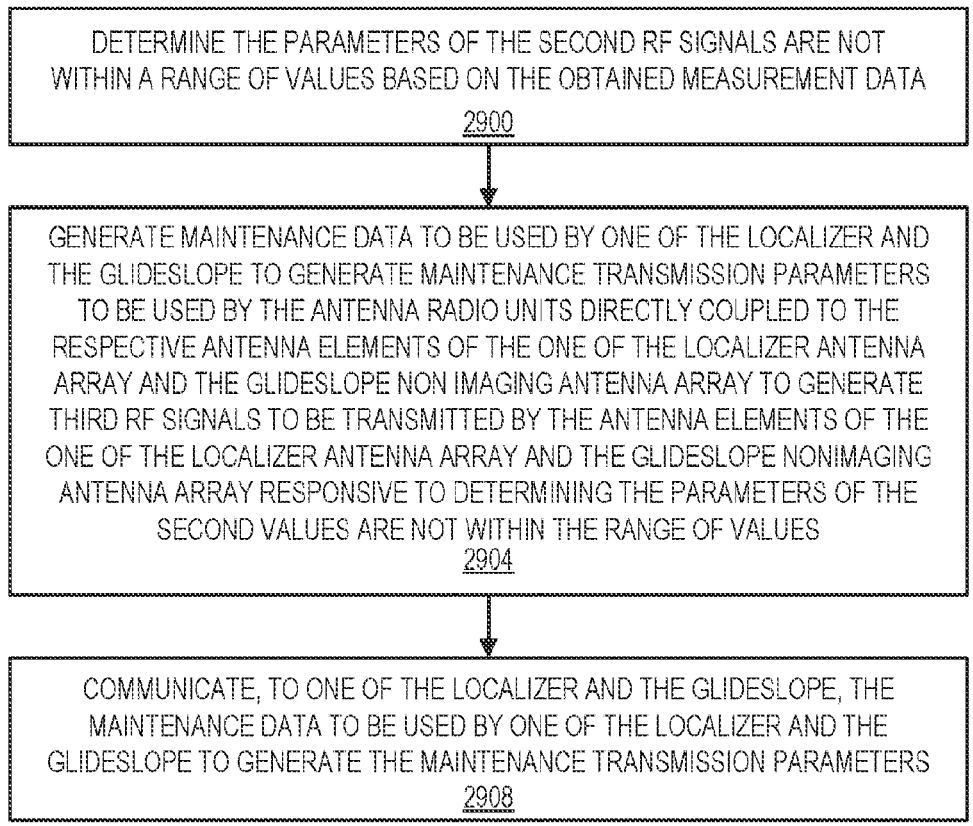
FIG. 29 is a flowchart illustrating a method of communicating maintenance data to be used by one of the localizer and the glideslope to generate the maintenance transmission parameters to one of a localizer and a glideslope in accordance with embodiments of the present disclosure.

FIG. 29 illustrates the method may include determining whether parameters of the second RF signals are within a range of values based on the obtained measurement data comprises determining 2900 the parameters of the second RF signals are not within a range of values based on the obtained measurement data according to some embodiments. Continuing the previous example, CCS 2600 may determine the parameters of the second RF signals are not within a range of values based on the obtained measurement data. The method may also include generating 2904 maintenance data to be used by one of the localizer and the glideslope to generate maintenance transmission parameters to be used by the antenna radio units directly coupled to the respective antenna elements of the one of the localizer antenna array and the glideslope non-imaging antenna array to generate third RF signals to be transmitted by the antenna elements of the one of the localizer antenna array and the glideslope non-imaging antenna array responsive to determining the parameters of the second RF signals are not within the range of values.

For example, CCS 2600 may generate maintenance data to be used by one of localizer 104 and glideslope 102 to generate maintenance transmission parameters to be used by the antenna radio units of PILS 100 directly coupled to the respective antenna elements (e.g., 402L-402R, 1002 GP1-GP4) of one of the localizer antenna array 402 and the glideslope non-imaging antenna array 1002 to generate third RF signals to be transmitted by the antenna elements of the one of localizer antenna array 402 and glideslope non-imaging antenna array 1002 responsive to determining the parameters of the second RF signals are not within the range of values. The method may further include communicating 2908, to one of the localizer and the glideslope, the maintenance data to be used by one of the localizer and the glideslope to generate the maintenance transmission parameters. For example, CCS 2600 may communicate, to one of localizer 104 and glideslope 102, the maintenance data to be used by one of localizer 104 and glideslope 102 to generate the maintenance transmission parameters.

Figure 30:
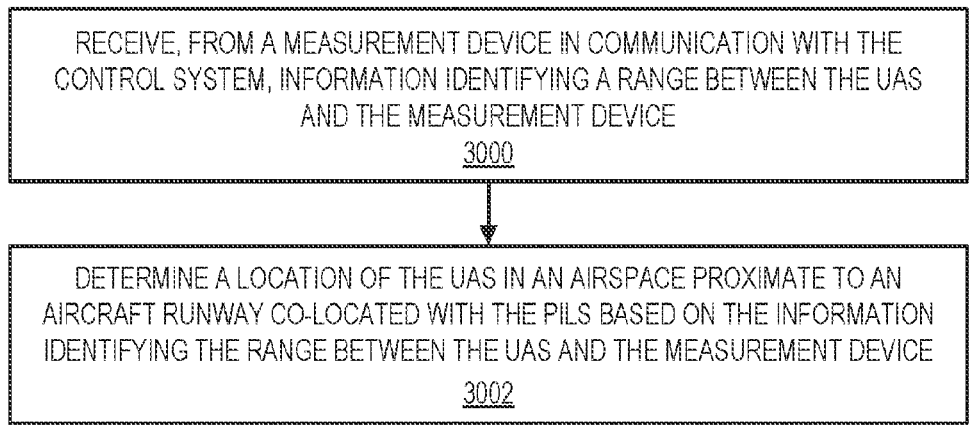
FIG. 30 is a flowchart illustrating a method of determining a location of a UAS in airspace proximate to an aircraft runway in accordance with embodiments of the present disclosure.

FIG. 30 illustrates the method may include receiving 3000, from a measurement device in communication with the control system, information identifying a range between the UAS and the measurement device. For example, CCS 2600 may receive from a measurement device in communication with CCS 2600, information identifying a range between UAS 2602 and the measurement device. Example embodiments of measurement devices are described in further detail below. The method may also include determining 3002 determining a location of the UAS in an airspace proximate to an aircraft runway co-located with the PILS based on the information identifying the range between the UAS and the measurement device. Continuing the example, CCS 2600 may determine a location of UAS 2602 in an airspace proximate to an aircraft runway co-located with PILS 100 based on the information identifying the range between UAS 2602 and the measurement device. In some embodiments, the CCS 2600 may receive an altitude measurement from the UAS 2602 and the CCS 2600 may further determine the location of the UAS 2602 in the airspace based on the altitude measurement from the UAS 2602.

Figure 31:
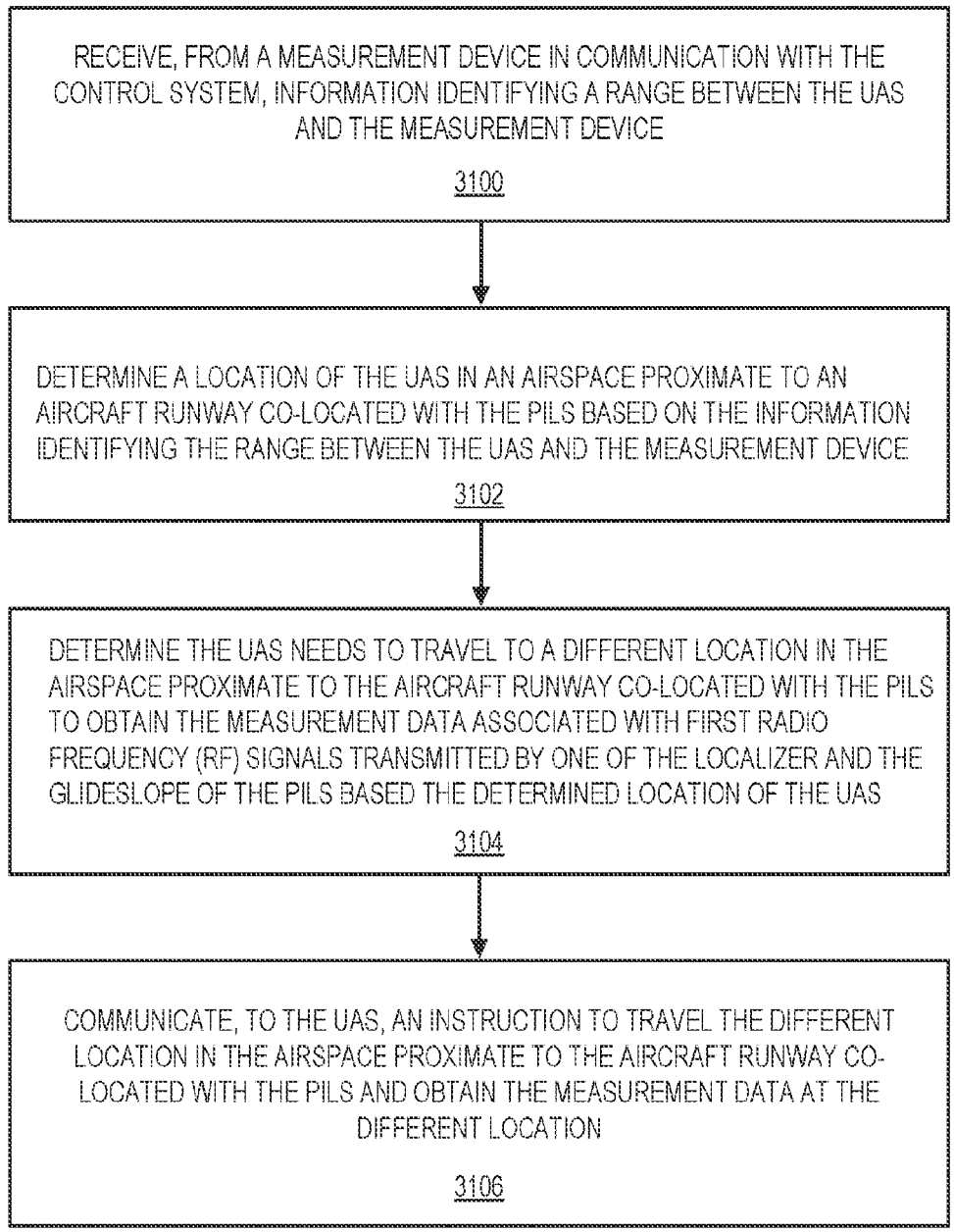
FIG. 31 is a flowchart illustrating a method of communicating an instruction to travel to a different location in the airspace to the UAS in accordance with embodiments of the present disclosure.

FIG. 31 illustrates the method may include receiving 3100, from a measurement device in communication with the control system, information identifying a range between the UAS and the measurement device. For example, CCS 2600 may receive from a measurement device in communication with the control system, information identifying a range between UAS 2602 and the measurement device. The method may also include determining 3102 a location of the UAS in an airspace proximate to an aircraft runway co-located with the PILS based on the information identifying the range between the UAS and the measurement device. Continuing the example, CCS 2600 may determine a location of UAS 2602 in an airspace proximate to an aircraft runway co-located with the PILS 100 based on the information identifying the range between UAS 2602 and the measurement device.

The method may also include determining 3104 the UAS needs to travel to a different location in the airspace proximate to the aircraft runway co-located with the PILS to obtain the measurement data associated with first radio frequency (RF) signals transmitted by one of the localizer and the glideslope of the PILS based the determined location of the UAS. Continuing the previous example, the CCS 2600 may determine UAS 2602 needs to travel to a different location in the airspace proximate to the aircraft runway co-located with the PILS 100 to obtain the measurement data associated with first radio frequency (RF) signals transmitted by one of localizer 104 and glideslope 102 of PILS 100 based the determined location of UAS 2602. The method may further include communicating 3104, to the UAS, an instruction to travel the different location in the airspace proximate to the aircraft runway co-located with the PILS and obtain the measurement data at the different location. For example, CCS 2600 may communicate, to UAS 2602, an instruction to travel to the different location in the airspace proximate to the aircraft runway co-located with PILS 100 and obtain the measurement data at the different location.

In some embodiments, the method may include determining the location of the UAS in the airspace comprises determining the location of the UAS in a GPS-denied airspace proximate to the aircraft runway co-located with the PILS based on the information identifying the range between the UAS and the measurement device. For example, UAS 2602 may be located in a GPS-denied airspace or an airspace in which GPS signals are unable to be obtained due to interference as discussed above. In some embodiments, the CCSS 2600 may receive, from the UAS 2602 an indication that the airspace the UAS 2602 is operating in a GPS-denied environment. In some embodiments, the indication may comprise measurements of interference received at a GPS receiver 2622 of UAS 2602.

It should be understood that PILS Tuning Drone 110 of FIG. 1 may be equivalent to the UAS 2602 illustrated in FIG. 26. It should also be understood that CCS 2600 may be equivalent to the CCS 106 illustrated in FIG. 1.

One of the most critical activities in the setup process of the PILS 100 is accurate tuning of the LOC and the GS signals. The traditional method to tune LOC and GS signals includes utilizing a Portable Navaid Receiver (PNR), a Theodolite or Laser Tracking System (LTS) and an aircraft with an ILS receiver. The present process is briefly described in the following paragraphs.

The PNR enables technicians to analyze signals received from ground-based Navaids in operational conditions. It enables users to analyze navigation parameters allowing them to perform an ILS or VOR ground check as well as perform spectrum analysis, make low frequency audio measurements, and perform data logging. The PNR utilizes advanced software-defined radio technology to measure and analyze ground-based Navaid signals for installation, flight-checks, and long-term maintenance. The PNR measures the difference in depth of modulation (DDM) and percent modulation, radio frequency (RF), audio frequency (AF), total harmonic distortion (THD), and other parameters. It includes a built-in spectrum and waveform display.

Once the PILS system has been installed the PNR is placed on the centerline of the runway roughly 500 ft from the LOC. The distance from the LOC to the PNR is then accurately measured. The LOC signal level is received by the PNR and is communicated by the PNR operator to the LOC technician. The LOC technician determines and implements the corrections necessary to insert a null in the Sideband Only (SBO) antenna pattern on the centerline. Historically, the corrections at the LOC have been made by cutting cables to modify the phase relationship of the antenna elements which is a cumbersome process. The next step is to calculate the required course width which is a function of the runway length. This is accomplished by placing the PNR, at a calculated and measured position on each side of the runway, perpendicular to the centerline at the initial PNR placement position. The offset distance is calculated based on the desired width and the exact distance to the PNR. The signal levels are again measured and communicated to the LOC technician, corrections are determined, and the antenna pattern is then corrected until the DDM is 0.155. Tuning of the integral monitor is also required which requires both cable cutting and other adjustments.

With the LOC properly aligned, an aircraft is used to tune the glide slope angle and width. The aircraft is flown toward the runway along the centerline from approximately 4nmi out. The aircraft uses the LOC signal to stay aligned with the centerline and flies at a constant altitude (roughly 500-800 ft). The aircraft is tracked by a theodolite or laser tracker to continuously measure the elevation angle of the plane. The plane has a receiver measuring the glide slope DDM. As the plane continues to fly toward the runway, the aircraft will eventually reach DDM=+0.175. At that point, the pilot radios the operator on the ground to record the elevation angle of the aircraft. As the plane continues on its path the DDM will pass through zero and eventually reach DDM=−0.175 where the elevation angle is again recorded. The GS is then determined by averaging the two elevation angles. Multiple runs of the aircraft are sometimes performed, and the glide slope angle is averaged over these runs. Adjustments are then made to the GS angle.

The above process involves multiple people, the use of a manned (piloted) aircraft and the manual trimming of cables to correct phases to modify the antenna pattern. In contrast, the present disclosure describes nearly fully automated tuning process using a rotary, Class 1 UAS instead of a manned aircraft. It is envisioned that a properly equipped UAS could provide the necessary data and greater flight path flexibility thereby eliminating the need for tuning flights with an aircraft. The same equipment can support also the periodic measurements necessary to support the ICAO and FAA recommendations for ILS systems, both in terms of ground and air measurements, thus helping in fully automatizing also the periodic checks.

As shown in FIG. 26, UAS 2602 comprises PNR 2610 and PNR 2612. PNR 2610 and PNR 2612 may be configured to simultaneously measure both the localizer 2614 and glide slope signals 2616 in space and transmit a variety of data to the ground. If GPS is available, the GPS signal 2618 can serve as a secondary verification of the UAS position. UAS 2602 also comprises a battery payload 2630, a data storage 2632. UAS 2602 may also receive instructions and communicate with UAS Command and Control device 2636 via a UAS management and power interface 2634.

In some embodiments, GPS receiver 2638 of CCS 2600 and GPS receiver 2622 of UAS 2602 are configured to detect interference with reception of GPS signals within an airspace proximate to the PILS system. In case of interference detection, GPS receivers 2638 and 2622 can be turned off. In some embodiments, interference detection may comprise detecting one of a code-to-noise ratio or code-minus-carrier value indicates inference within the airspace. The pseudo-range and range-rate can be monitored independently. Monitoring for interference detection may also occur on multiple satellite signal frequencies. In some instances, certain receiver front-end data are sensitive, such as AD-bin distribution and automatic-gain-control data and may indicate interference of reception of GPS signals in the airspace.

Thus UAS 2602 may also comprise a Wireless Data Radio (WDR) 2620, barometric altimeter and a PNRs 2610 and 2612. WDR 2620 interfaces with PNRs 2610 and 2612 via interface 2628. As with the previous method, the first step is to place the UAS 2602 on the centerline of the runway approximately 500 ft from the LOC. The UAS 2602 would receive the LOC signal and broadcast the PNR data at a periodic rate along with its altitude of the UAS 2602. The transmitted signal would be received at the ground control station or CCS 2600 via WDR. The data would be processed and the necessary corrections to phase and amplitude would be supplied to the LOC in a closed loop fashion. Since PILS 100 utilizes active antenna elements, the phase and amplitude of the elements can be automatically modified via software and processing circuitry to steer the antenna null on the runway centerline. This would result in a rapid and accurate convergence process for the LOC pattern null on the runway centerline. Next, the UAS 2602 is moved to the sides of the runway or off runway and a similar process is followed for the LOC width.

Once the LOC has been tuned, this signal can be fed to and used by the drone operator at the ground station to fly the UAS 2602 on the extended centerline of the runway. The UAS 2602 is then raised to an altitude of approximately 800 ft above the runway surface using the barometric altimeter of the UAS as a reference. From there the UAS 2602 is flown outward along the extended runway centerline using the LOC signal while measuring and transmitting glide slope DDM as described above for a traditional flight check.

A typical glide slope angle theta ($\theta$) is 3 degrees for a Category I approach. ICAO Annex 10 requires the ILS glide slope to be within 0.075 $\theta$ or ±0.225 degrees. If the UAS 2602 is flown at a relatively high altitude (e.g. 800 ft) a highly accurate elevation angle measurement can be obtained indirectly with relatively low accuracy range and altitude measurements. A barometric altimeter is suitable in this situation. A barometric setting used to obtain absolute altitude is not required, since only altitude with respect to the runway altitude is needed. There are several methods of determining the range to the UAS 2602 so that the elevation angle can be computed and used to align the GS. Three different range measurement techniques include: radar, laser tracking systems and transponders.

The Thales Squire™ radar is a man-portable, X-band, surveillance radar. Although the radar was originally designed as a ground surveillance radar, it has been modified and has demonstrated its capability to acquire an airborne target, lock-in on its azimuth position and then scan in elevation to determine the targets height. If the height accuracy is deemed insufficient, the range accuracy and UAS 2602 barometric altitude can be used to determine the elevation angle. When the radar is not being used to tune the PILS it could be used to provide perimeter security around the airfield.

Commercial LTS systems exist today that are designed to interface with UAS ground stations. This enables the LTS to obtain the programed and/or the controlled position of the UAS 2602. Knowing the rough location of the UAS 2602 via the ground control station, an LTS can steer to the rough location and initiate a search function, locate the UAS and the begin to track its position accurately in elevation.

A Third potential option is to use a transponder-based system to determine the range to the UAS 2602. A Multi-lateration and ADS-B Ground Surveillance System (MAGS) utilizes the Mode S Extended Squitter (1090ES) and ADS-B when available. The technology in the MAGS could be used to interrogate a MAGS receiver in the UAS 2602. This would be similar to a secondary surveillance radar, but vastly simpler since the interrogator would be omni-directional, and we are only measuring range to the UAS 2602.

End-to-End Unmanned Calibration

As discussed above, when a navigational aid is installed or modified, it must be calibrated using airborne equipment. Traditionally, this requires a pilot and/or crew in an airplane, as well as a technician on the ground. The pilot/crew uses a communication radio to communicate required changes to signal in space to the ground technician, who then manually changes the system parameters to effect the change.

During set-up of a new installed navigation aid the system needs to be adjusted to the respective site and installation in order to calibrate the radiated signals to be compliant with the applicable standards. As discussed above, an ILS consists of a localizer providing lateral guidance with respect to the runway centerline and a glideslope providing vertical guidance along the desired approach path. The guidance information results from different depth of modulation (difference in depth of modulation—DDM) of the amplitude modulated 90 Hz and 150 Hz tones to the carrier radiated by an antenna array. For localizer signals, an amplitude-modulated Morse code is broadcast, the identification signal. The different antenna elements of the array transmit the carrier which is differently modulated by the tones per antenna: At the right side of the localizer array (in approach direction facing towards the runway) the 150 Hz is pre-dominant while on the left side the 90 Hz tone is pre-dominant. For the Glide Path, the 150 Hz is pre-dominant when flying below the vertical path (i.e., pilot should 'fly up'), and the 90 Hz is pre-dominant when flying above the vertical path (i.e., pilot should 'fly down'). Exactly at the runway centerline (or at desired vertical path, i.e. 3°) both tones are received with same amplitude and the difference in modulation is zero. The modulation difference becomes different to zero aside of the nominal path since the spatial modulation of the received field changes.

The carrier frequency for the localizer is in frequency range of approximately 108 MHz to 112 MHz and approximately 329 MHz to 335 MHz for the glideslope. The individual antenna elements of the localizer and glideslope arrays are connected via a distribution unit to a single transmitter per localizer and glideslope. The calibration of the ILS involves:

Setting up the carrier frequency

Setting up the carrier signal amplitude

Setting up the modulated signal amplitude per antenna element by attenuator

Setting up the phase of the modulated signal through adjustment of the cable length For a vertical glideslope: Reference/Radio Datum Height (RDH) via height and distance between the antenna elements This procedure involves mechanical work for antenna position and cable length adjustment. The PILS concept described herein provides an easy enabler supporting a full end-to-end automatic calibration thanks to the signal generation at each individual radiating element of the GP and LOC arrays. The Portable Instrument Landing Systems (PILS) provides an ICAO compliant ILS Signal in Space (SiS) and fulfills the needs of military use for a small footprint, lightweight, fast and easy deployable, ICAO compliant CAT I Instrument Landing Systems (ILS) with a performance sufficient to perform precision approaches down to category I (CAT I). It provides a conventional ILS SiS and consists basically of the same core RF-radiating elements as a conventional ILS, namely a:

Localizer, LOC, providing a signal in the range 108 to 118 MHz, modulated by the 90 Hz and 150 Hz to generate a DDM as a conventional ILS. The feasibility of voice and IDENT-modulation is also considered.

Glideslope, GS, providing a signal in space in the range approximately 328.6 to 335.4 MHz modulated by the 90 Hz and 150 Hz to generate a DDM as a conventional ILS.

It further provides a command and control systems, CCS, to monitor the operational state and condition, and furthermore tuning subsystems allowing for automatic tuning of the PILS. The automatic tuning is provided as a closed loop to calibrate the SiS in combination with a Tuning Drone, TD, and a drone reference positioning systems. In some situations, a Flight Check Radio (FCR) may also be used in combination with the Tuning Drone if required. The drone position and received DDM are used to align the LOC and GS radiating elements such that a DDM along the flight path results, which is compliant with the intended approach procedure.

The PILS solution described herein may utilize the following key elements:

Lightweight, compact Localizer Subsystems using a Software Defined Radio (SDR) transceiver. SDR's provide dynamic flexibility in a small package which enables the performance of traditional antenna arrays to be realized through a distributed architecture by allowing tuning control of individual antenna elements.

Figure 32:
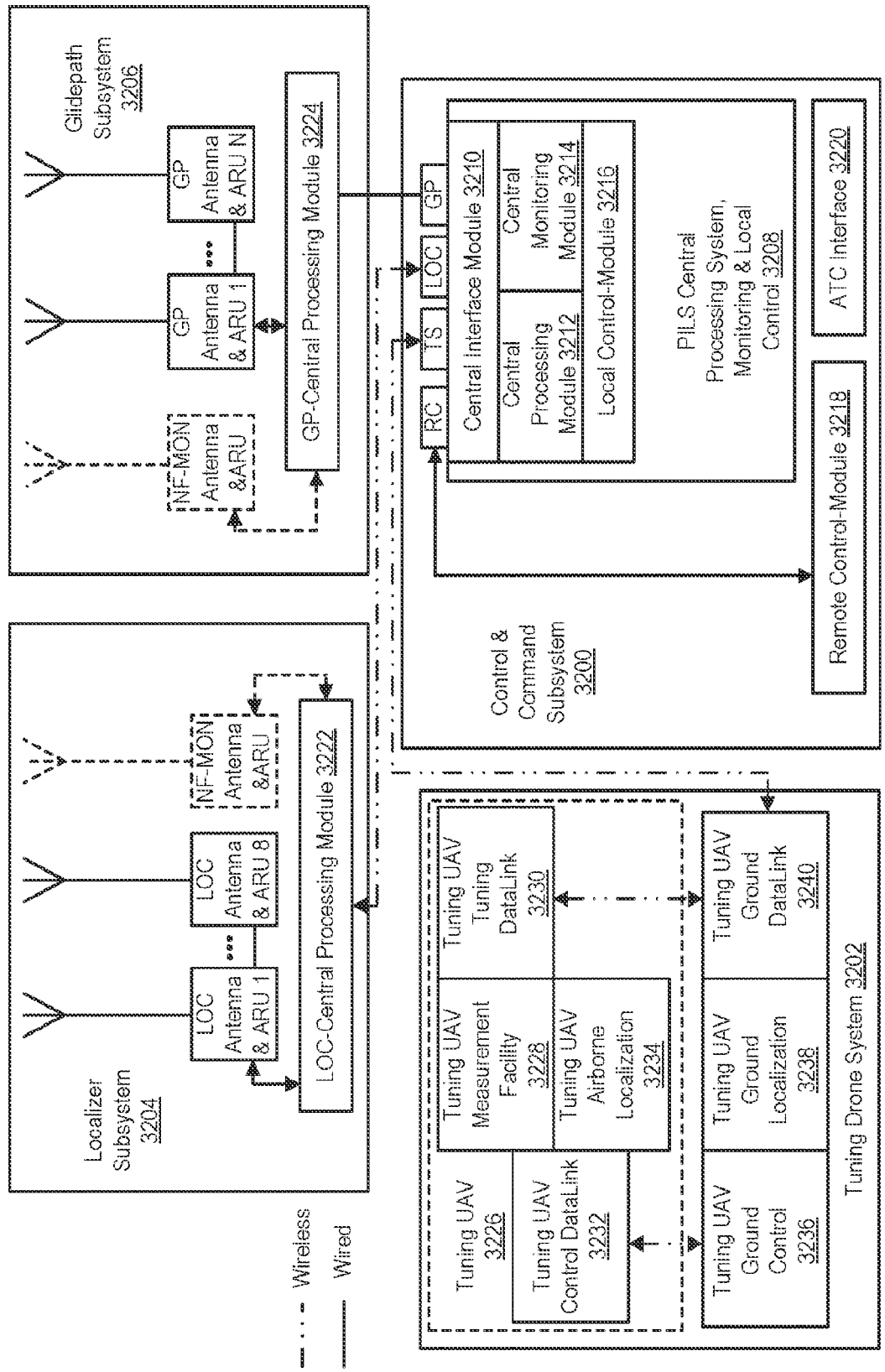
FIG. 32 is a block diagram illustrating a first example end-to-end unmanned calibration system (E2EUC) in accordance with embodiments of the present disclosure.
Figure 33:
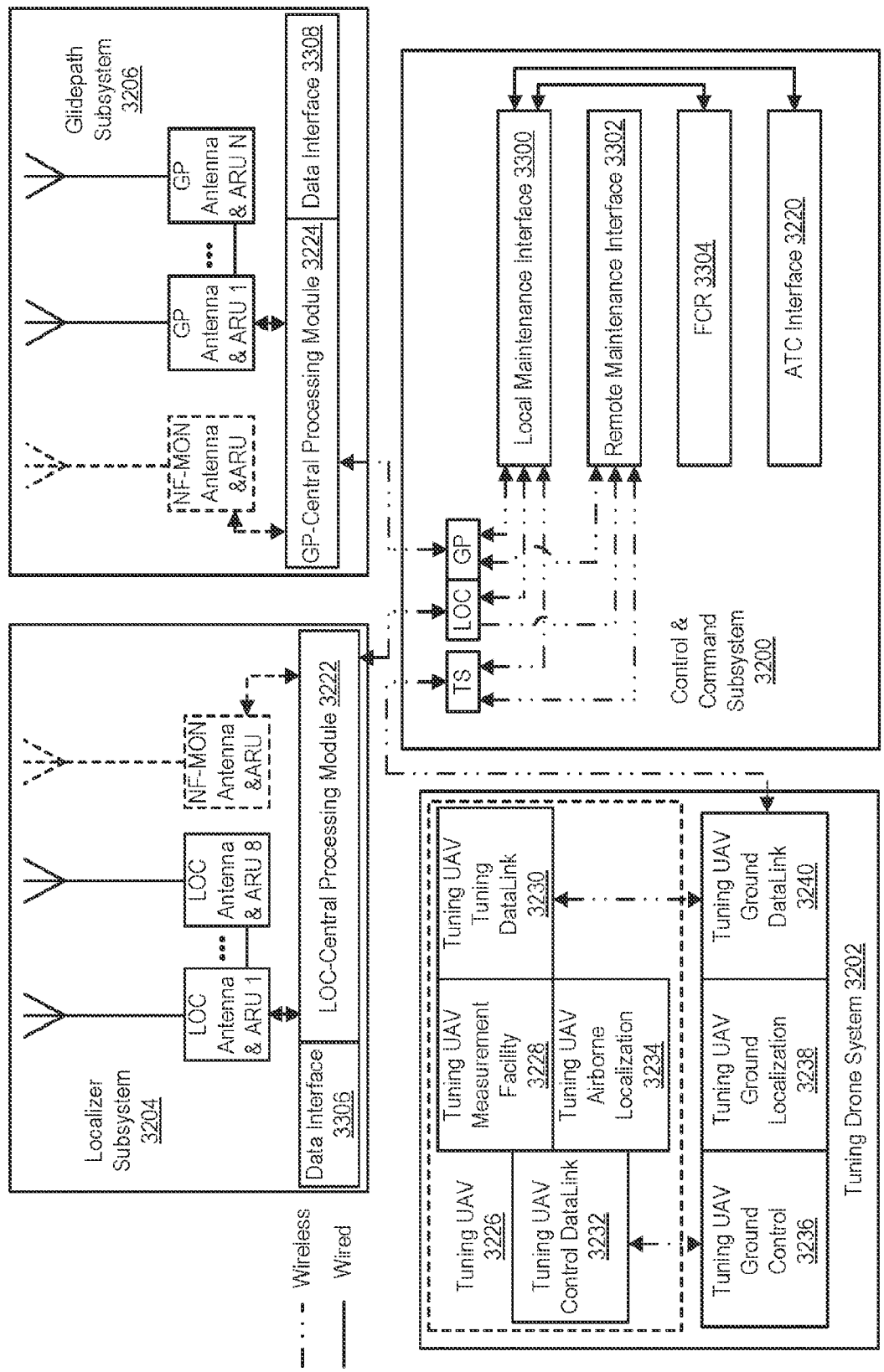
FIG. 33 is a block diagram illustrating a second example end-to-end unmanned calibration system (E2EUC) in accordance with embodiments of the present disclosure.

Non-imaging glide path utilizing an adaptive beam-forming network of ground-placed antennas to provide a conventional ILS glide path using the same SDR as for the localizer Sophisticated mechanical packaging allowing for minimum set-up and teardown times Automatic SiS calibration by a closed loop approach to allow for fast systems calibration FIGS. 32-34 illustrate various example configurations of a Control and Command Subsystem (CCS) 3200 in communication with a Tuning Drone Subsystem 3202, Localizer Subsystem 3204, and a Glidepath Subsystem 3206 according to some embodiments of the present disclosure. For example, FIG. 32 illustrates CCS 3200 comprises a PILS Central Processing System, Monitoring, and Local Control 3208. The PILS Central Processing System, Monitoring, and Local Control 3208 comprising one or more processors of the CCS, which monitors system status and allows local system control. FIG. 32 also illustrates CCS 3200 comprises a Central Interface Module 3210 which connects the various PILS subsystems to multiple interfaces within the CCS. CCS 3200 also comprises a Central Processing Module 3212 comprising one or more processors of the CCS and allows applications to run for controlling and viewing various aspects of the PILS. FIG. 32 also illustrates CCS 3200 comprises a Central Monitoring Module 3214 that monitors PILS system performance.

For example, Central Monitoring Module 3214 may be utilized to alert users of changes in system status and could be used to shutdown system components if operation becomes unsafe. FIG. 32 also illustrates CCS 3200 comprises a Local Control Module 3216 comprising a local maintenance interface by which a user may connect and acquire full control of the PILS system. FIG. 32 also illustrates the CCS 3200 comprises a Remote Control Module 3218 that provides an interface by which maintenance personnel located at a location which is remote to the airfield will connect to the PILS. Different subcomponents of this module are discussed below with regards to FIGS. 33-34. CCS 3200 also comprises, as shown in FIG. 32, an ATC Interface 3220 by which Air Traffic Control (ATC) personnel will connect to the PILS, to receive system status and limited control of the PILS system.

FIG. 32 also illustrates an example Localizer Subsystem 3204 comprises LOC Antenna & ARUs 1-8 which comprise individual antenna elements coupled respectively to individual ARUs, as described herein, which make up the LOC antenna array. Although Localizer Subsystem 3204 is illustrated with an example eight element antenna array, it should be understood that the localizer array may comprises more or less antenna elements depending upon design needs. Localizer Subsystem 3204 also comprises a LOC-Central Processing Module (CPM) 3222 comprising one or more processors of the LOC subsystem 3204. The CPM 3222 provides the communications link from the LOC to the CCS, by which the LOC is controlled—either manually by a maintenance user, or automatically as part of E2EUC. The CPM 3222 distributes commands to the individual antennas/ ARUs of LOC Antenna array. The CPM 3222 also provides LOC subsystem status to the CCS. In some embodiments, the CPM 3222 also contains the LOC Monitor function. FIG. 32 also illustrates Localizer Subsystem 3204 comprises a NF-MON Antenna & ARU operating as a Nearfield Monitor Antenna. The Nearfield Monitor Antenna is used to receive the SiS and feed it to the monitoring function of the LOC (within the CPM 3222 or within CMM 3214), to continuously monitor that the SiS is still accurate and safe for use.

FIG. 32 also illustrates Glidepath Subsystem 3206 comprises GP Antenna & ARUs 1-N which comprise individual antenna elements coupled respectively to individual ARUs, as described herein, which make up the GP antenna array. Glidepath Subsystem 3206 also comprises a GP-Central Processing Module (CPM) 3224 comprising one or more processors of the Glidepath subsystem 3206. The CPM 3224 provides the communications link from the GP to the CCS, by which the GP is controlled—either manually by a maintenance user, or automatically as part of E2EUC. The CPM 3224 distributes commands to the individual antennas/ ARUs of the GP Antenna array. The CPM 3224 also provides GP subsystem status to the CCS. In some embodiments, the CPM 3224 also contains the GP Monitor function. FIG. 32 also illustrates Glidepath Subsystem 3206 comprises a NF-MON Antenna & ARU operating as a Nearfield Monitor Antenna. The Nearfield Monitor Antenna is used to receive the SiS and feed it to the monitoring function of the GP (within the CPM 3224 or within CPM 3214), to continuously monitor that the SiS is still accurate and safe for use.

FIG. 32 also illustrates Tuning Drone System 3202 comprising a Tuning UAV 3226 which comprises a Tuning UAV Measurement Facility 3228. The Tuning UAV Measurement Facility 3228 comprises equipment which measures the RF signals from the navaids/surveillance equipment described herein. FIG. 32 also illustrates Tuning UAV 3226 comprises Tuning UAV Tuning DataLink 3230 comprising a data link by which measurement information (RF and possibly localization data) is transmitted between the air and the ground. FIG. 32 also illustrates Tuning UAV 3226 comprises Tuning UAV Control DataLink 3232 comprising a data link by which the drone's position in space is controlled. Tuning UAV 3226 also comprises a Tuning UAV Airborne Localization 3234 comprising airborne equipment which is used to determine the UAV's position in space (for example, but not limited to, a barometric altimeter) as shown in FIG. 32.

FIG. 32 also illustrates Tuning Drone System 3202 comprises a Tuning UAV Ground Control 3236 comprising a ground-based station from which the drone's position in space is controlled. In one embodiment, this may be via remote control driven by a pilot. In another embodiment, the drone's position in space is controlled by the CCS as described herein. FIG. 32 also illustrates Tuning Drone System 3202 comprises a Tuning UAV Ground Localization 3238 comprising ground-based equipment which is used to determine the UAV's position in space as described herein (for example, but not limited to, a theodolite). FIG. 32 also illustrates Tuning Drone System 3202 also comprises a Tuning UAV DataLink 3240 comprising a data link by which measurement and localization data are communicated to/from the UAV 3226, and in turn to/from the CCS 3200.

FIG. 33 illustrates CCS 3200 comprises, in some embodiments, a Local Maintenance Interface 3300 that comprises an interface by which maintenance personnel who are located at the airfield will connect to the PILS, similar to Local Control Module 3216 described above. FIG. 33 also illustrates CCS 3200 comprises, in some embodiments, a Remote Maintenance Interface 3302 by which maintenance personnel located at a location which is remote to the airfield will connect to the PILS, similar to Remote Control Module 3218 described above. FIG. 33 also illustrates CCS 3200 comprises, in some embodiments, a Flight Check Radio (FCR) interface 3304 by which a Flight Check Radio (FCR) may be connected to the PILS, to allow remote control of, and communications via the FCR. FIG. 33 further illustrates Localizer Subsystem 3204 and Glidepath Subsystem 3206 respectively comprise Data Interfaces 3306 and 3308 which enable data logged to be retrieved by a user, via the CCS. Further detail regarding operations of Data Interfaces 3306 and 3308 are described below with regards to FIGS. 34A-C.

Figure 34A:
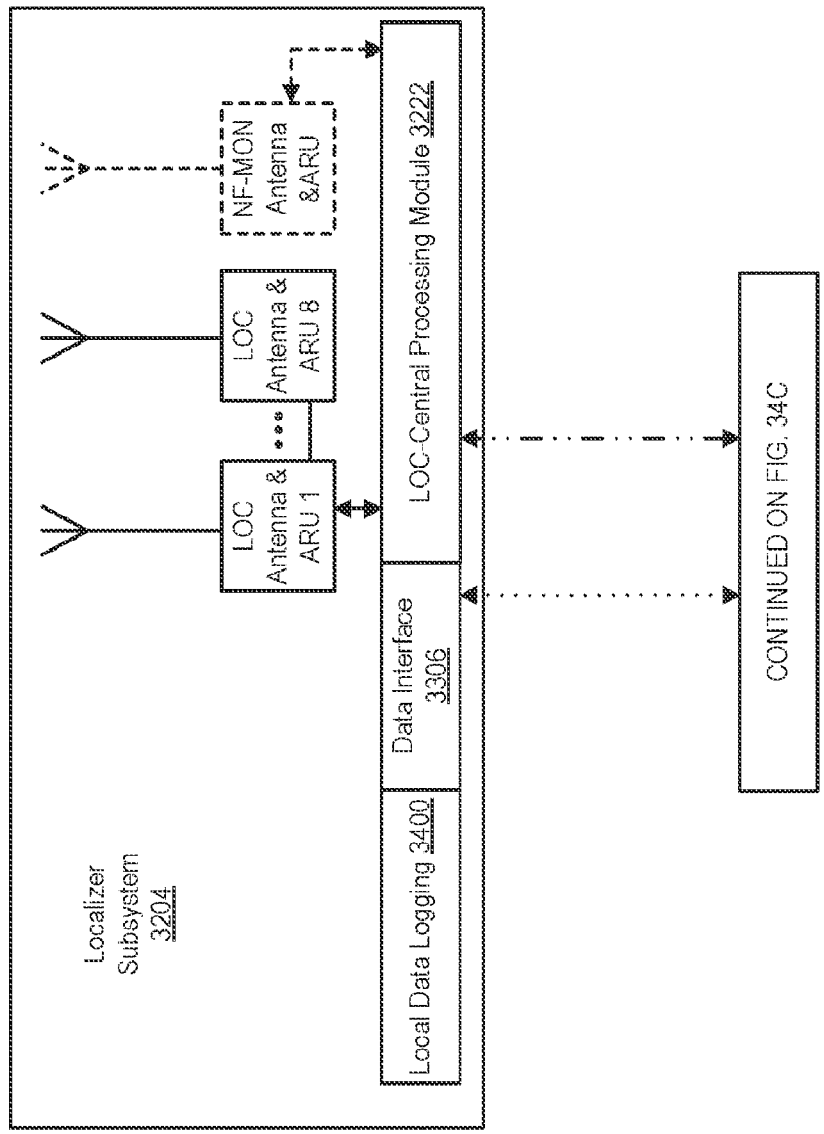
FIGS. 34A-34C are block diagrams illustrating a third example end-to-end unmanned calibration system (E2EUC) in accordance with embodiments of the present disclosure.

FIG. 34A illustrates Localizer Subsystem 3204 comprises, in some embodiments, a Local Data Logging function 3400 of the LOC that logs internal configuration and measurement data. This may be a sub-function of the CPM 3222. Data Interface 3306 comprises an interface by which the data logged by the Local Data Logging function 3400 can be retrieved by a user, via the CCS 3200. The CCS 3200 may also be used to configure what data is logged by the Local Data Logging function 3400 and the Data Interface 3306 would be used to send these configuration commands to the Local Data Logging function 3400.

Figure 34B:
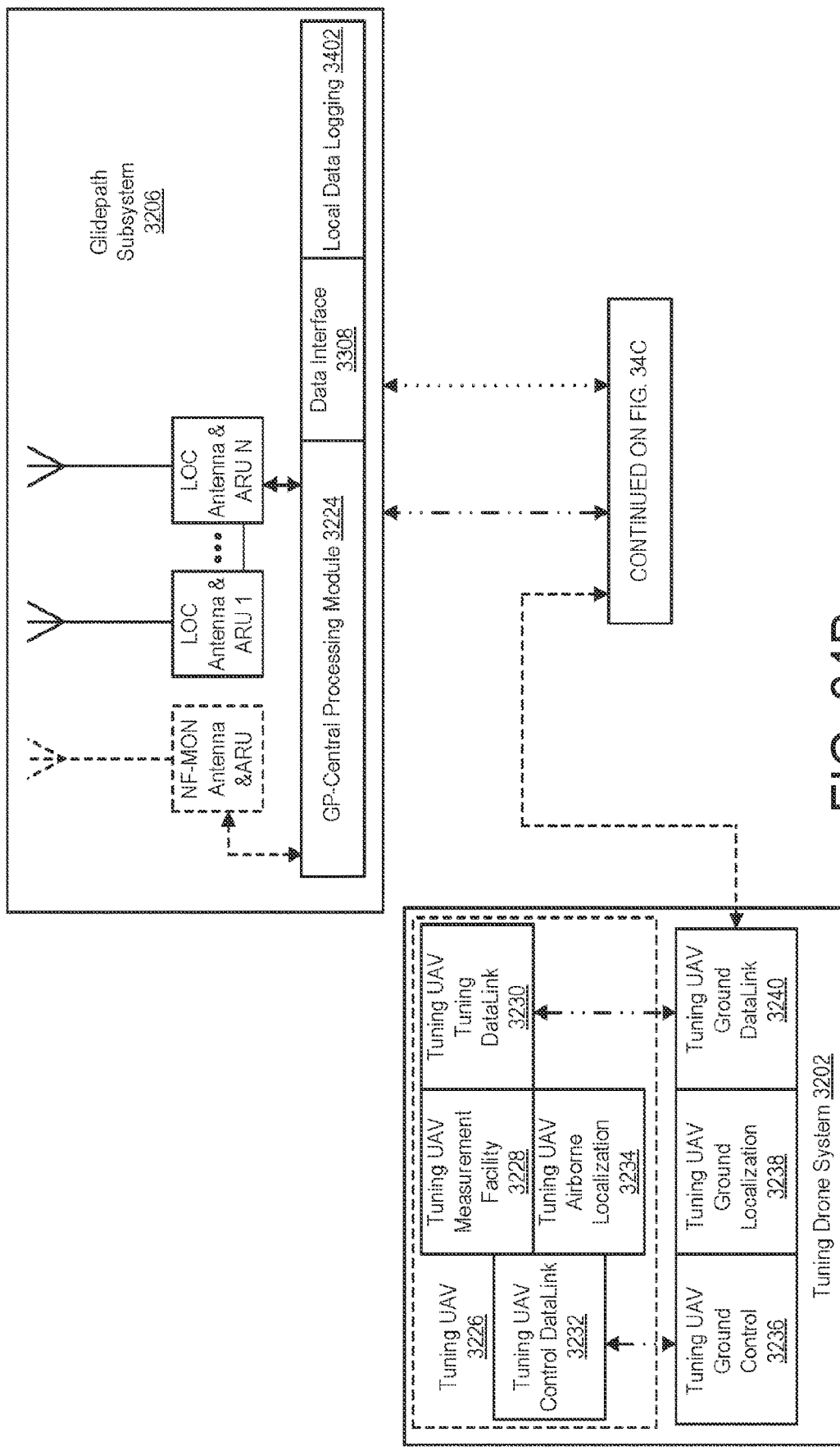

FIG. 34B illustrates Glidepath Subsystem 3206 comprises, in some embodiments, a Local Data Logging function 3402 of the GP that logs internal configuration and measurement data. This may be a sub-function of the CPM 3224. Data Interface 3308 comprises an interface by which the data logged by the Local Data Logging function 3402 can be retrieved by a user, via the CCS 3200. The CCS 3200 may also be used to configure what data is logged by the Local Data Logging function 3402 and the Data Interface 3308 would be used to send these configuration commands to the Local Data Logging function 3402.

Figure 34C:
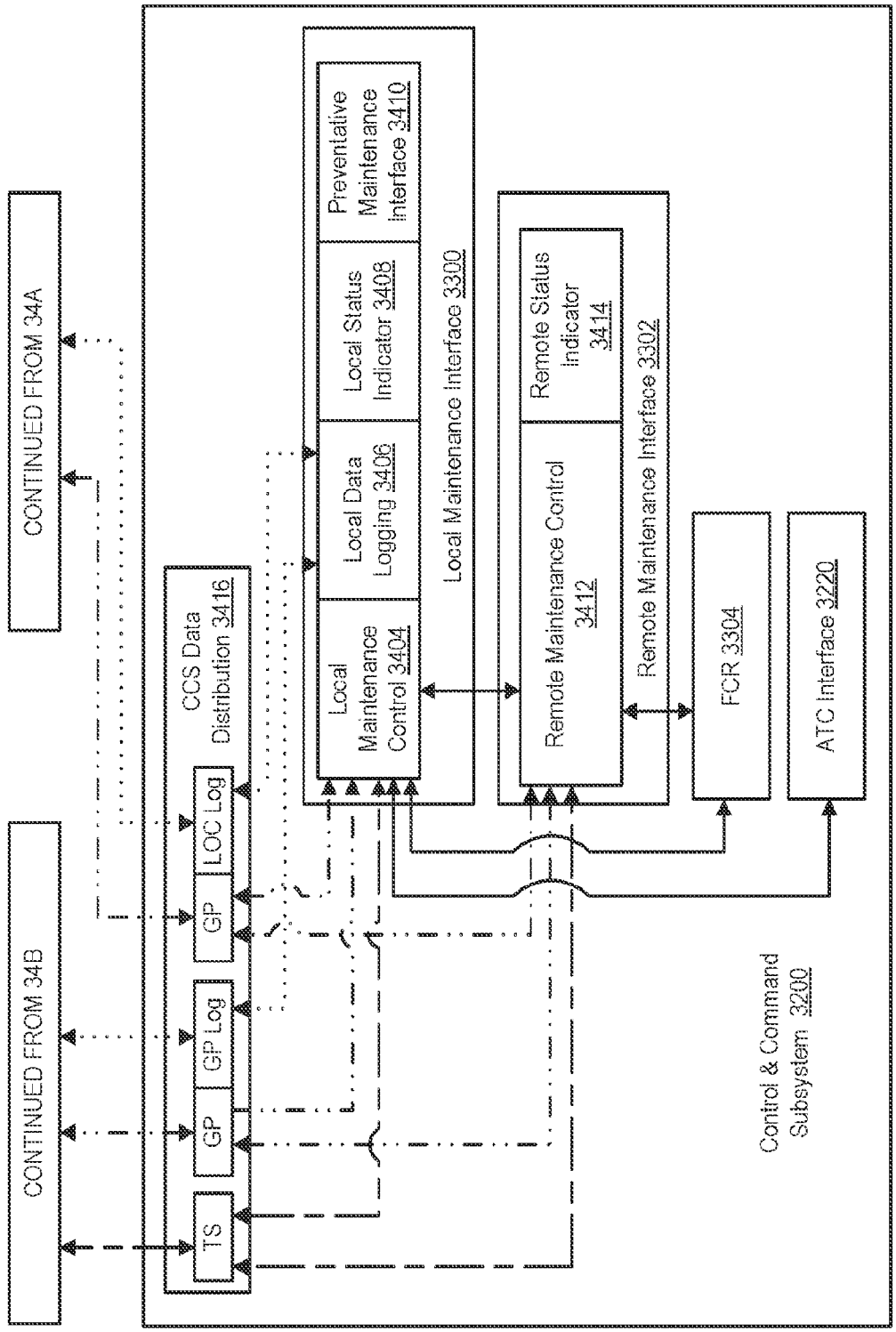

FIG. 34C illustrates Local Maintenance Interface 3300 comprises, in some embodiments, a Local Maintenance Control function 3404 comprising an interface by which a user may connect and acquire full control of the PILS system. FIG. 34C also illustrates Local Maintenance Interface 3300 comprises Local Data Logging 3406 comprising a local interface by which data logged by the various subsystem may be retrieved, and logging parameters may be configured. Local Maintenance Interface 3300 also comprises, as shown in FIG. 34C, Local Status Indicator 3408 comprising a local interface by which PILS system and subsystem status may be fed for display. FIG. 34C also illustrates Local Maintenance Interface 3300 further comprises Preventative Maintenance Interface 3410 comprising a local interface to which an external preventative maintenance solution may be connected, to continuously log and assess system data, for preventative maintenance purposes.

FIG. 34C also illustrates Remote Maintenance Interface 3302 comprises a Remote Maintenance Control interface 3412 by which a user may connect and acquire full control of the PILS system. Remote Maintenance Interface 3302 also comprises, as shown in FIG. 34C, a Remote Status Indicator interface 3414 comprising an interface by which PILS system and subsystem status may be fed for display. FIG. 34C also illustrates CCS 3200 comprises, in some embodiments, a CCS Data Distribution block 3416 comprising an intermediate distribution block which connects the various PILS subsystems to the multiple interfaces within the CCS 3200 described above.

When a navigational aid is installed, ground checks are performed to tune the system as closely as possible before a flight check is performed from the air. However, ground checks are not sufficient to fully tune the system; so a flight is always required to fine-tune the signal-in-space and commission the system. As previously described above, flight checks are:

Difficult to schedule—very few organizations and aircraft are authorized to perform flight checks Time-consuming—ground crew must wait for the pilot to arrive. When pilots take required breaks, they must land and take off again.

Very expensive—hiring the aircrew and renting a plane for several hours or days is costly.

Dangerous to perform in hostile environments—in military applications the navigational aid may be deployed in a hostile environment, where it may be risky for a manned aircraft to perform a flight check.

The human technician on the ground making system changes may require some patterns to be flown several times to verify changes, extending flying time. The human's adjustments may be incorrect, which may extend flight time even longer. Even the distributed-amplifier architecture of the Portable Instrument Landing System (PILS) could make for a cumbersome manual-tuning process.

Some navigational aid deployment scenarios may allow the navigational aid to be put into service without requiring a manned flight check. This can alleviate all of the flight check inconveniences listed above. Where flight check is still required for commissioning, the End-to-End Unmanned Calibration (E2EUC) includes measurements taken from the air, which will tune the system more accurately than can be done with flight checks alone. This will reduce flight check time. The automated system tuning performed by E2EUC reduces or eliminates human error risks.

E2EUC calculates the parameter changes required for all transmitting elements in the navigational aid—whether there is a single transmitter, like with a traditional Localizer, or there is a distributed transmitter architecture, like with PILS. It is likely possible for the E2EUC algorithms to calculate the required changes to the signal(s) in space more quickly and with less error, than a human operator. E2EUC will automatically perform an airborne check to validate changes made to the signal in space. In addition, the E2EUC system described herein allows the navigational aid to be tuned in hostile environments, without risk of life to humans in the air.

Figure 35:
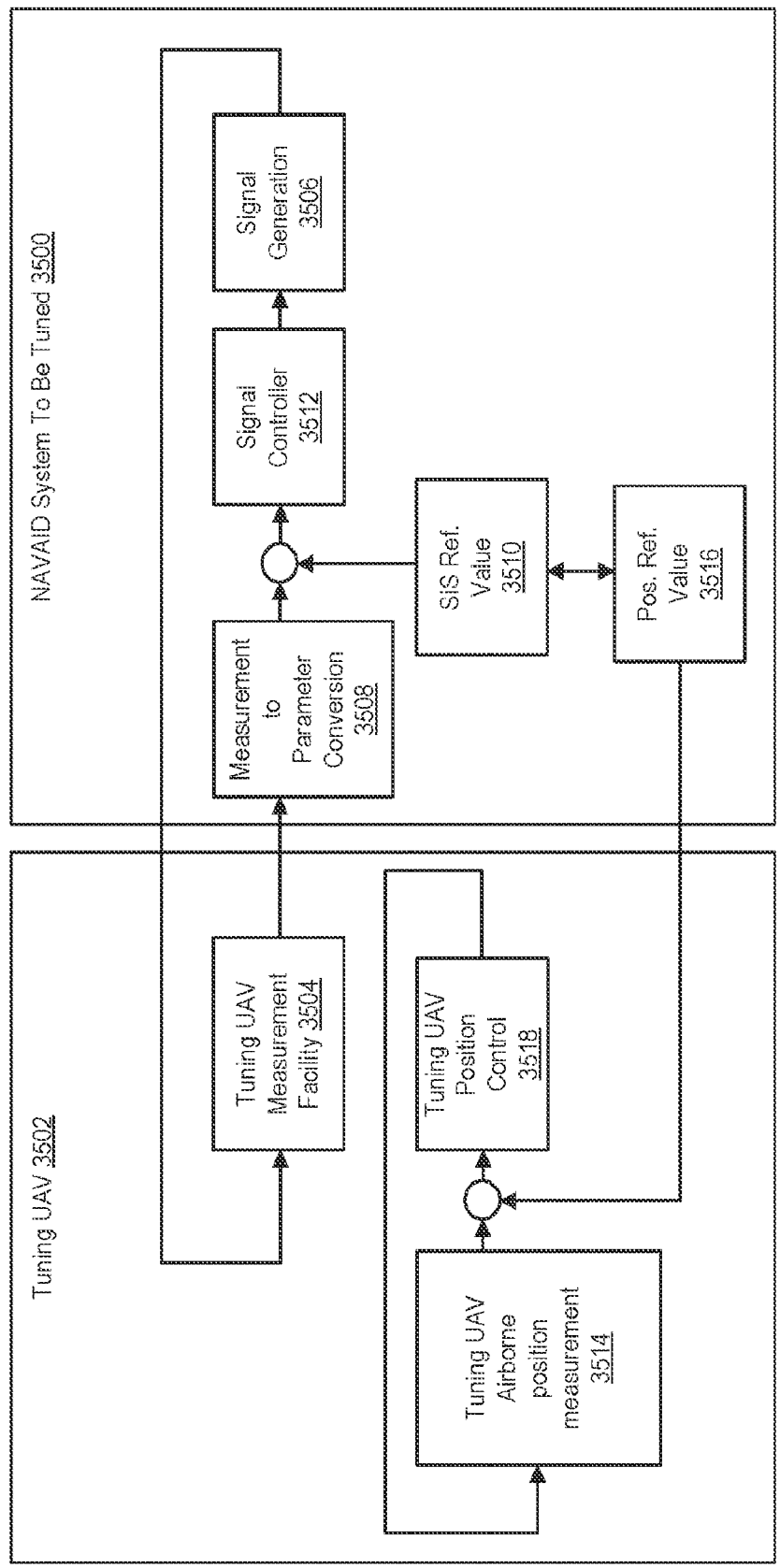
FIG. 35 is a block diagram illustrating an example control loop structure for a closed loop drone-based tuning of a navigation in accordance with embodiments of the present disclosure.

FIG. 35 illustrates an example control loop structure for a closed loop drone based tuning of a navigation aid system 3500 to be tuned according to some embodiments. The tuning UAV 3502 receives the radiated signal (signal in space (SiS) generated at 3506) at a certain location (step 3504). The Tuning UAV 3502 transmits the measurement to the NAVAID System to be Tuned 3500, where it is converted to the desired measurement parameters (step 3508). The measured parameters are then compared to the desired signal (SiS Ref Value 3510), and, if the received signal deviates from the desired, certain system parameters will be adjusted to reduce this difference to zero (step 3512). Tuning UAV Position Control 3518 compares desired position 3516 with current position 3514, and commands changes to position of the Tuning UAV 3502 until the error is reduced to zero.

The position control loop is coupled with the signal control loop. The desired signal is related to the location by a functional relationship. For the ILS this functional relationship is defined by the Difference in Depths of Modulation (DDM) over angle (laterally and vertically). The resulting DDM shows a functional relationship to the signal parameters (amplitude and phase of carrier and amplitude-modulated tones). In order to control the position of the drone, the actual drone position needs to be determined and fed back to the position control loop.

The E2EUC system described herein offers fast and cost efficient tuning and calibration of a navigational aid. The E2EUC system may applied in specific implementation of an ILS providing enhanced tuning capabilities over conventional designs (e.g., PILS). The E2EUC system may also be applied to conventional navaids and surveillance systems. A benefit of the E2EUC is that the system significantly reduces manual tuning effort.

The E2EUC system described herein provides a closed control loop to perform measurement of navaid/surveillance system quality by a drone which can be flexibly and precisely placed within the intended coverage volume of the navaid/surveillance system. The drone is configured to take signal quality measurements and communicates them to the ground system which is capable of active tuning of the signal parameters based on data received from the measurement drone. This process is performed by the E2EUC system until the signal quality within the intended calibration limits is achieved.

In accordance with some embodiments, the tuning process involves determining the desired signal in space measurement point (e.g., Pos. Ref. Value 3516 illustrated in FIG. 35) and command a desired location for the drone. An actual position of the drone is determined by a Tuning Unmanned Aerial Vehicle (UAV) position measurement. The position measurement typically can be performed airborne by means installed at the drone. But it can be performed from ground as well. The tuning process may include calculating the difference between the actual drone position and a desired drone position and determine control commands to reduce the position deviation by the Tuning UAV Position Control 3518 in accordance with some embodiments.

In some embodiments, when the position deviation is within a certain limit (e.g., close to zero) the signal measurement is triggered, and the measurement performed by the Tuning UAV measurement Facility 3504. The measured signal is compared against the desired signal Sis Ref Value 3510. If a deviation is existent, the measurement is transferred to a calibration parameter by the Signal Controller 3512 illustrated in FIG. 35. The signal controller 3512 adapts the respective parameter in the signal generation 3506. The process of signal measurement and parameter adaptation is performed until the deviation between measured signal and desired signal is within certain limits (e.g., close to zero).

When the signal is set at the certain location, the next position will be commanded in some embodiments. The process is repeated until the received signal at all locations is compliant with the desired signal. It should be noted that the position control loop is independent from SiS control loop. Both control loops are only coupled by the reference values for SiS and position. An alternative procedure could be to search the position of zero SiS (i.e. DDM) and to tune the system to the desired value there The tuning process outlined above is applicable for tuning of the radiated signal and tuning of ground based signal monitors. Depending on the implementation the functions, the following functions can be performed either on the ground or in the air:
Tuning UAV Position Measurement
SiS Reference Value
Position Reference Value Throughout this disclosure, incorporation of E2EUC into the Portable Instrument Landing System (PILS) is described. The primary goal of PILS is to offer a small-footprint Instrument Landing System (ILS), which is portable and can be setup or torn down very quickly by a small team. However, E2EUC could be expanded to operate in other portable/deployable navigational and surveillance aids and also be adapted to traditional, fixed-based navigational aids. This includes ILS, Very-High-Frequency Omni-Range (VOR), Tactical Air Navigation (TACAN), Distance Measuring Equipment (DME), Multilateration (MLAT), and Radar. A principle for closed loop (D)VOR tuning includes measuring azimuth, modulation indexes and modulation frequencies. A principle for TACAN tuning includes tuning only the azimuth offset.

According to some embodiments, E2EUC combines the concept of using a UAV to perform signal-in-space (SiS) verification (and possibly flight check) of a navigational aid, with the concept of using a UAV to tune a navigational aid system. The result is an end-to-end automated tuning process, whereby the UAV is flown to the designated location, measures the SiS, and relays the measurements back to the PILS's Command and Control System (CCS). In turn, the CCS evaluates the measurements and commands the ILS to modify the SiS until the UAV measures an acceptable SiS.

With conventional ILS the tuning process can be supported by the drone and respective feedback to the extent of setting signal parameters configurable by electronic means, i.e. typically per transmitter parameters (further details will be given below): Signal amplitude, Modulated signal amplitude (SBO, CSB), and Overall phase of modulated signals. The same applies for the monitoring: typically, the monitor limits per receiver (integral, near-field, far-field) can be configured.

A conventional ILS uses multiple radiating elements per localizer and glideslope. These are commonly connected to their respective transmitter for the entire localizer and glideslope respectively. Since the tuning is limited to a per transmitter tuning for a conventional ILS only the total field at once can be affected. Furthermore, the monitor settings can be adjusted using the drone. The drone based tuning will thus primarily support the re-calibration. The advantage over the state-of-the art principle is that any arbitrary location can be reached.

With PILS tuning, the basic principle of setting signal parameters per transmitter is applicable for the PILS as well. Since each radiating element is connected to its own transmitter the degrees of freedom are larger. The monitor calibration is similar to the one for conventional systems. The integral monitoring can be performed at per antenna element and thus also with an increased degree of freedom.

The increased degree of freedom in calibration of the advanced PILS concept adds complexity to the tuning and calibration process as will be explained in more detail below. According to some embodiments, the procedure for tuning a PILS system may include:

Load pre-configuration: anticipated tuning parameters could come from the tool that also serves to design the array, when site conditions (slope etc.) are in
→start configuration deviates from 'ideal' default by already considering site aspects Tune/calibrate LOC on ground:
Ensure proper synchronization: done internally within LOC/GP
Measure each antenna separately to check compliance with anticipated and pre-configured value
Measure SBO zero at centerline: Adjust individual antennas as outlined in measurement to parameter description
Tune localizer width by measuring at lateral displaced sites
Tune clearance signal (if existent)
Check outside coverage signal attenuation Tune/calibrate GP
Ensure proper synchronization: done internally within LOC/GP
Measure each antenna separately to check compliance with anticipated and pre-configured value
SBO zero at desired GPA: tune as outlined in measurement to parameter description
SBO zero at lateral displacement
Check vertical width
Tune clearance signal (if existent)

The Positioning Control Loop (PCL) is controlled, in some embodiments, by the Tuning subsystem and involves the PILS subsystems—CCS and TD. The CCS commands the desired reference position of the drone according to the actual measurement need. The actual measurement need follows from the calibration procedure.

One of the more challenging aspects of performing the PILS tuning process is knowing the drone's position in space accurately. In one embodiment, when GPS/GNSS signals are available and supplemented with differential GPS or Wide Area Augmentation System (WAAS), the required accuracies can be readily achieved. This can be accomplished by equipping the drone with GPS/GNSS and ILS receivers, measuring the appropriate Signals in Space (SiS) and securely broadcasting them to the PILS Command and Control Subsystem (CCS). The CCS would then analyze the data and compute the phase and amplitude antenna correction coefficients necessary to correct the SiS. The coefficients would then be sent to the Localizer (LOC) and Glide Slope (GS) antenna elements and corrected.

However, in a GPS/GNSS denied environment determining the drone's position in space is much more challenging. The requirements for the position accuracies are driven by the flights required for the tuning PILS and the distances and angular positions relative to the LOC and GS antenna phase centers. Since we are planning to use a DoD Group 2 octocopter, the measurements will be conducted at much shorter ranges than the traditional flight checks. However, these measurements will be suitable for initial tuning and will be made in regions where both the LOC and GS RF antenna patterns are fully formed.

Figure 36:
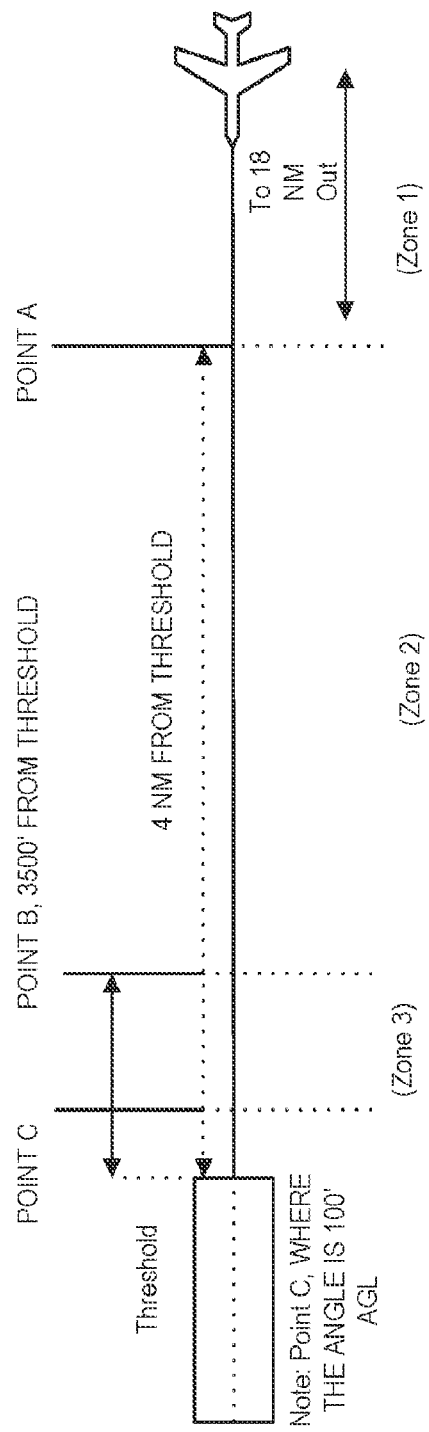
FIG. 36 is a diagram of a top down view of an example approach with certain reference points.

In order to assess the accuracy requirements, it is helpful to define some reference points from ICAO Annex 10 for a Category I approach. FIG. 36 illustrates a top down view of an example approach with these reference points. The following areas are example regions of particular interest:

Point A. An imaginary point on the LOC/GS on course located 4 nm (7.4 km) from the runway threshold as measured along the extended runway centerline.

Point B. An imaginary point on the LOC/GS on course located 3500 ft (1065 m) from the runway threshold as measured along the extended runway centerline.

Point C. A point through which the downward extended straight portion of the GS commissioned angle passes at a height of 100 ft (30.5 m) above the extended horizontal plane containing the runway threshold. Assuming the glide path commissioned angle is 3° and the touchdown point is 300 m from the threshold, then Point C is located 282 m from the threshold and 582 m from the touchdown point.

Threshold—The runway thresholds are markings across the runway that denote the beginning and end of the designated space for landing and takeoff under non-emergency conditions.

Touchdown Point—The touchdown point (not shown), is the intersection of the Glide Slope angle with the runway surface and is point of first contact with the runway.

Figure 37:
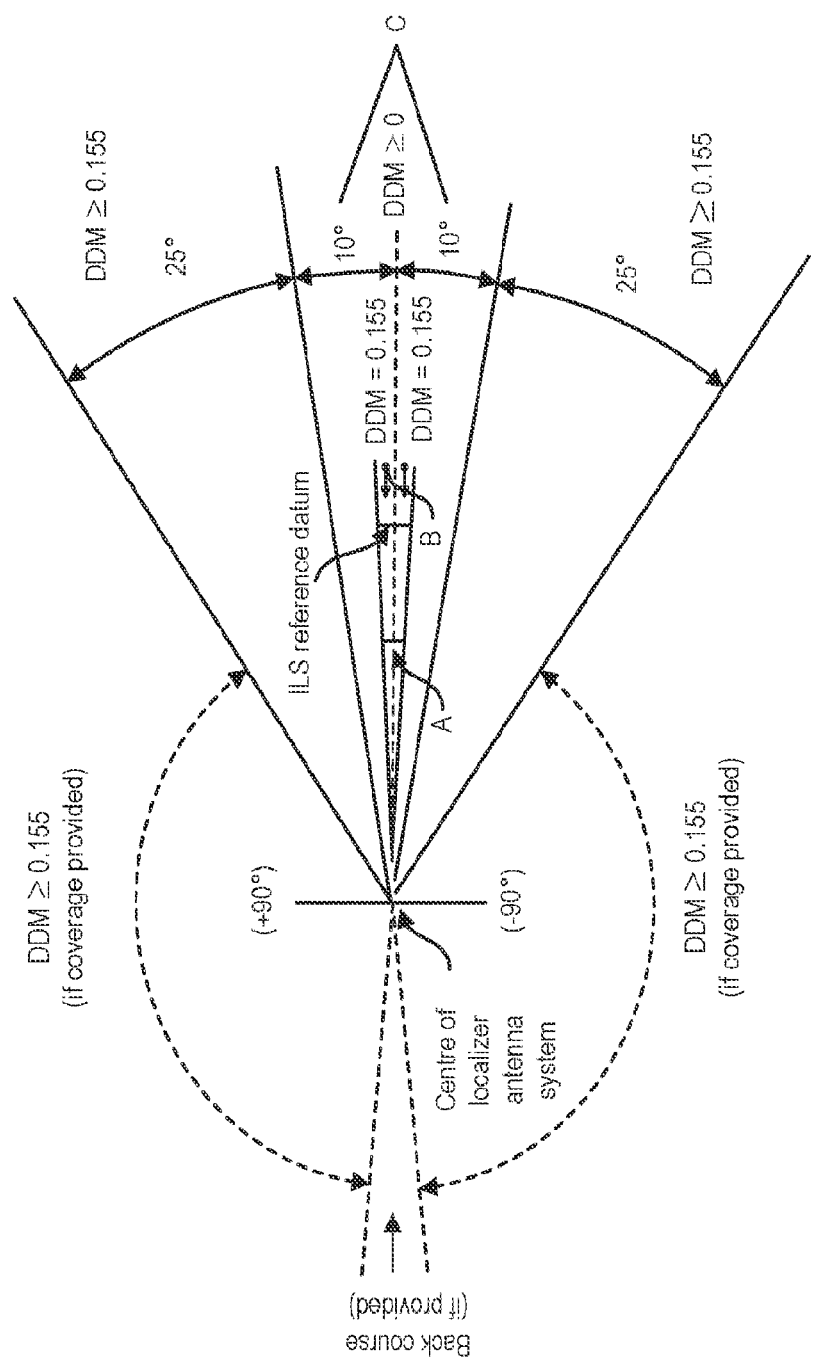
FIG. 37 is a plot diagram of a Difference in Depth of Modulation (DDM) displacement sensitivity for a localizer.

FIG. 37 shows the Difference in Depth of Modulation (DDM) displacement sensitivity for the LOC. On the LOC course, i.e. the runway centerline and extended centerline, the DDM is nearly zero rising linearly right and left of the centerline to a value of 0.155 DDM (150 µA). The boundaries created at these points define the LOC course sector width highlight as "A" in the figure and is typically less than or equal to 6 degrees. From the edges of the LOC course sector to ±35°, the DDM will increase linearly to 0.180. Once the DDM reaches 0.180 then it must ≥0.180.

It should be noted that in this disclosure, a 4000 m runway with the LOC setback of 300 m from the stop end of the runway, and a glide path angle of 3 degrees with a 300 m setback from the threshold, will be used throughout to demonstrate the operations of the methods and systems according to embodiments described herein below. Thus, it should be understood that accuracies and tolerances will vary for different runway, setbacks and glide path angles.

Figure 38:
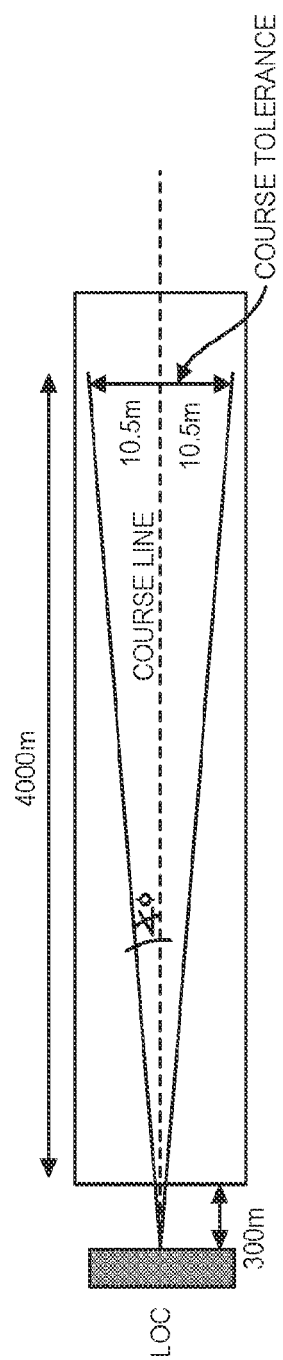
FIG. 38 is a diagram illustrating an example course tolerance for a localizer in accordance with embodiments of the present disclosure.

The first step in the process is to determine the LOC course accuracy requirement as illustrated in FIG. 38. The LOC course accuracy for a CAT I approach at the runway threshold is ±35 ft (10.5 m) or the linear equivalent of 0.015 DDM, whichever is less. In this case, the angular tolerance is given by the following:

$$\Phi(\text{ICAO Annex 10})=\pm\text{Tan}^{-1}(10.5\text{m}/4300\text{m})=\pm 0.140°$$

Shorter runways would result in larger angular tolerances. During the tuning process, the LOC course tolerance must be within ±0.3 m as discussed in Reference 1 listed below. The LOC course tolerance in degrees is then given by:

$$\text{LOC course tolerance (deg)}=\pm\text{Tan}^{-1}(0.3\text{m}/4300\text{m})=\pm 0.004°.$$

In addition, given that there are 0.00145 DDM/m and 0.155 DDM is equivalent to 150 µA, the course tolerance in µA is given by:

$$\text{LOC course tolerance (µA)}=0.3\text{m}\times 0.00145\text{ DDM/m}\times 150\text{ µA}/0.155\text{ DDM}=0.42\text{ µA}.$$

Figure 39:
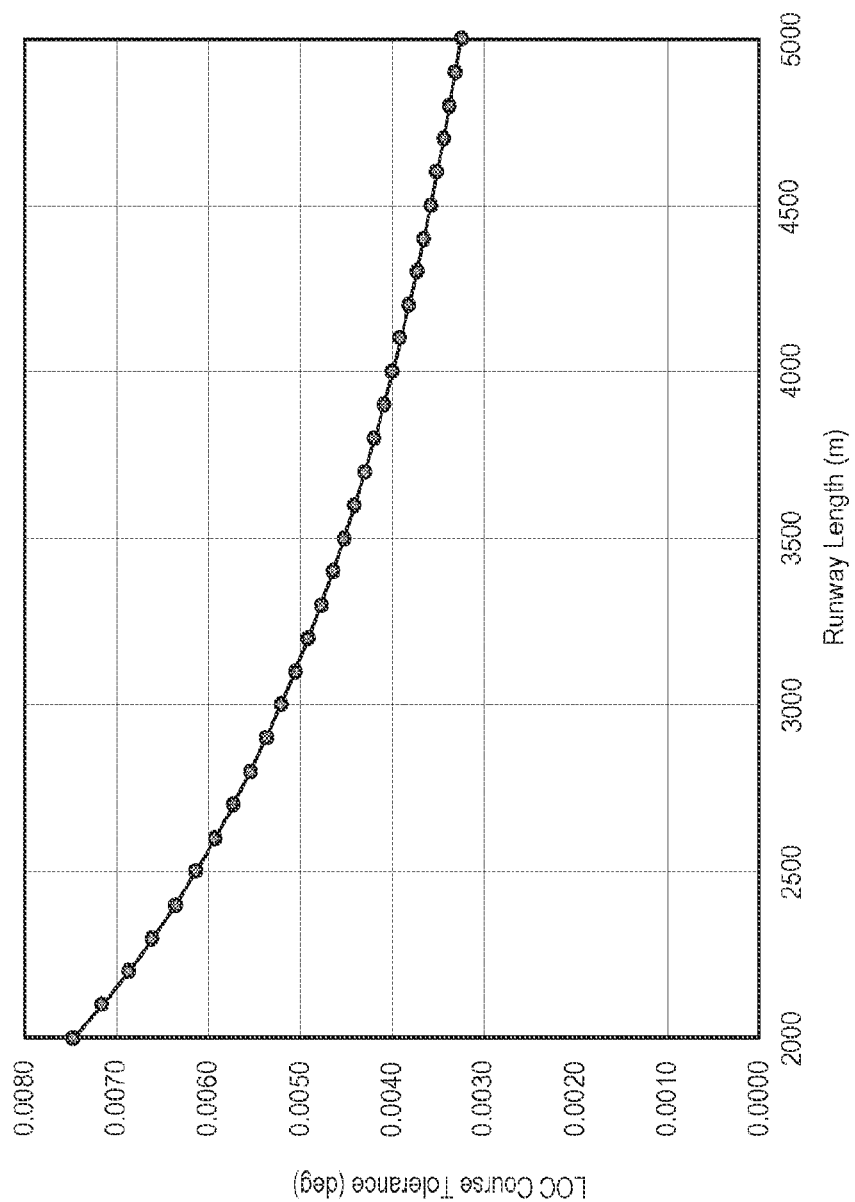
FIG. 39 is a plot chart illustrating an example relationship between a localizer course tolerance and a runway length in accordance with embodiments of the present disclosure.
Figure 40:
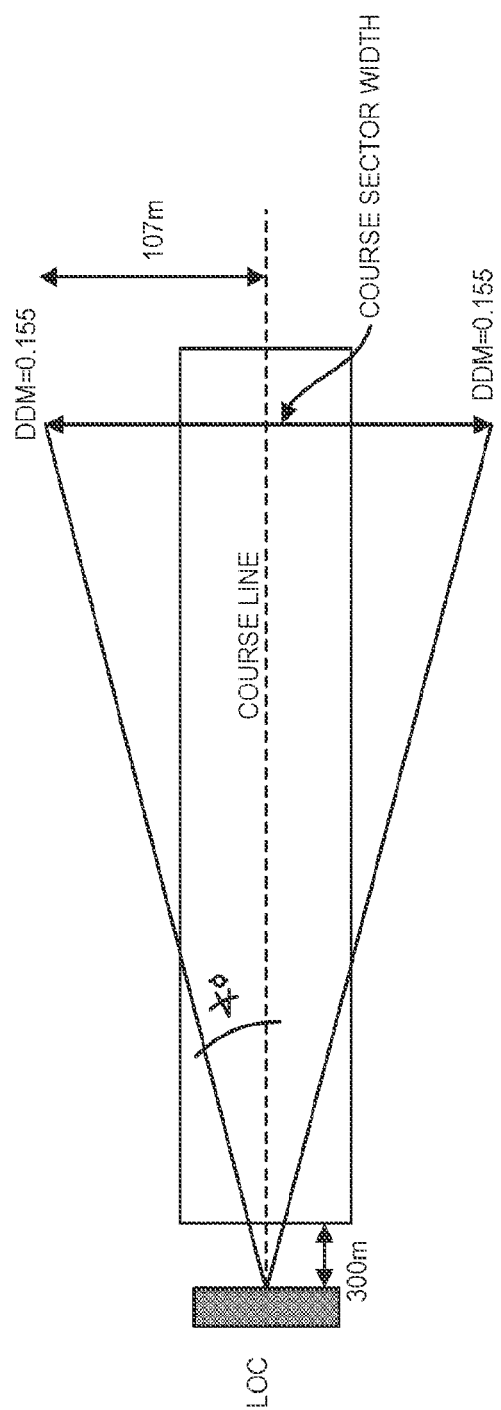
FIG. 40 is a diagram illustrating course sector width for a localizer in accordance with embodiments of the present disclosure.

FIG. 39 illustrates the relationship between runway length and the LOC course width tolerance. The next step is to determine nominal LOC Course Sector Width (CSW) and associated alignment tolerance. FIG. 40 illustrates the LOC CSW is a function of runway length. Based on a nominal half CSW of 350 feet (107 m) in the X-Y plane at the runway threshold, the LOC half CSW is given by:

$$\beta(\text{ICAO Annex 10})=\text{Tan}^{-1}(107\text{m}/4300\text{m})=1.42°.$$

The LOC CSW is therefore given by:

$$\text{LOC CSW (ICAO Annex 10)}=2\times\beta=2\times 1.42°=2.84°$$

During the tuning process, the LOC CSW tolerance must be within ±3% of the CSW as discussed in Reference 1 which in degrees is given by:

$$\text{LOC CSW tolerance (deg)}=\pm 2.84°\times 0.03=\pm 0.0852°,$$

which is equivalent to, $$\text{LOC CSW tolerance (m)}=\pm 4300\text{m}\times\text{Tan}(0.0852°)=\pm 6.4\text{ m}$$

Thus, the LOC CSW tolerance in µA is given by:

$$\text{LOC CSW tolerance (µA)}=6.4\text{m}\times 0.00145\text{ DDM/m}\times 150\text{ µA}/0.155\text{ DDM}=9.0\text{ µA}$$

Figure 41:
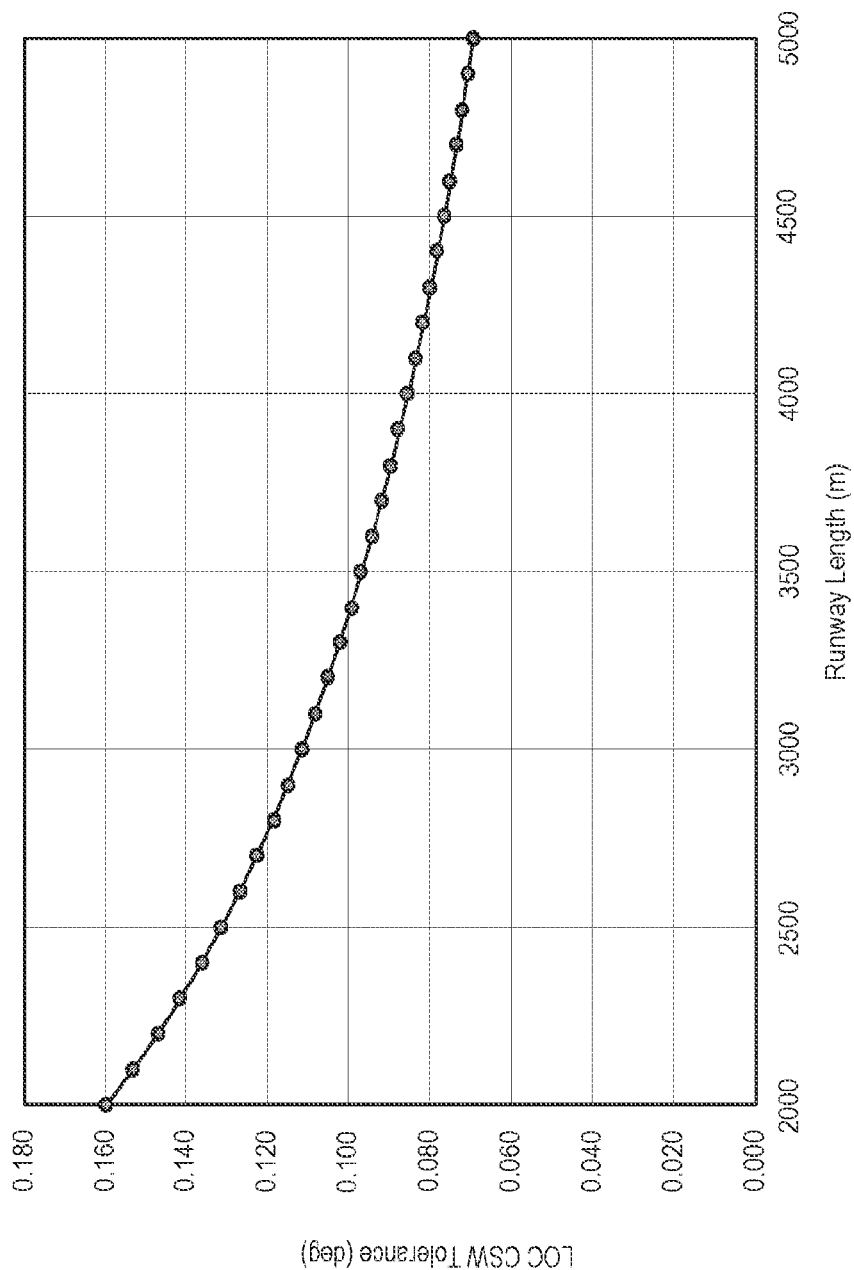
FIG. 41 is a plot cart illustrating an example relationship between a localizer sector width and a runway length in accordance with embodiments of the present disclosure.

FIG. 41 illustrates the relationship between runway length and LOC course sector width tolerance. A summary of the LOC course and sector width tolerances for a 4000 m runway with a 300 m setback are provided in Table 1.

TABLE 1

Summary of LOC Accuracy Tolerances
(assumes 4000 m runway with 300 m setback)

| Description | Az Error (deg) | Az Error (m) | Error DDM (µA) |
|---|---|---|---|
| Course | ±0.004 | ±0.3 | 0.42 |
| Sector Width | ±0.0852 | ±6.4 | 9.0 |

Tuning the PILS to the LOC course could be accomplished by simply hovering the drone 10-20 m above the runway centerline at the threshold end of the runway. The position of the drone would have to be controlled and measured within the ±0.3 m accuracy requirement. Data from the drone's ILS receiver could then be collected and transmitted to the CCS for LOC antenna element phase and adjustments. Per Table 1, the intent would be to drive the DDM to a value less than 0.42 µA.

Once the automatic antenna adjustments have been made to zero the DDM, the drone could fly a vertical profile directly above the centerline as a final check on the LOC course elevation profile. In order to be consistent with the GS coverage, which is measured relative to the touchdown point and covers up to roughly 7°, the drone could fly a vertical profile from the runway surface up to 40 m over the centerline at the threshold.

In addition, the LOC Signal in Space (SiS) should be verified over the range of ±35°. Over this azimuth span, the DDM should vary linearly from zero to 0.155 at the LOC CSW and then from there to 180 µA. Once DDM reaches 180 µA it must remain at that level or greater out to the ±35° azimuth positions. In order to verify this within the drone flight limitations, the drone must fly close to the LOC but in a region where the beam pattern is fully formed. This could be accomplished by hovering over the centerline at the stop end of the runway 300 m from the LOC and then flying perpendicular to the centerline ±210 m.

Figure 42:
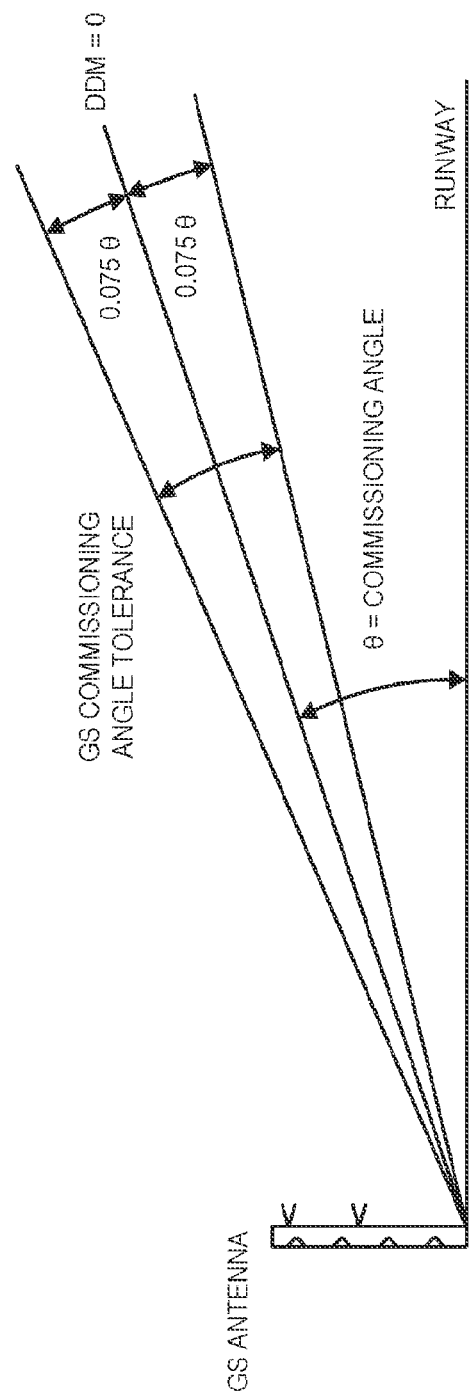
FIG. 42 is a diagram illustrating an example glide path commissioning angle and tolerance.

ICAO Annex 10 defines the Glidepath Angle (GPA) θ as the commissioning angle. The GPA must be adjusted to ±0.0750 for a Category I approach illustrated in FIG. 42. Assuming θ=3.0°, the angular tolerance for this case is given by:

$$\text{GPA Tolerance (ICAO)}=\pm 0.075\times 3°=\pm 0.225°.$$

During the tuning process, the GPA must be adjusted within ±0.75% of the GPA as discussed in Reference 1 which is given by:

$$\text{GPA Tolerance (deg)}=\pm 3°\times 0.0075=\pm 0.0225°.$$

Figure 43:
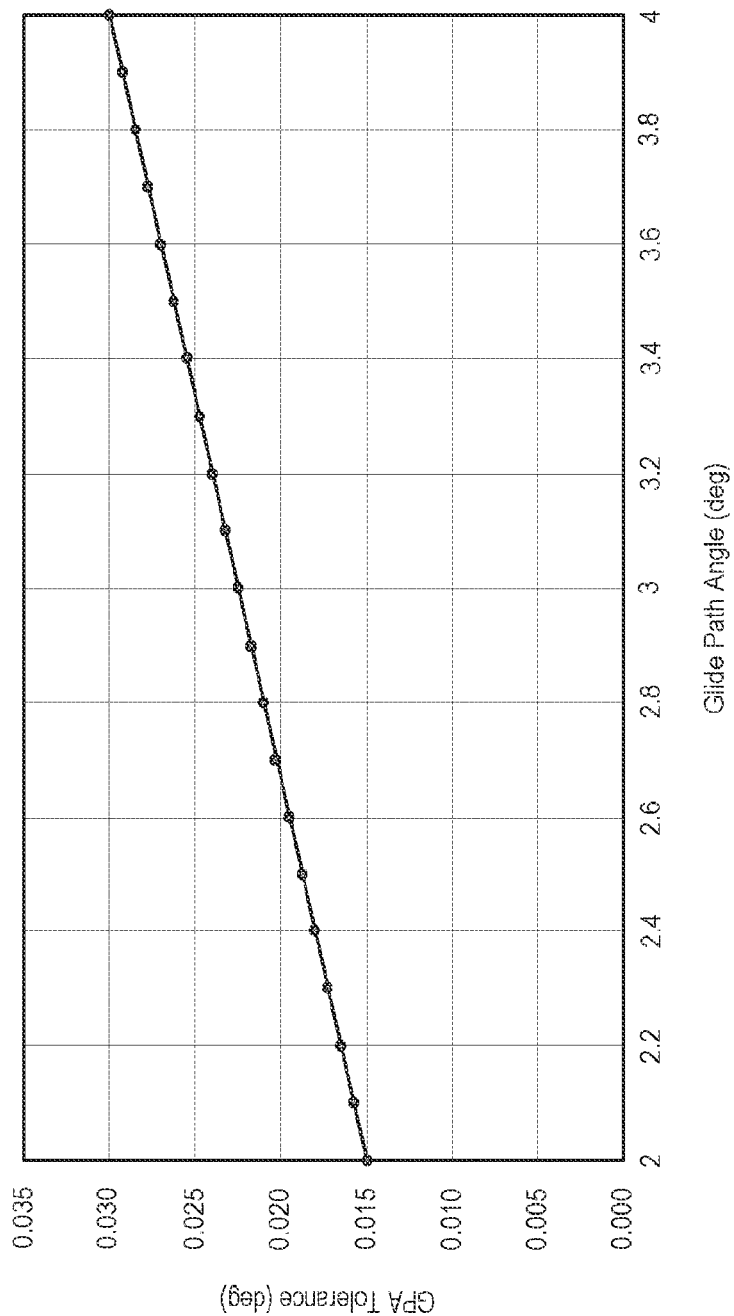
FIG. 43 is a plot chart illustrating an example relationship between a glide path tolerance and a glide path angle in accordance with embodiments of the present disclosure.
Figure 44:
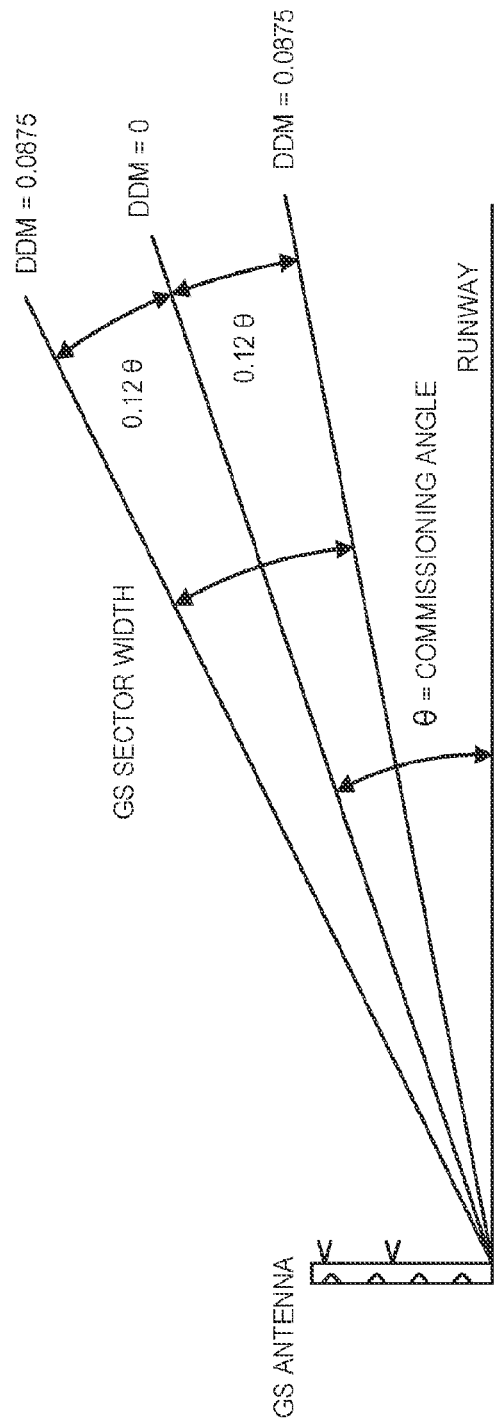
FIG. 44 is a diagram illustrating an example glide path sector width.

FIG. 43 displays the relationship between GPA tolerance and the GPA. For the glide path, the nominal angular displacement sensitivity should correspond to a DDM of 0.0875 at an angular displacement above and below the glide path by 0.120 as shown in FIG. 44. Assuming the GPA θ=3°, the sector width is given by:

$$\text{Glidepath Sector Width (GPSW)}=2\times 0.12\times 3°=0.72°.$$

Since the DDM rises linearly from zero at the GPA to 0.0875 at the half sector width 3.36°, the relationship between DDM and degrees is given by:

$$\text{DDM/Deg}=0.0875\text{ DDM}/(0.36\text{ Deg})=0.243\text{ DDM/Deg}$$

and, since DDM 0.175 is equivalent to 150 µA for the GP, the tolerance in terms of µA follows, $$\text{GPA Tolerance (µA)}=0.0225°\times 0.243\text{ DDM/Deg}\times 150\text{ µA}/0.175\text{ DDM}=4.7\text{ µA}$$

During the tuning process, the GPSW must be within 2.5% of the GPSW as discussed in Reference 1 which is given by:

$$\text{GPSW Tolerance (deg)}=\pm 0.72°\times 0.025=\pm 0.018°$$

$$\text{GPSW Tolerance (µA)}=0.018°\times 0.243\text{ DDM/Deg}\times 150\text{ µA}/0.175\text{ DDM}=3.75\text{ µA}$$

Figure 45:
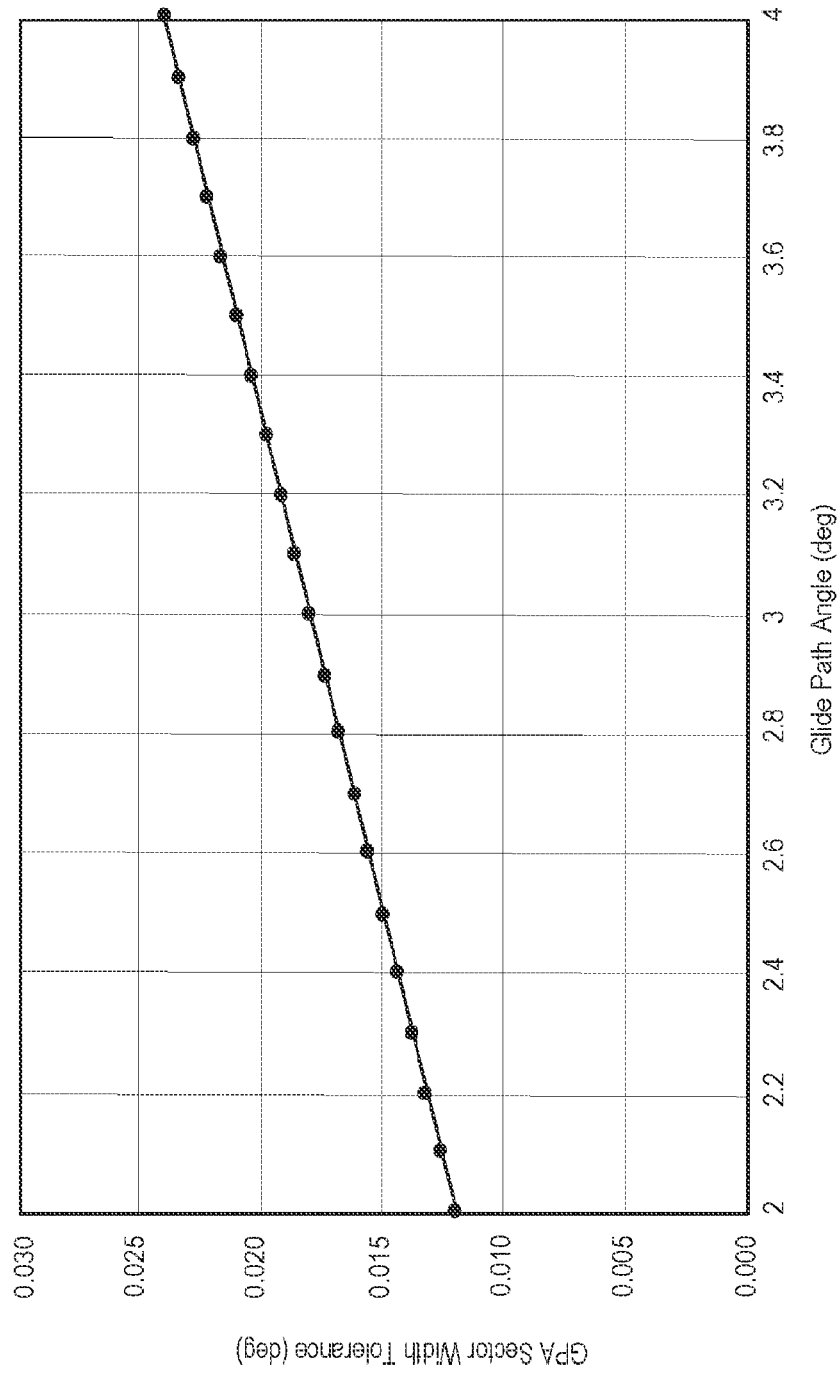
FIG. 45 is a plot chart illustrating an example relationship between the glide path sector width tolerance and a glide path angle in accordance with embodiments of the present disclosure.

FIG. 45 illustrates the relationship between GPA Sector Width Tolerance and GPA with an assumed 300 m setback from the threshold. Table 2 and Table 3 summarize the maximum allowable errors for the GPA (3°) and a 4000 m runway. It should be noted that GPA is measured at the touchdown point which is roughly 300 m from the threshold.

TABLE 2

Glide Path Angle (GPA) Tolerances

| Range to Drone from threshold(m) | Hgt at 3° (m) | Max El Error (deg) | Max Hgt. Error (m) | Max DDM Error(μA) |
|---|---|---|---|---|
| 582 Pt. C | 30.5 | ±0.0225 | ±0.23 | 4.7 |
| 1366 Pt. B | 71.5 | ±0.0225 | ±0.54 | 4.7 |
| 4000 | 209.3 | ±0.0225 | ±1.6 | 4.7 |
| 7700 Pt. A | 403.0 | ±0.0225 | ±3.0 | 4.7 |

TABLE 3

Glide Path Sector Width (GPSW) Tolerances

| Range to Drone(m) | Hgt at 3° (m) | Max El Error (deg) | Max Hgt. Error (m) | Max DDM Error (μA) |
|---|---|---|---|---|
| 582 Pt C | 30.5 | ±0.018 | ±0.2 | 3.75 |
| 1366 Pt B | 71.5 | ±0.018 | ±0.4 | 3.75 |
| 4000 | 209.3 | ±0.018 | ±1.3 | 3.75 |
| 7700 Pt A | 403.0 | ±0.018 | ±2.4 | 3.75 |

Figure 46:
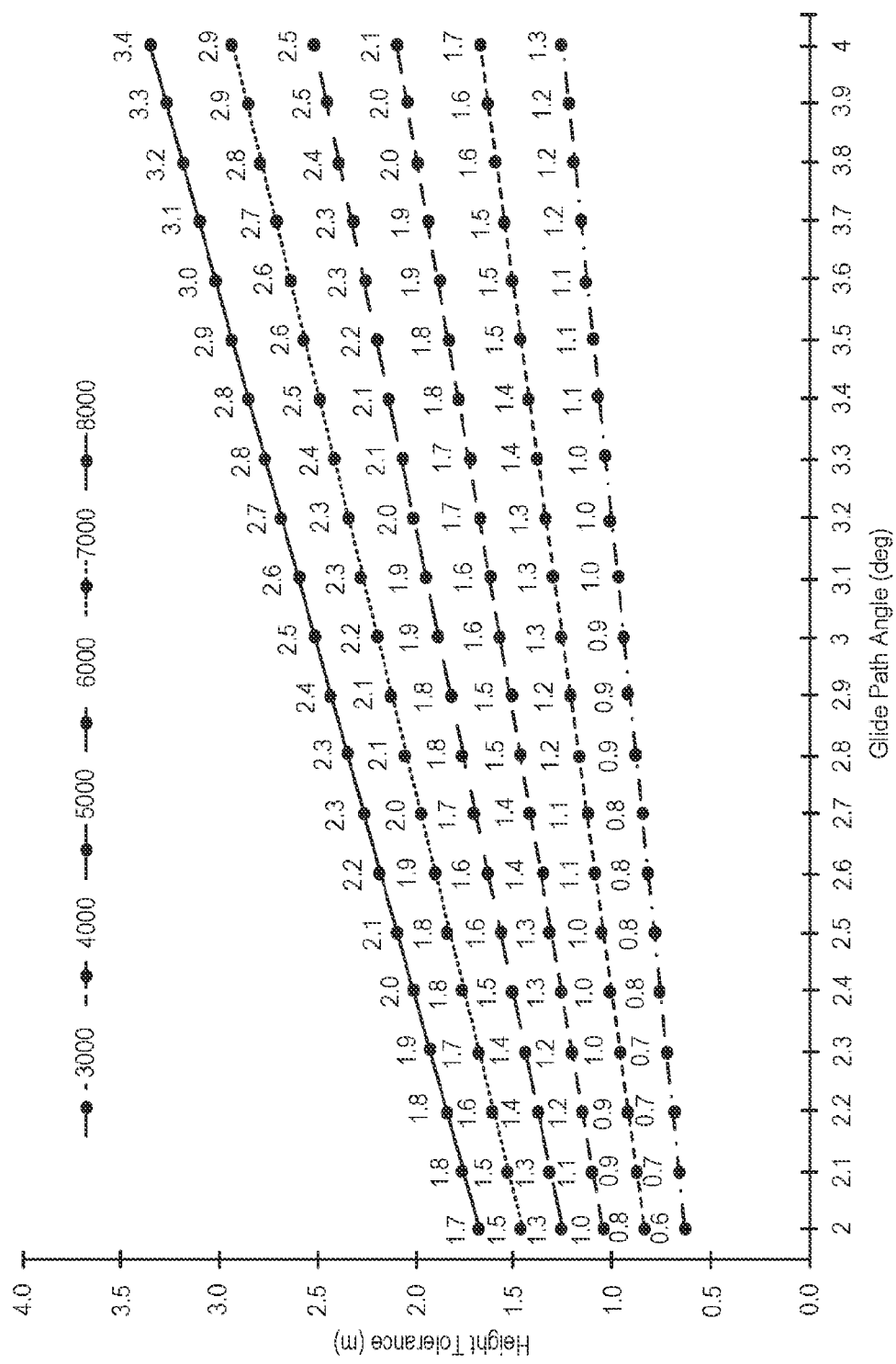
FIG. 46 is a plot chart illustrating an example relationship between a height tolerance and a glide path angle in accordance with embodiments of the present disclosure.

FIG. 46 illustrates the relationship between the maximum height tolerance (m) and GPA (deg) for various distances (m) from the touchdown point. In order to fly through the desired range of elevation angles to measure the GPA, GPSW, and GP azimuthal region, a series of flights is required. The first step is to tune the GPA (3°) by essentially parking the drone at 4000 m from the touchdown point, on the extended runway centerline, at a height of 209 m above the extended runway X-Y plane. From Table 2, the angular measurement tolerance in this location is ±0.0225° which results in a maximum measurement error of ±1.6 m in the height or Z dimension. Since the drone is equipped with an ILS receiver capable of measuring the LOC and the GP signal, data from both SiS can be sent simultaneously. Using this data and knowing the position of the drone within the tolerances, the accuracies of both the LOC and GP can be measured simultaneously. The LOC course tolerance at this range is given by:

LOC course tolerance (m)=±8000m×Tan (0.004)
=±0.56m

Figure 47:
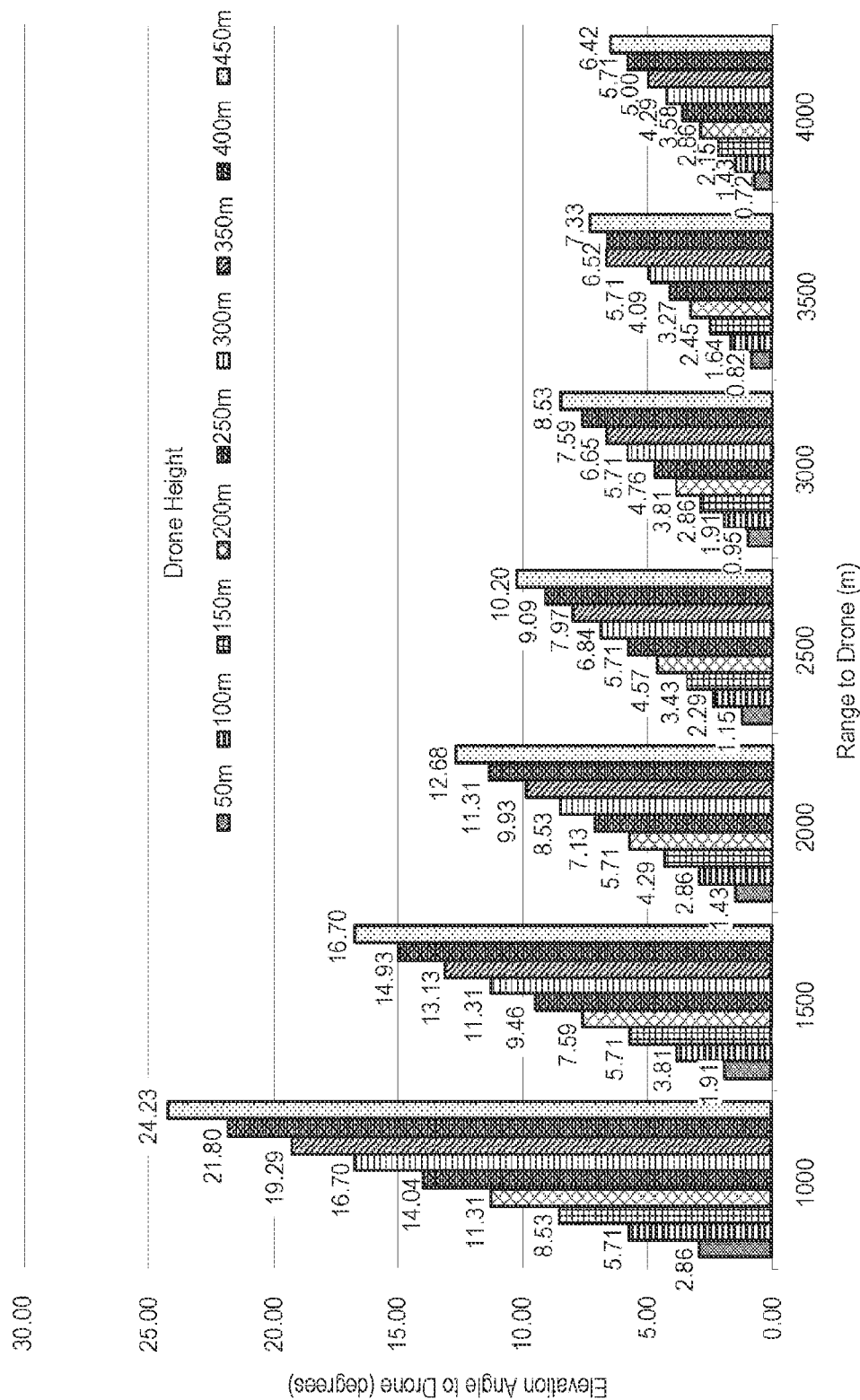
FIG. 47 is a plot chart illustrating an example relationship between an elevation angle of a drone and fixed range and various heights in accordance with embodiments of the present disclosure.

While the drone is at this range, the drone can fly a vertical profile to sweep through a range of GP sector angles as shown in FIG. 47. For example, if the drone drops to a height of 50 m relative to the extended X-Y plane of the runway and then climbs to a height of 450 m, it will transverse GP angles from 0.72° to 6.42° which is sufficient to characterize the GP signal over the angles of interest. From Table 2, the maximum measurement error tolerance is ±1.6 m in the height or Z dimension.

Figure 48:
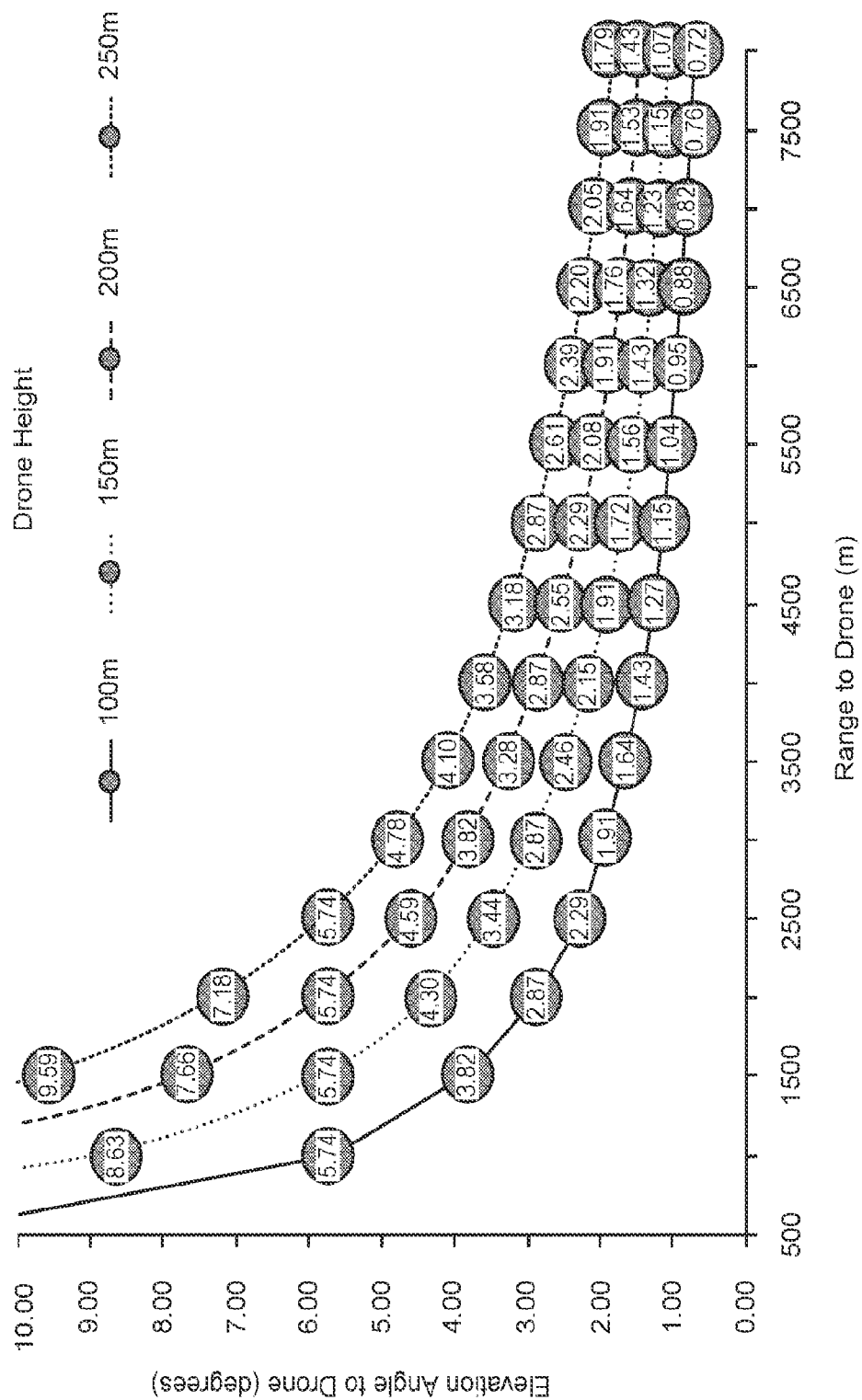
FIG. 48 is a plot chart illustrating an example relationship between an elevation angle to a drone and range to a drone at various drone heights in accordance with embodiments of the present disclosure.

Another way to accomplish sweeping through the desired angle space is to hover the drone at a given height above the runway threshold centerline, then fly the drone at that height out in range on the extended centerline maintaining that height relative to the extended X-Y plane of the runway. FIG. 48 illustrates example resulting elevation angles to the drone's position for various height profiles. For example, if the drone is hovered at 100 m above the threshold, then flown to a range of 1000 m, the GS angle would be 5.74°. As the drone moves outbound along the extended runway centerline, the angle continues to decrease. At 4000 m from the touchdown point the angle to the drone would be approximately 1.43°. Several "cuts" in elevation could be made by flying the drone outbound at one height and then raising the height to a different level for the return flight.

Figure 49:
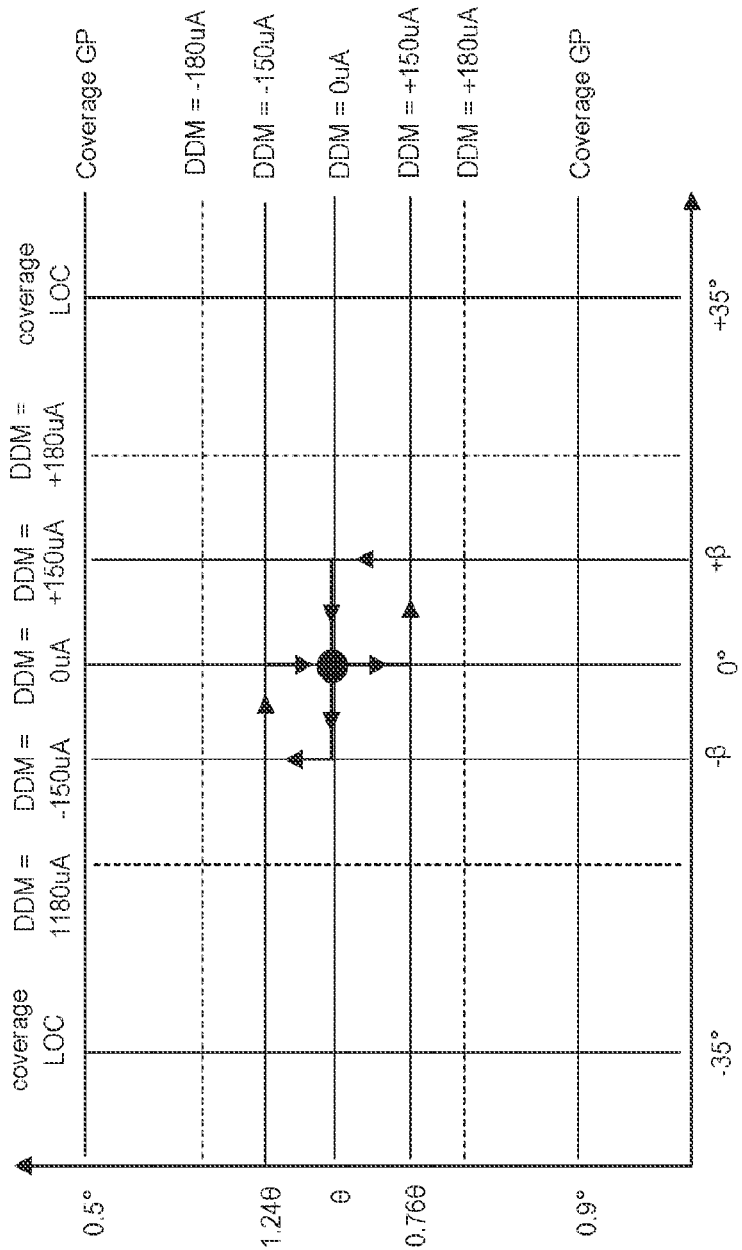
FIG. 49 is a chart illustrating an example drone crossing pattern for localizer and glide path measurements in accordance with embodiments of the present disclosure.

A final set of tuning flights could be made to check the azimuthal and elevation dimensions of the GP and the LOC at the 4000 m point. In this case, it would be desirable to test both the LOC and GP signals simultaneously. This could be accomplished by flying a crossing pattern as shown in FIG. 49. Flying this pattern allows the drone to capture and report data from both the LOC and the GP from different azimuths and elevations. For a Glide Path angle of 3°, the elevations dimensions are given by 0.76θ=2.28° to 1.24θ=3.72°. The azimuth dimension is defined by the LOC half sector width ±β, which is the case of a 4000 m runway with 300 m setback is 1.42°.

The following drone flights described are utilized to tune and check the Localizer performance. Hovering the drone 10-20 m above the runway centerline at the threshold end of the runway and adjust the LOC antenna pattern to drive the DDM to as close to zero as possible but less than 0.42 μA. While hovering over the runway centerline at the threshold, fly a vertical profile from zero to 40 m to check the elevation pattern of the LOC. Hover over the runway centerline at the threshold at 10-20 m, then fly perpendicular to the centerline to one side of the runway out to 107 m. Hover at this point and adjust the DDM to as near as possible to 0.155 (150 μA). Repeat on the opposite side. Fly the entire path length again to verify the SiS varies linearly from the centerline to the LOC sector edges.

In addition, the LOC Signal in Space (SiS) should be verified over the range of ±35°. Over this azimuth span, the DDM should vary linearly from zero to 0.155 at the LOC CSW and then from there to 180 μA. Once DDM reaches 180 μA it must remain at that level or greater out to the ±35° azimuth positions. In order to verify this within the drone flight limitations, the drone must fly close to the LOC but in a region where the beam pattern is fully formed. This could be accomplished by hovering over the centerline at the stop end of the runway 300 m from the LOC and then flying perpendicular to the centerline ±210 m.

The following drone flights are utilized to tune and check the Glide Path performance. Fly the drone to 4000 m point along the extended runway centerline at a height of 209 m above the extended runway X-Y plane. Measure and adjust the DDM to as near zero as possible but less than 4.7 μA for a GPA (3°). Measure GPA and LOC signals to verify SiS. At 4000 m, fly the vertical profile from 50 m to 450 m to sweep though angles from 0.72° to 6.42° measuring the GP elevation pattern. Hover 100 m above the runway centerline at the threshold and fly the drone at that height above the extended runway X-Y plane out in range to sweep through the GP angles of interest. Several "cuts" in elevation could be made by flying the drone outbound at one height and then raising the height to a different level for the return flight.

The drone's ILS receiver must be capable of accurately measuring several key parameters. The is a list of the parameters and their associated accuracies needed to make the necessary adjustments to the PILS LOC and GS antenna patterns.

RF signal level ±0.1 dB
Difference in depth of modulation (DDM) ±0.05% (0.5 μA)
Sum of depths of modulation (SDM) ±0.1%
ID modulation ±0.1%
ID code
Measurement points GP (nominal coverage—applicable to ILS, reduced coverage applicable to PILS):
　Az=0, GPA=3
　Az=0, GPA=3.x
　Az=0, GPA=2.y Az=−8 (−6), GPA=3
Az=−8, GPA=3.x
Az=−8, GPA=2.y
Az=+8 (+6), GPA=3
Az=+8, GPA=3.x
Az=+8, GPA=2.y Distance for these measurements is, for example, 4 km.

Measurement points LOC: as for GP but with 35° azimuth coverage.

In GPS environment simultaneous tuning of LOC & GP could be performed with a two-channel receiver. In GPS denied environment the subsystems would be tuned subsequently. Under these circumstances the LOC will be tuned first placing the two-channel receiver on pre-defined locations on the ground. Subsequently the GP will be tuned. To guide the drone carrying the two-channel receiver the already tuned LOC can be used to guide the drone in lateral direction. Optionally, vertical guidance and along track guidance will be provided by other sources. These could include range measurements using the datalink to the drone and altimeter measurements using differential barometric principles.

Guidelines for the tuning of the ILS transmit signal in space, especially considering the opportunity of the new active distributed system to independently tune the single antenna elements. Contrary to a conventional ILS, in which the signal in space is produced by a remotely programmable transmitter+a fixed distribution unit+a set of trimmed RF cables, the new system is composed of a Central Unit+a set of independent Antenna Units, in which both the Central Unit and each Antenna Unit can be remotely programmable in-field.

Figure 50:
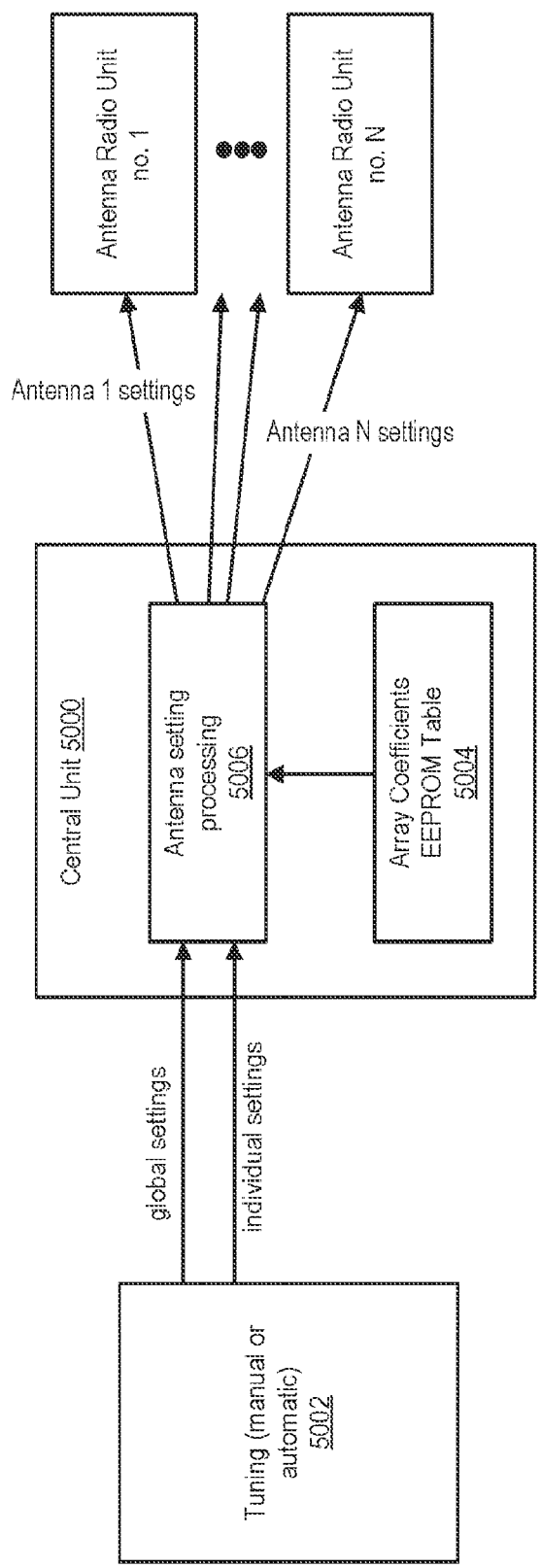
FIG. 50 is a block diagram illustrating an example central control system in accordance with embodiments of the present disclosure.

During the in-field installation, the operator 5002 who is already experienced with the current system will have the possibility to tune the signal in space by giving the Central Unit transmitter 5000, illustrated in FIG. 50, settings that affect all the antennas (like CSB power, SBO amplitude, SDM, ID tone and so on); we call this kind of command as "global settings". In another embodiment, the Central Unit transmitted 5000 may comprise CCS 3200 illustrated in FIGS. 32-34 above may set the global parameters with or without operator input. Further, with the new system the operator will able to individually set the signal produced by a single antenna (like its SBO phase or amplitude), by giving the Central Unit settings specific to one antenna only; we call this kind of settings as "individual settings". The Central Unit 5000, when receives a setting from an operator or the CCS 3220 described above, will translate this setting into one or more "antenna settings" to the Antenna Radio Unit(s) 1-N, according to a dedicated processing, which also must consider the proper distribution of the signals to the antennas.

The Array Coefficient Table 5004, written in an memory housed in the Central Unit 5000, contains the coefficients distribution of the array (CSB and SBO amplitude and phase, for both course and clearance); it is practically a replacement of the Distribution Unit, which is used by the Central Unit 5000 to program each Antenna Unit 1-N with the adequate signal. Each "Antenna Setting" will be the result of the "Global Setting" weighted by the "Array Coefficient", and eventually tuned (in-field) by the "Individual Setting" utilizing Antenna Setting Processing Unit 5006. The Individual Settings are intended as corrections of the antenna coefficients, therefore their default values will be all equal, since the antenna distribution is already contained in the Array Table 5004 and the environment is supposed ideal at the beginning of the in-field tuning.

Just an example to clarify this concept. Let consider an array of 4 antennas, whose CSB amplitude distribution is 0.7/1.0/1.0/0.7 (this pattern is contained in the "array coefficient table"). If no specific settings come from the operator, the CU sets the ARUs with the "antenna settings" 0.7/1.0/1.0/0.7. If the operator wants to double the amplitude as a whole, will give the CU a "global command" which will be translated into the "antenna settings" 1.4/2.0/2.0/1.4 to the ARUs. Then, if the operator wants to increase by 5% the amplitude level of the second antenna only, will give the CU a "individual setting" which will be translated into the "antenna settings" 1.4/2.1/2.0/1.4 to the ARUs (or, to save time, only the second ARU is programmed with the new value 2.1).

The outline of the tuning procedure is as follows:

Localizer
    Default configuration
    Amplitude equalization
    SBO phase equalization
    CSB phase adjustment
    Sector width tuning Glidepath
    Default configuration
    Amplitude tuning
    Tuning of the Front SBO phase vs. the Rear SBO phase
    SBO phase vs. CSB phase tuning
    CSB phase adjustment
    Sector width tuning The default parameters can be pre-configured on ground and can be determined based on known site and installation conditions. The signal in space produced by the Localizer can be simplified with the following formula:

$$\vec{V}(\varphi) = A_{csb}(\varphi) * [1 + (0.2 - \tfrac{1}{2} * DDM(\varphi)) * \vec{V}_{90} + (0.2 + \tfrac{1}{2} * DDM(\varphi)) \vec{V}_{150}]$$

For example, a carrier (whose level $A_{csb}$ is an adequate function of the azimuth) amplitude modulated by two 90 Hz and 150 Hz navigation tones, whose modulation index is totally 40% (SDM), while their difference (DDM) is a signed function of the azimuth (as much linear as possible) that it is 0% at the centerline and ±15.5% at the sector width edges (i.e. at $\varphi = \pm \varphi_W$, where $2\varphi_W$ is the total sector width)

$$DDM(\varphi) = 0.155 \frac{\varphi}{\varphi_W}$$

Other features of the signal in space, like the variable SDM, the ID code, the RF frequency, are not considered in this paper, since they are quite independent of the receiver position. Further, the Clearance signal, for the time being, is ignored in this paper for the sake of simplicity.

It is well known that such a signal can be achieved by feeding at least two antennas, one on the right side and the other on the left side of the centerline, with slightly different signals. Each antenna is fed with a signal containing the carrier and the navigation tones in phase (called CSB) and a signal containing only the navigation tones in opposite phase each other and in quadrature respect to the carrier (called SBO). The CSB signal is injected to the left and the right antennas with the same amplitude and the same phase, while the SBO signal is injected to the left and the right antennas with the same amplitude and the opposite phase:

$$\vec{V}(\text{right}) = A_{csb} * [1 + 0.2 * \vec{V}_{90} + 0.2 * \vec{V}_{150}] + j A_{sbo}[0.2 * \vec{V}_{90} - 0.2 * \vec{V}_{150}]$$

$$\vec{V}(\text{left}) = A_{csb} * [1 + 0.2 * \vec{V}_{90} + 0.2 * \vec{V}_{150}] - j A_{sbo}[0.2 * \vec{V}_{90} - 0.2 * \vec{V}_{150}]$$

More generally, to allow a fine in-field tuning, the signal injected to each antenna can be expressed with the following formula containing FOUR tuning parameters:

$$\vec{V} = A_{csb} * e^{j \psi_{csb}} [1 + (0.2 + A_{sbo}/A_{csb} * e^{j \psi_{sbo}}) * \vec{V}_{90} + (0.2 - A_{sbo}/A_{csb} * e^{j \psi_{sbo}}) * \vec{V}_{150}]$$

The four transmitter settings for each antenna are:

$A_{csb}$ (CSB amplitude, nominally equal for the left and right antennas, but different for each pair according to the array distribution table)

$\psi_{csb}$ (CSB phase, nominally equal to 0°)

$A_{sbo}$ (SBO amplitude, nominally equal for the left and right antennas, but different for each pair according to the array distribution table)

$\psi_{sbo}$ (SBO phase respect to the CSB phase, nominally +90° for the right antennas and −90° for the left antennas)

If N is the array dimension (e.g. 8 for the Localizer array currently proposed for PILS), it is theoretically possible to tune up to 4*N parameters to adjust the signal in field, while for the existing system with fixed distribution unit only 3 parameters can be set (total CSB amplitude, total SBO amplitude, global SBO/CSB phase), while the individual phases can be adjusted by cutting each antenna cable, and the individual amplitudes cannot be adjusted at all.

The following procedure is suggested to tune the signal in field, in which all the four parameters for each antenna can be tuned to adjust the signal in particular positions in space. Some steps (rough tuning) are mandatory, some others (fine tuning) are optional and can be applied or improved based on the required accuracy, the operator experience, the environment, the available time and tools (e.g. drones).

The proposed array for PILS is composed of 8 antennas, fed with the signals whose example default settings are listed in the Table 4 below. However, it should be understood more or less antenna elements may be utilized depending upon design requirements.

TABLE 4

Example Default Settings for a PILS 8 element array

| Ant. | $\psi_{csb}$ | $\psi_{sbo}$ | $A_{csb}$ | $A_{sbo}$ | Ant. | $\psi_{csb}$ | $\psi_{sbo}$ | $A_{csb}$ | $A_{sbo}$ |
|---|---|---|---|---|---|---|---|---|---|
| Right-1 | 0° | +90° | 1.00 | 0.96 | Left-1 | 0° | −90° | 1.00 | 0.96 |
| Right-2 | 0° | +90° | 0.15 | 1.00 | Left-2 | 0° | −90° | 0.15 | 1.00 |
| Right-3 | 0° | +90° | 0.37 | 0.86 | Left-3 | 0° | −90° | 0.37 | 0.86 |
| Right-4 | 0° | +90° | 0.00 | 0.50 | Left-4 | 0° | −90° | 0.00 | 0.50 |

The amplitude array coefficients are generally normalized to 1. The $A_{csb}$ coefficients (CSB amplitude) must be scaled by a typical factor needed to achieve the required coverage in a standard environment (in the current 14 element system the CSB signal on the reference antenna is approximately 1 W). The $A_{sbo}$ coefficients must be scaled by a factor depending on the commissioned sector width (for example, based on a simulation, the multiplier is 0.8 if the width is ±2°).

The tuning procedure could be organized into five subprocedures.

1) Default configuration. All the antennas are set with the default signals listed in the table above with the proper scaling factors for the amplitudes.
2) Amplitude equalization ($A_{csb}$). This fine-tuning procedure equalizes the signal intensity produced by the right and left antennas of each pair, which could be different due to transmitters impairments, antenna gains or ground reflections. The carrier signal (CSB) is used to equalize the amplitudes, but the same correction then applies to the sideband signal to (SBO), since the two signals are produced by the same transmitters and irradiated by the same antennas.

Switch-on one antenna at a time and set $A_{sbo}$ to zero. Measure the RF level at centerline (eventually averaging the values over an adequately long path), and compare the measurement of the signal produced by two antennas (left and right) of the same pair. If the received RF level associated to the left antenna is greater than that of the left antenna by a ratio "R", increase $A_{csb}$ (right) and decrease $A_{csb}$ (left) by the same ratio equal to "R"/2. The two RF levels received in field should be equalized now. Then apply the same correction to the values of $A_{sbo}$, for both right and left antenna. Repeat the same step for each antenna pair.
3) SBO phase equalization ($\psi_{sbo}$) This recommended procedure tunes the SBO phases of the left and right antennas of each pair, so that at centerline the two SBOs cancel and DDM is zero.

Switch-on an antenna pair at a time, with the CSB and SBO signals set to the default values with the corrections determined in the previous step. Switch-off all the other pairs. Measure the DDM at centerline (eventually averaging the value on a long path); if it is not zero, increase $\psi_{sbo}$ (Left) and decrease $\psi_{sbo}$ (Right) by the same quantity (e.g. 1°); if the DDM has moved towards zero, continue in this direction, otherwise reverse the direction. Stop when DDM reaches the minimum absolute value. Repeat the same step for each antenna pair.

Theoretically, knowing the distance between the two antennas and the amplitude of the SBO respect to the CSB, it is possible to determine a reverse formula for the calculation of the required phase adjustment as a function of the measured DDM (including also the sign and therefore the correct direction). This formula, not shown here, could be used as the starting point for the iterative algorithm, to save time.
4) CSB phase adjustment ($\psi_{csb}$). This fine-tuning procedure can be used to adjust the width symmetry, whichever is the reason of the asymmetry with the default values. In fact, simulations prove that modifying the CSB phase of the right and left antenna it is possible to force an asymmetrical CSB pattern, which is able to compensate for eventual asymmetry of the DDM on the two sides. This fact should be verified in field, since for the current system it has never been applied.

Switch-on the complete array with the default values corrected during the previous steps. Measure the DDM at the right and left edges of the sector (at the threshold or, eventually, on an adequately long path). If the two absolute DDMs are different, increase $\psi_{csb}$(Left) and decrease $\psi_{csb}$ (Right) by the same quantity (e.g. 5°) for each antenna; if the symmetry improves, then continue in this direction, otherwise reverse the direction. Stop when DDM reaches the required symmetry.

5) Sector width tuning ($A_{sbo}$). This mandatory procedure adjusts the overall SBO amplitude needed to achieve the commissioned sector width, i.e. the azimuth value where DDM is 0.155.

Switch-on the complete array with the default values corrected during the previous steps. Measure the absolute value of DDM at the right and left edges of the sector (at the threshold or, eventually, on an adequately long path). Calculate "R" as the average of the two values divided by 0.155. If R≠1, decrement or increment both $A_{sbo}$ (Left) and $A_{sbo}$(Right) by the same quantity for each antenna, equal to "R"/2. This procedure should produce the desired value in one step only, or, at least in two iterative steps.

Table 5 below summarizes the five procedures described above:

TABLE 5

Summary of Tuning Procedures

| step | purpose | Tuning | Measurement in field |
|---|---|---|---|
| 1 | Default setting | none | none |
| 2 | Amplitude equalization | $A_{csb}$ | RF level at centerline |
| 3 | Zero DDM | $\Psi_{sbo}$ | DDM at centerline |
| 4 | Width symmetry | $\Psi_{csb}$ | DDM at sector edges |
| 5 | Sector width | $A_{sbo}$ | DDM at sector edges |

It must be observed that in the current system a procedure is needed to search the best $\psi_{sbo}$ maximizing the displacement sensitivity, to compensate for the arbitrary SBO/CSB phase of the Transmitter, of the TX RF cables and of the Distribution Unit. This procedure is not needed for PILS: in fact, since the SBO is produced together with CSB in the antenna transmitter, by default it is set in quadrature so that it is in phase in field, and no adjustment is needed in the ideal case.

At the end of the procedure, all coefficients can be different respect to the default values, but the coefficient amplitude distribution has remained unchanged (safe minor left-right corrections). Further analysis could be done to investigate on the possibility to modify this distribution with the aim to adjust the measured signal in space respect to what is expected, eventually on a complete orbit (where e.g. the DDM should be linear). An analogue procedure will apply to the clearance signal, and finally the most suitable Course/Clearance capture ratio will be found by comparing the two RF levels on an adequate orbit.

The signal in space produced by the Glide Path can be expressed with a formula very similar to that of the Localizer:

$$\vec{V}(\theta)=A_{csb}(\theta)*[1+(0.4-\tfrac{1}{2}*DDM(\theta))*\vec{V}_{90}+(0.4+\tfrac{1}{2}*DDM(\theta))\vec{V}_{150}]$$

In which the main differences are the SDM (80%) and the dependency on the elevation angle instead of the azimuth angle. The DDM is a signed linear function, equal to 0% at the commissioned descent angle (set to 3° in this paper) and ±17.5% at the sector width edges (set to 3°±0.7° in this paper):

$$DM(\theta) = 0.175 * \frac{3° - \theta}{0.7°}$$

The standard image GP produces the desired DDM in space by means of a set of antennas mounted on a vertical tower, whose signal in space is the combination of the direct signals with the signals reflected on the ground. For the PILS, instead, an image-less system is being proposed that uses a principle very similar to that of the Localizer: two antennas (or two arrays of 5 antennas) are displaced on a line parallel to the runway, at an adequate distance, and fed with CSB in phase and SBO in opposite phase, such that at θ=3° the two CSBs combine and the two SBOs cancel, producing zero DDM as required.

Each antenna (which belongs either to the "rear" array or to the "front" array), is fed with a combination of CSB and SBO signal, whose amplitude and phase can be individually set for tuning purpose:

$$\vec{V}=A_{csb}*e^{j\,\Psi_{csb}}[1+(0.4+A_{sbo}/A_{csb}*e^{j\,\Psi_{sbo}})*\vec{V}_{90}(0.4-A_{sbo}/A_{csb}*e^{j\,\Psi_{sbo}})*\vec{V}_{150}]$$

Therefore, the four transmitter settings for each antenna are the same as the Localizer:

$A_{csb}$ (CSB amplitude)

$\Psi_{csb}$ (CSB phase)

$A_{sbo}$ (SBO amplitude)

$\Psi_{sbo}$ (SBO phase respect to the CSB phase)

A complication with respect to the Localizer is that the position of the antennas is, theoretically, a function of the frequency and of the commissioned descent angle. However, it is under investigation the possibility to fix the geometry of the system and to electronically adjust the signals on the antennas to achieve the required descent angle at the operating frequency. Simulations seems to prove this is possible: in this case, the default values of $A_{csb}$, $A_{sbo}$, $\Psi_{csb}$, $\Psi_{sbo}$, instead of being constant like in the localizer, will be a function of the frequency and of the commissioned descent angle, and can be stored in the Central Unit EEPROM.

Another complication, peculiar of the horizontal array, is the dependency of the signal on the receiver azimuth, almost absent in the vertical GP for symmetrical reason; this dependency is corrected by design but could require an adequate in-field tuning with a dedicated measurement on a transverse orbit. For the sake of the simplicity, this tuning is not considered in this paper, but it could really be the added value of the active distributed system respect to a passive distribution (in which the phase adjustment is manually performed by physically changing the pedestal position, while an amplitude adjustment cannot be performed at all).

Further simplification assumed in this paper is the absence of the clearance signal, which actually could require an in-field tuning, as well the course/clearance power ratio.

A procedure for in-field tuning procedure of the horizontal Glide Path is also described. The following procedure is suggested to tune the signal in field, in which, for the time being, all the antennas belonging to an array (rear or front) are tuned together, for simplicity. In practice, the procedure is thought as there were two programmable antennas only. Further analysis will be performed to identify a suitable procedure to individually tune each element of the two arrays, especially to adjust the transverse pattern.

Just as an example, the default settings for a descent angle of 3°, at 332 MHz, with a fixed geometry described in another paper and not yet optimized, are listed in Table 6 below. It should be noted that more or less antenna elements for the GP array may be utilized depending upon design requirements and are not limited to the number of antenna elements provided in the Table 6 below.

TABLE 6

Default Settings of horizontal GP

| Ant. | $\psi_{csb}$ | $\psi_{sbo}$ | $A_{csb}$ | $A_{sbo}$ | Ant. | $\psi_{csb}$ | $\psi_{sbo}$ | $A_{csb}$ | $A_{sbo}$ |
|---|---|---|---|---|---|---|---|---|---|
| Rear-1 | 0° | −112° | 0.55 | 0.70 | Front-1 | −210° | −103° | 0.41 | 0.70 |
| Rear-2 | 0° | −112° | 0.90 | 0.16 | Front-2 | −210° | −103° | 0.83 | 0.16 |
| Rear-3 | 0° | −112° | 1.00 | 1.25 | Front-3 | −210° | −103° | 1.00 | 1.25 |
| Rear-4 | 0° | −112° | 0.83 | 0.16 | Front-4 | −210° | −103° | 0.90 | 0.16 |
| Rear-5 | 0° | −112° | 0.41 | 0.70 | Front-5 | −210° | −103° | 0.55 | 0.70 |

The procedure can be organized into six sub-procedures (one more than the Localizer, since the SBO/CSB phasing is required here to adapt the fixed geometry to the frequency and to the descent angle):

1) Default configuration. All the antennas are set with the default signals listed in the table above, which could produce a signal quite far from expected, since for the horizontal GP the descent angle is very sensitive positions of the antennas and to the RF phase of the transmitters.

2) Amplitude tuning ($A_{csb}$). This fine-tuning procedure equalizes the signal intensity produced by the front and the rear arrays, which could be different due to transmitters impairments, antenna gains or ground reflections. It must be performed in the far field (e.g. 4NM), where the distances from the front array and from the rear array can be approximated as equal.

Switch-on one array at a time and set $A_{sbo}$ to zero. Measure the RF level at the descent angle (eventually averaging the values over an adequately long path), and compare the measurement of the signal produced by two arrays (rear and front). If the RF level associated to the rear array is greater than that of the front array by a ratio "R", increase $A_{csb}$(front) and decrease $A_{csb}$(rear) by the same ratio "R"/2. The two RF levels should be equalized now. Then apply the same correction to the values of $A_{sbo}$, for both front and rear arrays.

3) Tuning of the Front SBO phase vs. the Rear SBO phase ($\psi_{sbo}$). This mandatory procedure searches the value of the SBO phase of the two arrays, so that at the descent angle the two SBOs cancel and DDM is zero. It could be different respect to the theoretical nominal value (which can be determined with analytical method) due the great sensitivity of DDM to the antenna positions.

Switch-on both arrays, with the CSB and SBO signals set to the default values with corrections determined in the previous step. Measure the DDM at the descent angle (eventually averaging the value on a long path); if it is not zero, increase $\psi_{sbo}$(rear) and decrease $\psi_{sbo}$ (front) by the same quantity (e.g. 0.5°); if the DDM has moved towards zero, continue in this direction, otherwise reverse the direction. Stop when DDM reaches the minimum absolute value.

Theoretically, it is possible to determine a reverse formula for the calculation of the required phase adjustment as a function of the measured DDM (including also the sign and therefore the correct direction). This formula, not shown here, could be used as the starting point for the iterative algorithm, to save time.

4) SBO phase vs. CSB phase tuning ($\psi_{sbo}$). This procedure, not needed in the PILS Localizer, could be required to align the SBO phasor with the CSB phasor in field in order to maximize the displacement sensitivity. The optimum value can be theoretically calculated, but the actual value could be different due to the environment; also, simulations show that the measurements could be performed at low elevation angles, with reliable results. Further, for practical reasons, the quadrature condition is searched (which is easier to find) and then the SBO is shifted by 90°.

Switch-on both arrays, with the CSB and SBO signals set to the values adjusted in the previous steps. Add +90° to all the $\psi_{sbo}$ values, both front and rear. Measure DDM at the up and down edges of the sector (i.e. 2.3° and 3.7°, eventually on an adequately long path) and calculate the average of the two absolute values; if it is not zero, increase all the $\psi_{sbo}$ (both front and rear) by the same quantity (e.g. 1°). If the DDM has moved towards zero, continue in this direction, otherwise reverse the direction. Stop when DDM reaches the minimum absolute value. Then subtract +90° to all the $\psi_{sbo}$ values (both front and rear). The new values, in quadrature respect to the values optimized for the minimum DDM, should produce the maximum DDM displacement sensitivity, since SBO and CSB are in phase.

5) CSB phase adjustment ($\psi_{csb}$). This fine-tuning procedure could adjust the width symmetry, whichever is the reason of the asymmetry with the default values. In fact, simulations prove that by modifying the CSB phase between the rear and the front array it is possible to force an asymmetrical CSB pattern, which is able to compensate for eventual asymmetry of the DDM on the two sides. This fact should be verified in field.

Switch-on both arrays with the default values corrected during the previous steps. Measure the DDM at the up and down edges of the sector (i.e. 2.3° and 3.7°, eventually on an adequately long path). If the absolute values of the two DDMs are different, increase $\psi_{csb}$(Front) and decrease $\psi_{csb}$(Rear) by the same quantity (e.g. 1°); if the symmetry improves, then continue in this direction, otherwise reverse the direction. Stop when DDM reaches the required symmetry.

6) Sector width tuning ($A_{sbo}$). This mandatory procedure adjusts the overall SBO amplitude needed to achieve the correct sector width, i.e. the elevation values (nominally 3°±0.7°) where DDM is 0.175.

Switch-on both arrays with the default values corrected during the previous steps. Measure the DDM at the up and down edges of the sector (i.e. 2.3° and 3.7°, eventually, on an adequately long path), and calculate "R" as the ratio between the average of the two values and 0.175. If R≠1, decrement or increment the values of $A_{sbo}$ of both arrays by the same quantity, equal to "R"/2. This procedure should produce the desired value in one step only, or, at least in two iterative steps.

Table 7 below summarizes the six procedures described above; a further fine tuning of the descent angle (step 3) could be required again after the last step.

TABLE 7

Summary of Tuning Procedures for GP

| step | purpose | Tuning | Measurement in field |
|---|---|---|---|
| 1 | Default setting | none | none |
| 2 | Amplitude equalization | $A_{csb}$ | RF level at the descent angle |
| 3 | Zero DDM | $\Psi_{sbo}$ | DDM at the descent angle |

TABLE 7-continued

Summary of Tuning Procedures for GP

| step | purpose | Tuning | Measurement in field |
|---|---|---|---|
| 4 | Maximize Displ. Sensit. | $\Psi_{sbo}$ | DDM at sector edges |
| 5 | Width symmetry | $\Psi_{csb}$ | DDM at sector edges |
| 6 | Sector width | $A_{csb}$ | DDM at sector edges |

The Tuning Control Loop (TCL) is controlled by the CCS and involves all four PILS subsystems—CCS, TD, LOC, and GP. The TCL according to some embodiments is described below.

A set of 'reference points' (i.e., coordinates) needs to be identified during site setup, and programmed into the CCS. These may include: a) runway threshold center point, b) runway end center point, and c) touchdown point (reference for elevation angle; this is where Glide Path intersects angle). Upon commencement of the Tuning activity, the CCS notifies the LOC and GP that tuning is occurring. LOC and GP should take action (e.g., enter Test Mode) to ensure that no air traffic attempts to use the ILS signal during this time. Ident is disabled or Continuous in Test Mode.

The CCS has a pre-programmed flight path and uses the 'reference points' to calculate locations in space at which measurements shall be performed. The CCS may also serve as a Human-Machine Interface (HMI) point for manual entry of a flight path or location. The CCS also allows totally-manual control of the TD. In some embodiments, the CCS commands the TD subsystem to fly to a particular location. The Unmanned Aerial Vehicle (UAV; portion of the TD subsystem) flies towards the specified location. During flight, the TD subsystem constantly feeds location information back to the CCS in some embodiments. This location data comes from both the UAV, and any ground-based location-tracking devices according to some embodiments.

The CCS compiles and processes the location data to determine exact location in space of the UAV according to some embodiments. The CCS constantly updates the flight instructions based on the calculated current location. The UAV and ground-based devices communicate location information to the TD ground station, which in turn relays information to the CCS according to some embodiments.

When the prescribed location is reached, the CCS commands the TD to start measuring parameters for LOC, GP, or both according to some embodiments. Measurement data is fed back to the CCS via the TD ground system according to some embodiments. When the prescribed location is reached, the CCS commands the TD to start measuring parameters for LOC, GP, or both. Measurement data is fed back to the CCS via the TD ground system. The TD may also constantly measure both LOC and GP data in some embodiments, and constantly report it back to the CCS.

As measurements are made at the measurement point in space, the CCS processes the data and determines measurement error—current measurement versus desired measurement according to some embodiments. For flight instructions that require simultaneous movement and measurement, it is critical that the location data and measurement data be synchronized, so that the measurement data is known at each specific point along the path. In the event a delay compensation or post-processing is required, the UAV may 'hover' and/or land while CCS processes data.

The CCS uses the measurement error to calculate the Signal-in-Space (SiS) changes needed to one or more antenna elements within the LOC or GP antenna arrays according to some embodiments. The CCS commands the LOC and/or GP Central Processing Modules (CPM) to make the required changes to the SiS being transmitted by specific elements according to some embodiments. SiS changes are made within the LOC and GP subsystems, and the LOC and GP report to the CCS when the changes are complete. If necessary, the CCS may command the LOC and/or GP to only transmit through certain antenna elements, in some embodiments, with each element having independent Transmitter on/off controls.

The TD continues to measure the SiS, and the CCS continues processing the measurement data and requesting changes of the LOC and GP in some embodiments. The TD repeats the flight path for the current measurement, and the CCS verifies that the SiS is 'good'. Once the measured SiS is acceptable, the CCS commands the TD to move on to the next measurement location in some embodiments. The CCS keeps track of changes made at various locations, and determines if any locations need to be revisited, as a result of SiS changes made at other locations.

While some LOC and GP parameters may be tunable simultaneously, it is envisioned that, for the most part, one will be tuned first, and then the other will be tuned. Once all tuning is complete, the CCS may command the TD to fly a verification flight path, during which time the CCS ensures that all measurements are within limits, at all critical locations. Once flight check is complete, the CCS commands the UAV to land. The CCS indicates to the LOC and GP that the Tuning event has ended, and the LOC and GP may resume Normal Mode.

The control loop is intended to correct position deviations such that the intended position is maintained. For GPS implementations, the control loop is self-contained within the drone. For GPS/GNSS-denied implementations, a distributed localization using on-board sensors and/or ground sensors would be performed. The information would be consolidated in the tuning position control. The position determination needs to be accomplished with a sufficiently low delay in order to be compliant with the positioning control laws (i.e. <400 ms, depending on speed). This includes low delays in the transmission of the different position data from the distributed sources. Procedures for correcting position deviations during GPS-denied situations can also be used in GPS implementations which GPS signal reception is experienced.

Figure 51:
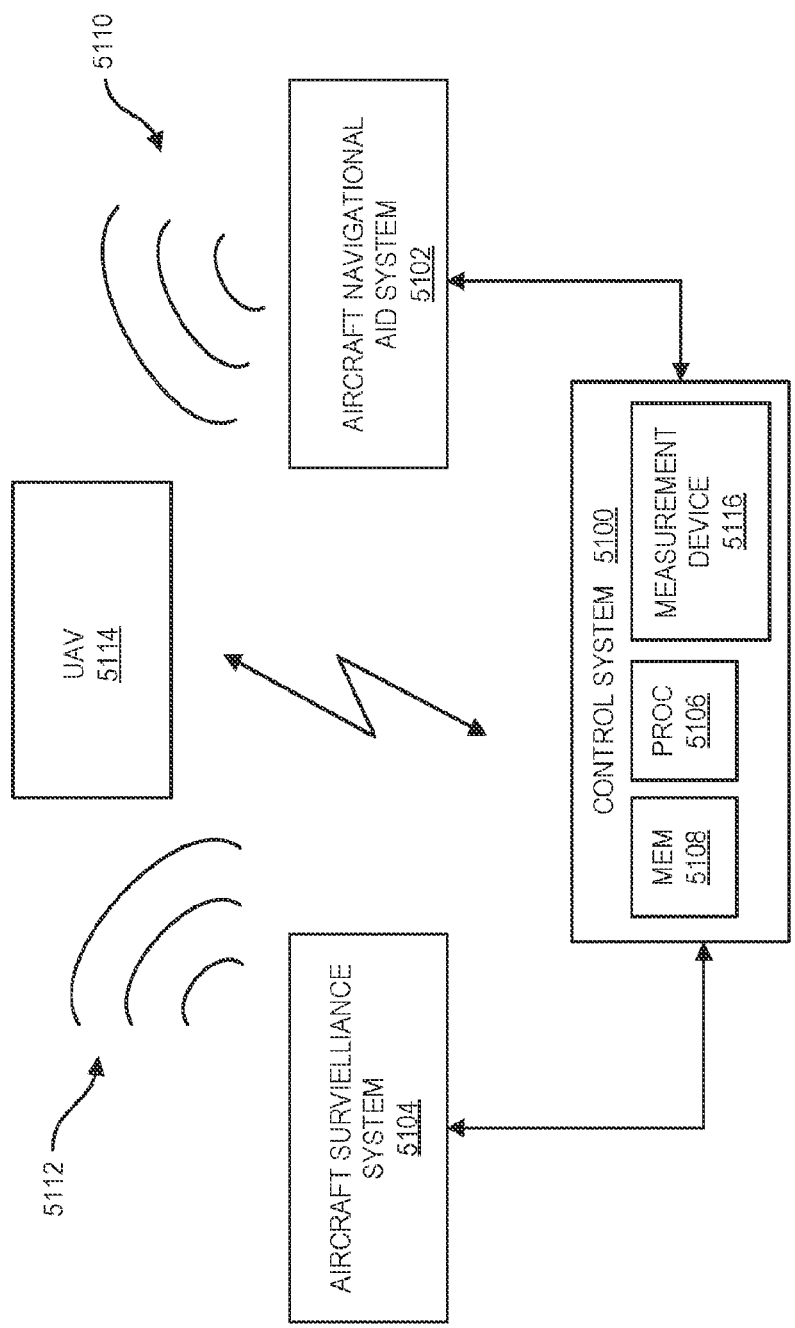
FIG. 51 is a block diagram illustrating a control system in communication with an aircraft navigational system and an aircraft surveillance system in accordance with embodiments of the present disclosure.
Figure 52:
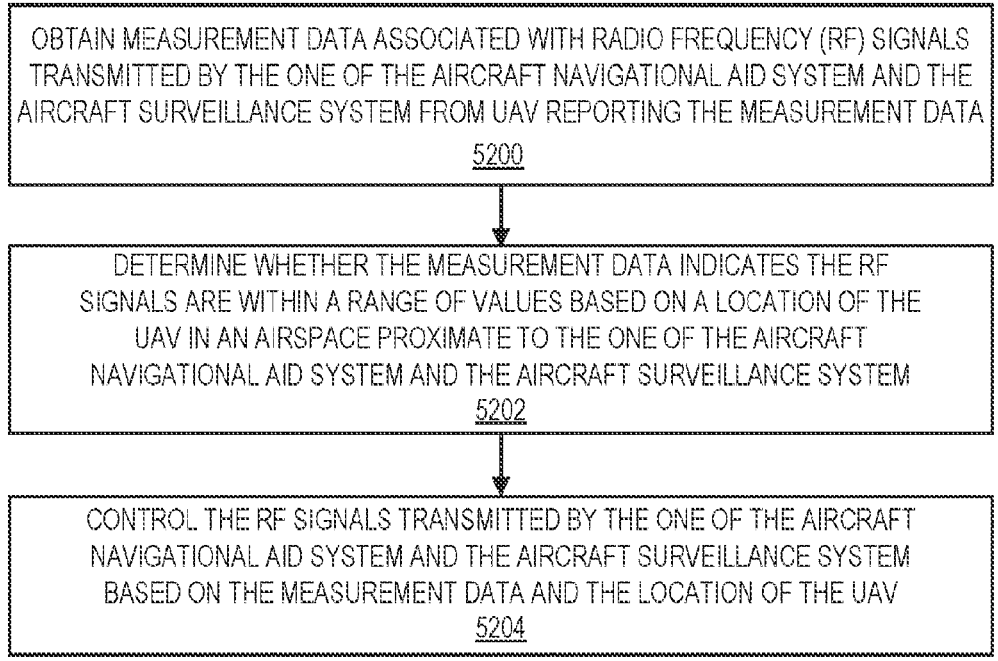
FIG. 52 is a flowchart illustrating a method performed by the control system in accordance with embodiments of the present disclosure.

The following measurements may be obtained by the drone to tune the navigational aid and surveillance systems:
DDM:
   Measurement needed for tuning
   final quality measure—end result
   total DDM over required coverage volume to be compliant with standard
Signal Components CSB and SBO
   Measurement needed for tuning
   By signal component tuning the DDM is affected
   Ideally only amplitude of modulation tone to be used to tune
   Potentially also the phase to be set
RF-Level of carrier
   Measurement needed for tuning
IDENT
   Not required for tuning, but to be checked for compliance
Frequency
   Not required for tuning
   Frequency can be pre-configured and verified on ground Spectrum
   Not required for tuning, but check for compliance
   Can be measured on ground
Tone Frequency
   Not required for tuning, but check for compliance
   Can be measured on ground
Tone THD
   Not required for tuning, but check for compliance
   Can be measured on ground FIG. 52 illustrates a method performed by a control system in communication with one of an aircraft navigational aid system and an aircraft surveillance system according to some embodiments of the present disclosure. For example, FIG. 51 illustrates an example control system 5100 in communication with aircraft navigational aid system 5102 and aircraft surveillance system 5104. According to embodiments, the aircraft navigational aid system may comprise at least one of a localizer system, a glidepath system, a VOR system, a TACAN system, and a DME system. In some embodiments, the aircraft navigational aid system may comprise a localizer system as described above with regards to FIG. 4 and FIGS. 32-34. In some embodiments, the aircraft navigational aid system may comprise a glide slope/glide path system as discussed above with regards to FIGS. 1, 10 and 32-34 as described above. In some embodiments, the aircraft surveillance system comprises a radar surveillance system.

Returning to FIG. 52, the method includes obtaining 5200 measurement data associated with radio frequency (RF) signals transmitted by the one of the aircraft navigational aid system and the aircraft surveillance system from an unmanned aerial vehicle (UAV) reporting the measurement data. For example, control system 5100 illustrated in FIG. 51 obtains measurement data associated with RF signals 5110, 5112 transmitted by one of aircraft navigational aid system 5102 and aircraft surveillance system 5104 from UAV 5114 reporting the measurement data. The method also includes determining 5202 whether the measurement data indicates the RF signals are within a range of values based on a location of the UAV in an airspace proximate to the one of the aircraft navigational aid system and the aircraft surveillance system. Additional examples and embodiments regarding determining whether the measurement data indicates the RF signals within the range of values are also discussed above with, for example, regards to FIGS. 1, and 26-48.

For example, FIG. 51 illustrates control system 5100 determines whether the measurement data indicates RF signals 5110, 5112 are within a range of values based on a location of UAV 5114 in an airspace proximate to aircraft navigational aid system 5102 and aircraft surveillance system 5102. Returning to FIG. 51, the method further includes controlling 5204 the RF signals transmitted by the one of the aircraft navigational aid system and the aircraft surveillance system based on the measurement data and the location of the UAV. Continuing the previous example, control system 5100 controls RF signals 5110, 5112 transmitted by one of the aircraft navigational aid system 5102 and aircraft surveillance system 5104 based on the measurement data and the location of UAV 5114. Additional examples and embodiments regarding controlling the RF signals transmitted by the one of the aircraft navigational aid system and the aircraft surveillance system are also discussed above with regards to FIGS. 26-48 and 50.

Figure 53:
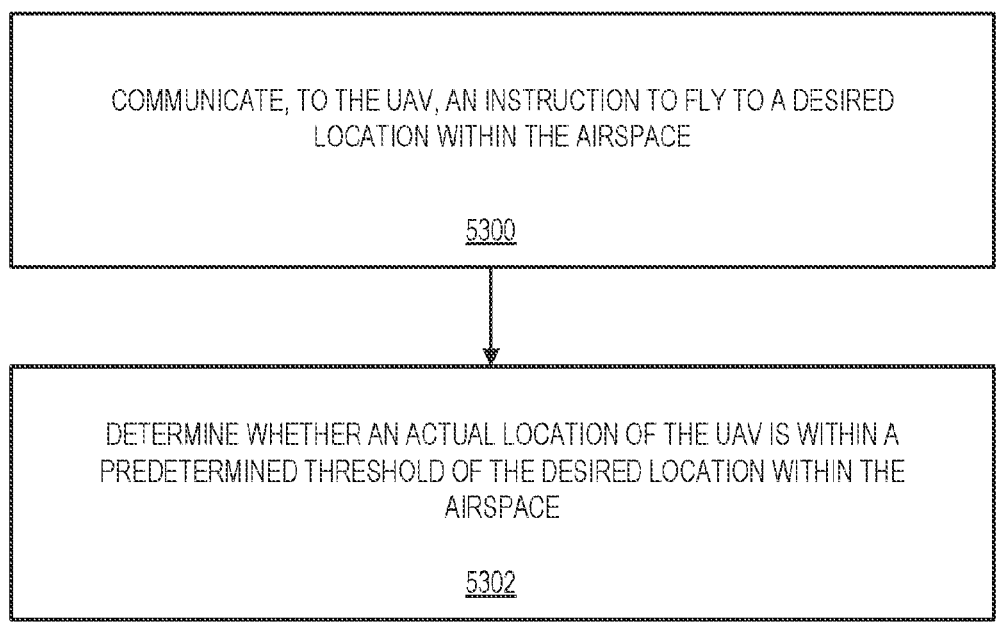
FIG. 53 is a flowchart illustrating a method of determining whether an actual location of a UAV is within a predetermined threshold of a desired location within an airspace in accordance with embodiments of the present disclosure.

FIG. 53 illustrates the method includes communicating 5300, to the UAV, an instruction to fly to a desired location within the airspace in some embodiments. For example, control system 5100 communicates, to UAV 5114, an instruction to fly to a desired location within the airspace. FIG. 53 also illustrates the method includes determining 5302 whether an actual location of the UAV is within a predetermined threshold of the desired location within the airspace. Continuing the previous example, control system 5100 illustrated in FIG. 51 determines whether an actual location of UAV 5114 is within a predetermined threshold of the desired location within the airspace. Additional examples and embodiments regarding a control system determining whether an actual location of the UAV is within a predetermined threshold of the desired location within the airspace are also discussed above, for example, with regards to FIGS. 1, 26, 30-35 and 49.

Figure 54:
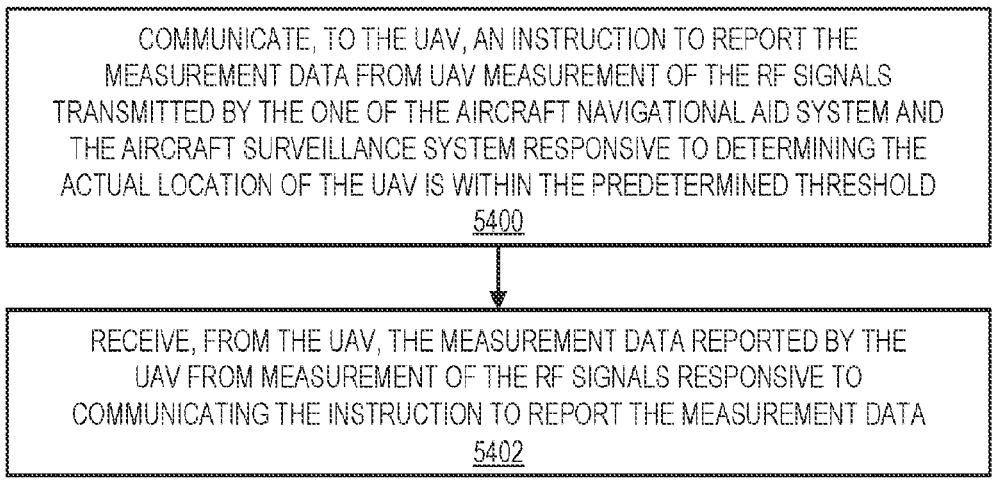
FIG. 54 is a flowchart illustrating a method of communicating an instruction to report measurement data to a UAV in accordance with embodiments of the present disclosure.

FIG. 54 illustrates the method also includes communicating 5400, to the UAV, an instruction to report the measurement data from UAV measurement of the RF signals transmitted by the one of the aircraft navigational aid system and the aircraft surveillance system in response to determining the actual location of the UAV is within the predetermined threshold according to some embodiments. Continuing the previous example, control system 5100 communicates, to the UAV 5114, an instruction to report the measurement data from UAV measurement of the RF signals 5110, 5112 transmitted by one of aircraft navigational aid system 5102 and aircraft surveillance system 5104 in response to determining the actual location of UAV is within the predetermined threshold. In this embodiment, the method also includes receiving 5402, from the UAV, the measurement data reported by the UAV from measurement of the RF signals responsive to communicating the instruction to report the measurement data as shown in FIG. 53. Continuing the previous example, control system 5100 receives, from UAV 5114, measurement data reported by the UAV from measurement of the RF signals 5110, 5112 responsive to communicating the instruction to report the measurement data. Additional examples and embodiments regarding a control system receiving, from the UAV, the measurement data reported by the UAV from measurement of the RF signals responsive to communicating the instruction to report the measurement data are also discussed above, for example, with regards to FIGS. 1 and 26-35.

Figure 55:
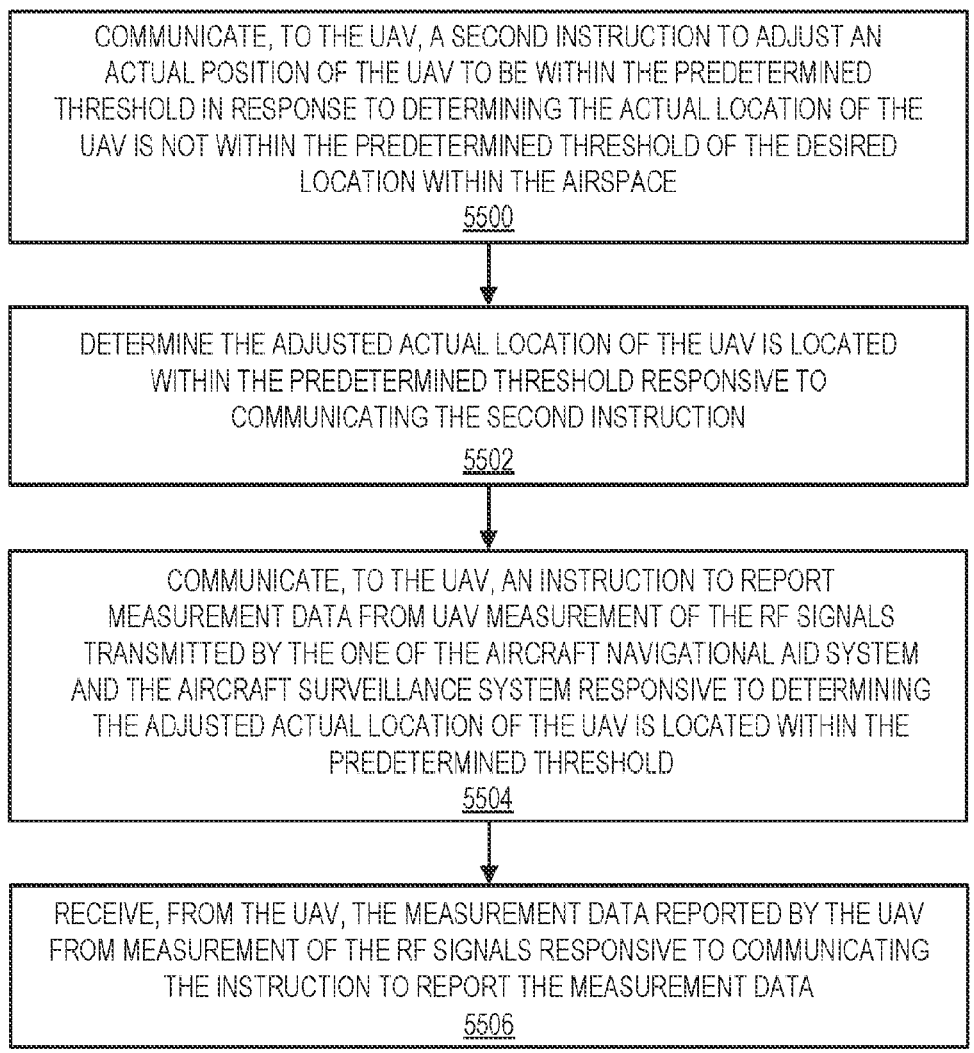
FIG. 55 is a flowchart of a method of communicating a second instruction to adjust an actual position of the UAV to be within a predetermined threshold to a UAV in accordance with embodiments of the present disclosure.

According to some embodiments, the method also includes communicating 5500, to the UAV, a second instruction to adjust an actual position of the UAV to be within the predetermined threshold in response to determining the actual location of the UAV is not within the predetermined threshold of the desired location within the airspace as illustrated in FIG. 55. In another example, control system 5100 illustrated in FIG. 51 communicate, to UAV 5114, a second instruction to adjust an actual position of UAV 5114 to be within the predetermined threshold in response to determining the actual location of UAV 5114 is not within the predetermined threshold of the desired location within the airspace. In this embodiment, FIG. 55 also illustrates the method also includes determining 5502 the adjusted actual location of the UAV is located within the predetermined threshold in response to communicating the second instruction. Continuing the previous example, control system 5100 determines the adjusted actual location of UAV 5114 is located within the predetermined threshold in response to communicating the second instruction.

FIG. 55 also illustrates the method also includes communicating 5504, to the UAV, an instruction to report measurement data from UAV measurement of the RF signals transmitted by the one of the aircraft navigational aid system and the aircraft surveillance system according to some embodiments. Continuing the previous example, control system 5100 communicates, to UAV 5114, an instruction to report measurement data from UAV measurement of the RF signals 5110, 5112 transmitted by one of aircraft navigational aid system 5102 and aircraft surveillance system 5104. In this embodiment, FIG. 55 illustrates the method also includes receiving 5506, from the UAV, the measurement data reported by the UAV from measurement of the RF signals responsive to communicating the instruction to report the measurement data. In the previous example, control system 5100 also receives, from UAV 5114, the measurement data reported by UAV 5114 from measurement of the RF signals 5110, 5112 in response to communicating the instruction to report the measurement data. Additional examples and embodiments regarding the method described with regards to FIG. 55 are also discussed above, for example, with regards to FIGS. 1 and 30-35.

In some embodiments, the method also includes obtaining location information identifying the actual location of the UAV within the airspace from at least one of a measurement device of the control system and the UAV. For example, control system 5100 illustrated in FIG. 51 obtains location information identifying the actual location of the UAV within the airspace from at least one of a measurement device 5116 of control system 5100 and UAV 5114. In some embodiments, the measurement device comprises one or more of a primary surveillance radar, a laser tracker, an RF beacon, a Total Station Theodolite (TST), a barometric altimeter, intertial navigation system, a radar/laser altimeter. In some embodiments, the location information comprises GPS coordinates of the UAV. In some embodiments, the location information comprises a range, azimuth, and elevation of the UAV. In some embodiments, the location information comprises atmospheric pressure experienced by the UAV. In some embodiments, the location information comprises dead reckoning of a position, orientation, and velocity of the UAV. In some embodiments, the location information comprises information indicating an amount of time it takes for a beam of radio waves or a beam of light to travel to a ground beneath the UAV, reflect, and return to the UAV.

In some embodiments, the method also includes determining whether the actual location of the UAV is within the predetermined threshold of the desired location within the airspace based on the location information. Continuing the previous example, control system 5100 determines whether the actual location of UAV 5114 is within the predetermined threshold of the desired location within the airspace based on the location information. In some embodiments, the airspace proximate to the one of the aircraft navigational aid system and the aircraft surveillance system is a GNSS-denied airspace. In this embodiment, the method also includes obtaining the location information identifying the actual location of the UAV within the GNSS-denied airspace from the measurement device of the control system. For example, the airspace proximate to one of aircraft navigational aid system 5102 and the aircraft surveillance system 5104 may comprise a GNSS-denied airspace. In this example, control system 5100 obtains the location information identifying the actual location of UAV 5114 within the GNSS-denied airspace from the measurement device 5116 of control system 5116.

In some embodiments, the instruction to fly to the desired location within the airspace further comprises an instruction for the UAV to hover at the desired location within the airspace. In some other embodiments, instruction to report measurement data from UAV measurement of the RF signals transmitted by the one of the aircraft navigational aid system and the aircraft surveillance system comprises an instruction to report measurement of the RF signals while hovering at the desired location within the airspace. In these embodiments, the UAV is configured to hover in the location in the airspace during flight. For example, UAV 5114 illustrated in FIG. 51 may comprise one or more of a quadcopter, a hectacopter, an octocopter, and a helicopter configured to hover at a desired location within the airspace. In some embodiments, the UAV is configured to perform vertical takeoff and landing.

Figure 56:
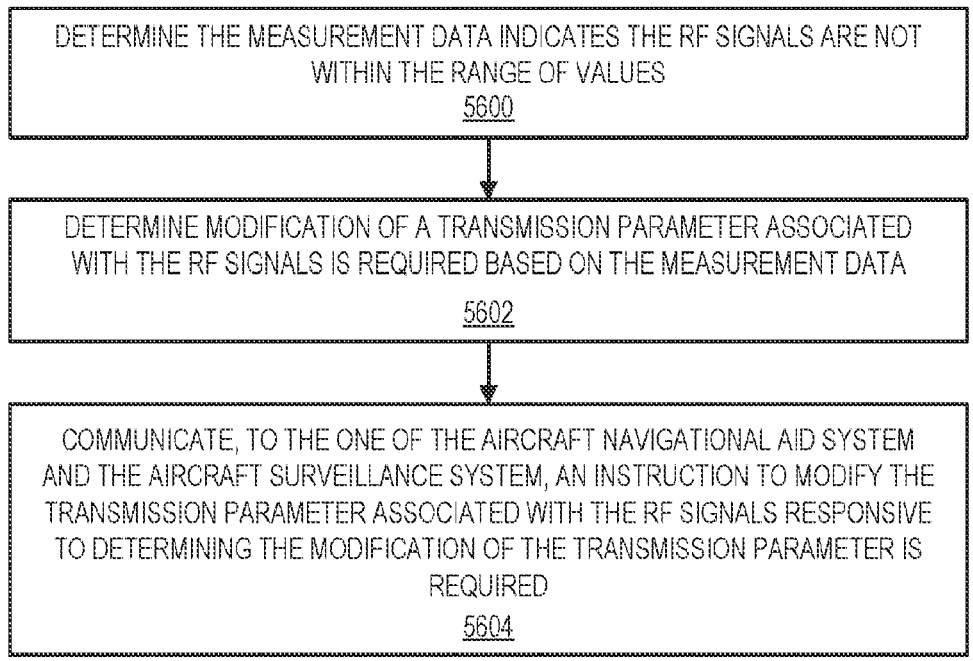
FIG. 56 is a flowchart of a method of communicating an instruction to modify transmission parameters associated with RF signals to one of the aircraft navigational system and the aircraft surveillance system in accordance with embodiments of the present disclosure.

FIG. 56 illustrates the method also includes determining 5600 the measurement data indicates the RF signals are not within the range of values according to some embodiments. The method also includes determining 5602 modification of a transmission parameter associated with the RF signals is required based on the measurement data. For example, control system 5100 illustrated in FIG. 51 determines the measurement data indicates the RF signals are not within the range of values. The control system 5100 also determines modification of a transmission parameter associated with the RF signals is required based on the measurement data in this example. Returning to FIG. 56, the method also includes communicating 5604, to the one of the aircraft navigational aid system and the aircraft surveillance system, an instruction to modify the transmission parameter associated with the RF signals responsive to determining the modification of the transmission parameter is required. Continuing the previous example, control system 5100 communicates, to one of aircraft navigational aid system 5102 and aircraft surveillance system 5104, an instruction to modify the transmission parameter associated with the RF signals responsive to determining the modification of the transmission parameter is required. Additional examples and embodiments regarding the method described with regards to FIG. 56 are also discussed above, for example, with regards to FIGS. 1-5, 10, 26-29, 32-34, and 50.

Figure 57:
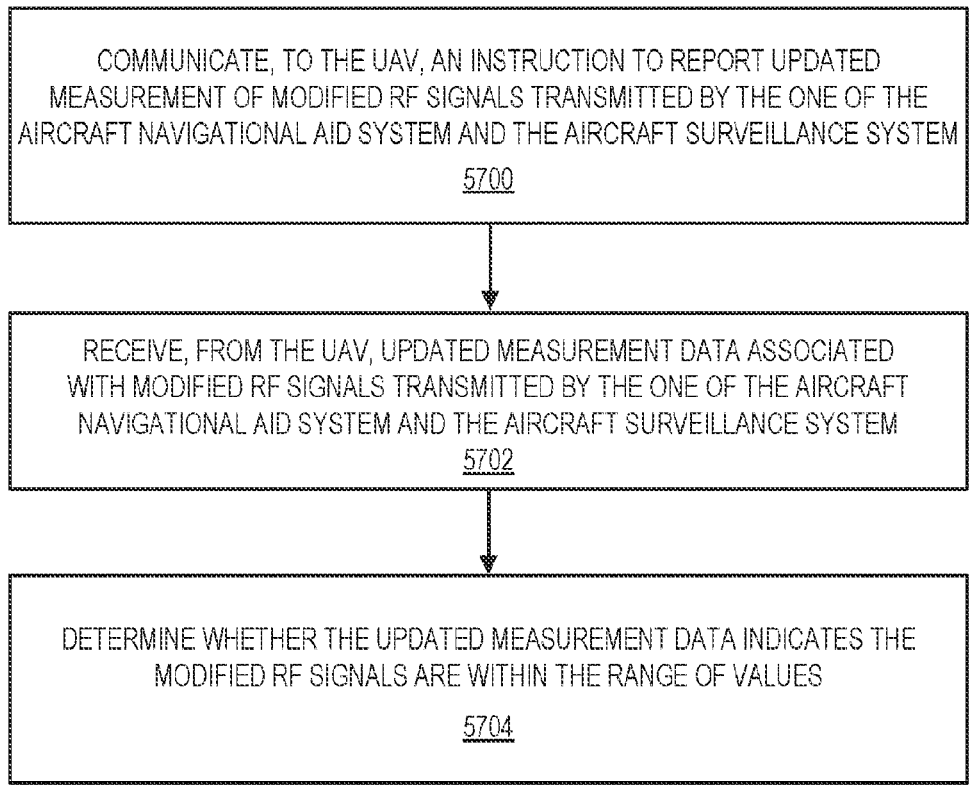
FIG. 57 is a flowchart of a method of determining whether updated measurement data indicates modified RF signals are within a range of values in accordance with embodiments of the present disclosure.

FIG. 57 illustrates the method also includes communicating 5700, to the UAV, an instruction to report updated measurement of modified RF signals transmitted by the one of the aircraft navigational aid system and the aircraft surveillance system according to some embodiments. For example, control system 5100 illustrated in FIG. 51 communicates, to UAV 5114, an instruction to report updated measurement of modified RF signals 5110, 5112 transmitted by one of aircraft navigational aid system 5102 and aircraft surveillance system 5104. FIG. 57 also illustrates the method also includes receiving 5702, from the UAV, updated measurement data associated with modified RF signals transmitted by the one of the aircraft navigational aid system and the aircraft surveillance system. Continuing the previous example, control system 5100 receives, from UAV 5114, updated measurement data associated with modified RF signals 5110, 5112 transmitted by one of aircraft navigational aid system 5102 and aircraft surveillance system 5104. The method also includes determining 5704 whether the updated measurement data indicates the modified RF signals are within the range of values. Continuing the previous example, control system 5100 determines whether the updated measurement data indicates the modified RF signals are within the range of values.

In some embodiments, the method also includes communicating, to the UAV, an instruction to fly the UAV to a second desired location within the airspace to measure the RF signals transmitted by the one of the aircraft navigational aid system and the aircraft surveillance system in response to determining the updated measurement data indicates the modified RF signals are within the range of values. Continuing the previous example, the control system 5100 communicates, to UAV 5114, an instruction to fly to a second desired location within the airspace to measure the modified RF signals 5110, 5112 transmitted by the one of aircraft navigational aid system 5102 and aircraft surveillance system 5104 in response to determining the updated measurement data indicates modified RF signals 5110, 5112 are within the range of values.

In another embodiment, the method also includes communicating, to the UAV, an instruction to land the UAV in response to determining the updated measurement data indicates the modified RF signals are within the range of values. In this example, control system 5100 communicates, to UAV 5114, an instruction to land UAV 5114 in response to determining the updated measurement data indicates modified RF signals 5110, 5112 are within the range of values.

The method also includes determining modification of a transmission parameter of an antenna element of an antenna array of the one of the aircraft navigational aid system and the aircraft surveillance system is required according to some embodiments. For example, control system 5100 determines modification of a transmission parameter of an antenna element of an antenna array (not shown in FIG. 51) of the one of aircraft navigational aid system 5102 and aircraft surveillance system 5104 is required according to some embodiments. In one embodiment, the antenna element comprises an antenna element of a localizer antenna array as described herein. In another embodiment, the antenna element comprises an antenna element of a glideslope/glidepath antenna array described herein.

In this embodiment, the method also includes communicating, to the one of the aircraft navigational aid system and the aircraft surveillance system, an instruction to modify the transmission parameter of the antenna element and an identification of the antenna element of the antenna array. Continuing the previous example, control system 5100 illustrated in FIG. 51 communicates, to one of aircraft navigational aid system 5102 and aircraft surveillance system 5104, an instruction to modify the transmission parameter of the antenna element and an identification of the antenna element of the antenna array. Additional examples and embodiments regarding the method described in this embodiment are also discussed above, for example, with regards to FIGS. 1-5, 10, 26-29, 32-34, and 50.

Figure 58:
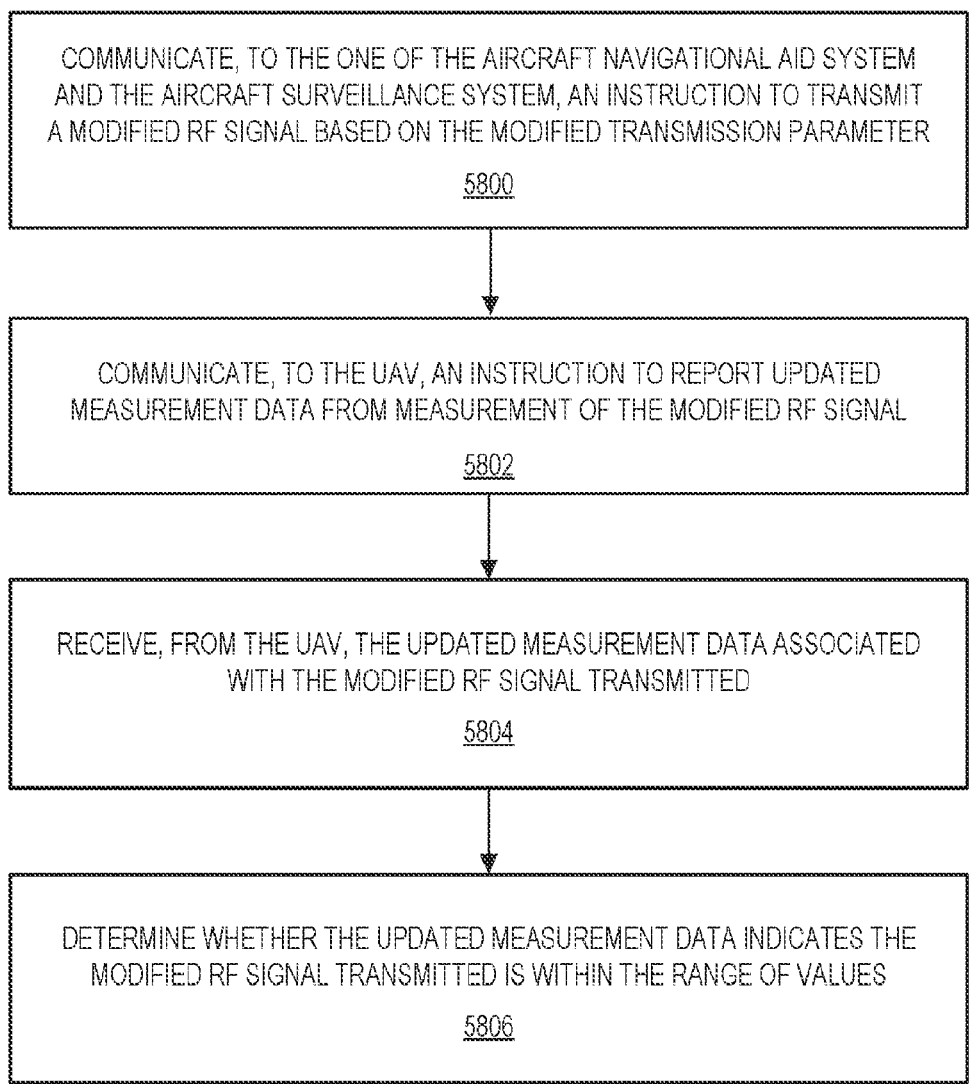
FIG. 58 is a flowchart of a method of communicating an instruction to report updated measurement data to a UAV in accordance with embodiments of the present disclosure.

FIG. 58 illustrates the method also includes communicating 5800, to the one of the aircraft navigational aid system and the aircraft surveillance system, an instruction to transmit a modified RF signal based on the modified transmission parameter according to some embodiments. Continuing the previous example, control system 5100 communicates, to one of aircraft navigational aid system 5102 and aircraft surveillance system 5104, an instruction to transmit a modified RF signal 5110, 5112 based on the modified transmission parameter. The method also includes communicating 5802, to the UAV, an instruction to report updated measurement data from measurement of the modified RF signal as shown in FIG. 58. In this example, control system 5100 communicates, to UAV 5114, an instruction to report updated measurement data from measurement of modified RF signal 5110, 5112.

FIG. 58 illustrates the method also includes receiving 5804, from the UAV, the updated measurement data associated with the modified RF signal transmitted. Continuing the previous example, control system 5100 receives, from UAV 5114, updated data associated with modified RF signal 5110, 5112 transmitted. FIG. 58 further illustrates the method also includes determining 5806 whether the updated measurement data indicates the modified RF signal transmitted is within the range of values. In this example, control system 5100 determines whether the updated measurement data indicates modified RF signal 5110, 5112 transmitted is within the range of values.

Figure 59:
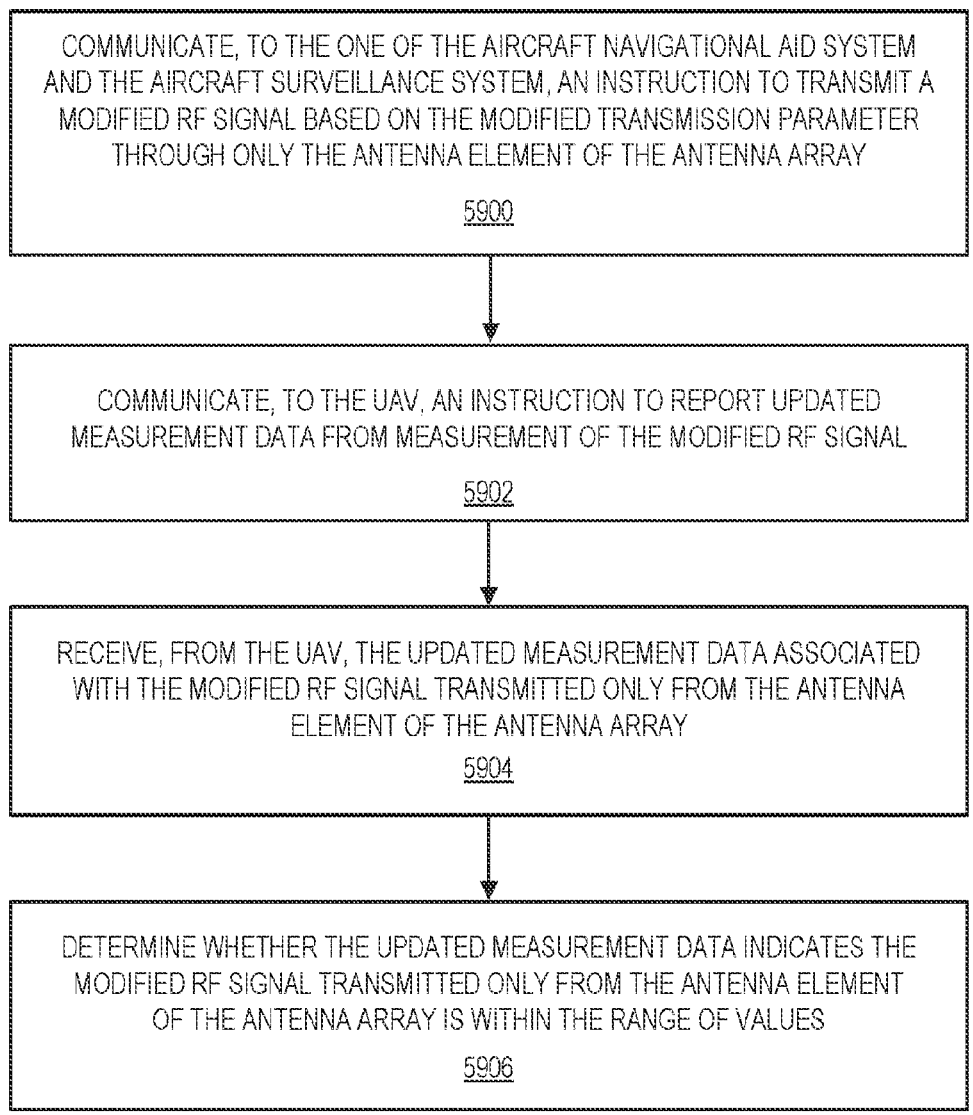
FIG. 59 is a flowchart of a method of determining whether updated measurement data indicates a modified RF signal transmitted only from an antenna element of an antenna array is within a range of values in accordance with embodiments of the present disclosure.

FIG. 59 illustrates the method also includes communicating 5900, to the one of the aircraft navigational aid system and the aircraft surveillance system, an instruction to transmit a modified RF signal based on the modified transmission parameter through only the antenna element of the antenna array. For example, control system 5100 illustrated in FIG. 51 communicates, to one of aircraft navigational aid system 5102 and aircraft surveillance system 5104, an instruction to transmit a modified RF signal based on the modified transmission parameter through only the antenna element of the antenna array. For example, such as an antenna element of antenna arrays 402, 1002 described above and the antenna arrays described with regards to FIGS. 32-34 above.

FIG. 59 also illustrates the method also includes communicating 5902, to the UAV, an instruction to report updated measurement data from measurement of the modified RF signal. The method also includes receiving 5904, from the UAV, the updated measurement data associated with the modified RF signal transmitted only from the antenna element of the antenna array and determining 5906 whether the updated measurement data indicates the modified RF signal transmitted only from the antenna element of the antenna array is within the range of values. Continuing the previous example, control system 5100 communicates, to UAV 5114, an instruction to report updated measurement data from measurement of modified RF signal 5110, 5112. In this example, the control system 5100 receives, from UAV 5114, the updated measurement data associated with the modified RF signal transmitted only from the antenna element of the antenna array. Then, the control system 5100 determines whether the updated measurement data indicates modified RF signal 5110, 5112 transmitted only from the antenna element of the antenna array is within the range of values. In some other embodiments, the instruction to transmit the modified RF signal further comprises an instruction to cease transmission from all other antenna elements of the antenna array.

In some embodiments, the method includes determining the additional measurement data is within the range of values and communicating, to the one of the aircraft navigational aid system and the aircraft surveillance system, an instruction to reactivate all antenna elements of the antenna array in response to determining the additional measurement data is within the range of values. For example, control system 5100 determines the additional measurement data is within the range of values and communicates, to one of aircraft navigational aid system 5102 and aircraft surveillance system 5104, an instruction to reactivate all antenna elements of the antenna array in response to determining the additional measurement data is within the range of values. In another example, control system 5100 may instruct a localizer system of aircraft navigational aid system 5102 to reactive all antenna elements of a localizer antenna array, such as localizer antenna array 402 and the localizer antenna array described above with regards to FIGS. 32-34. In another example, control system 5100 may instruct a glideslope/glidepath system of aircraft navigational aid system 5102 to reactive all antenna elements of a glideslope/glidepath antenna array, such as glideslope/glidepath antenna array 1002 and the glideslope/glidepath antenna array described above with regards to FIGS. 32-34.

Figure 60:
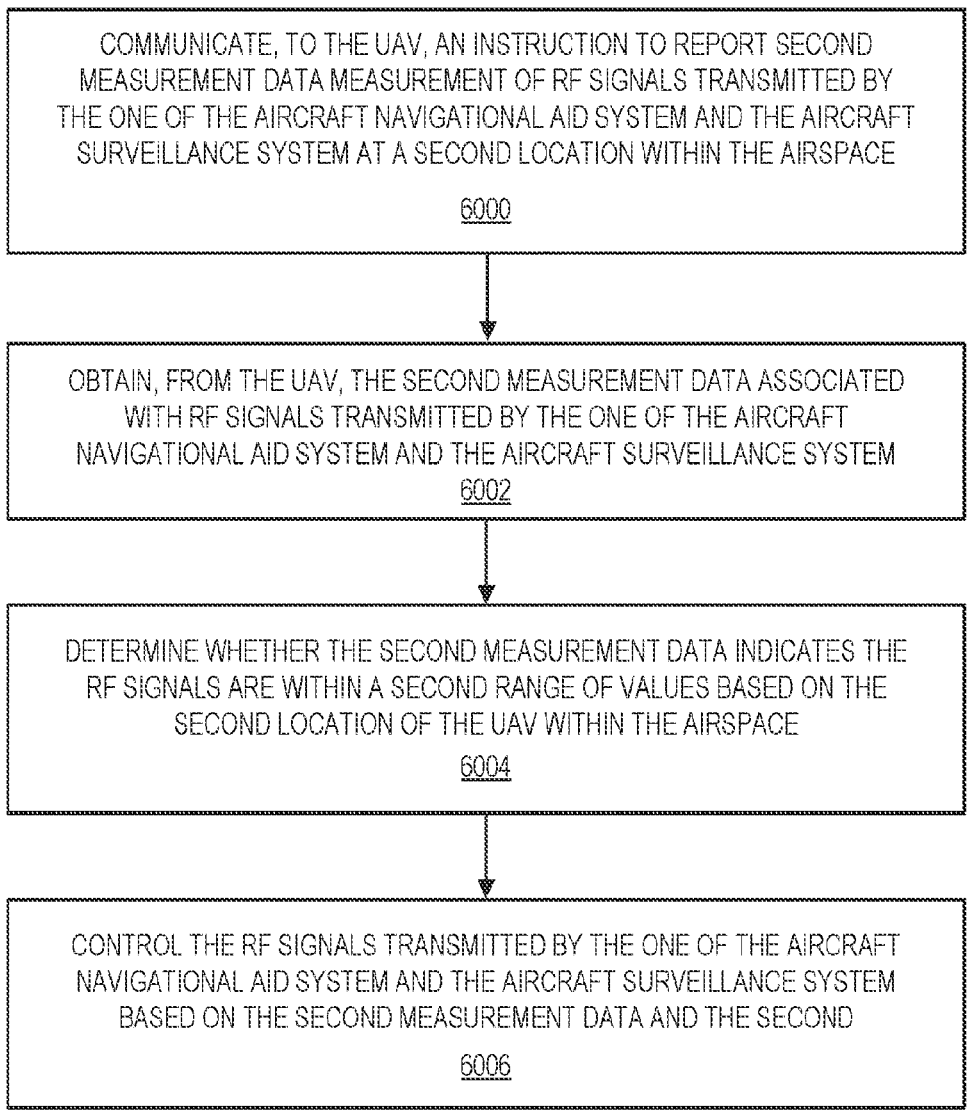
FIG. 60 is a flowchart of a method of controlling RF signals transmitted by one of the aircraft navigational aid system and the aircraft surveillance system based on second measurement data and a second location of the UAV within the airspace in accordance with embodiments of the present disclosure.

FIG. 60 illustrates the method also includes communicating 6000, to the UAV, an instruction to report second measurement data measurement of RF signals transmitted by the one of the aircraft navigational aid system and the aircraft surveillance system at a second location within the airspace according to some embodiments. For example, control system 5100 illustrated in FIG. 51 communicates, to UAV 5114, an instruction to report second measurement data measurement of RF signals 5110, 5112 transmitted by one of aircraft navigational aid system 5102 and aircraft surveillance system 5104 at a second location within the airspace. For example, FIGS. 61-64 illustrate an example UAV moving to different locations within an airspace to measure RF signals transmitted by components of an aircraft navigational aid system as discussed in further detail below.

FIG. 60 illustrates the method also includes obtaining 6002, from the UAV, the second measurement data associated with RF signals transmitted by the one of the aircraft navigational aid system and the aircraft surveillance system. The method also includes determining 6004 whether the second measurement data indicates the RF signals are within a second range of values based on the second location of the UAV within the airspace as shown in FIG. 60. Continuing the previous example, control system 5100 illustrated in FIG. 51 obtains, from UAV 5114, the second measurement data associated with RF signals 5110, 5112 transmitted by one of aircraft navigational aid system 5102 and the aircraft surveillance system 5104. In this example the control system determines whether the second measurement data indicates RF signals 5110, 5112 are within a second range of values based on the second location of UAV 5114 within the airspace.

Returning to FIG. 60, the method further includes controlling 6006 the RF signals transmitted by the one of the aircraft navigational aid system and the aircraft surveillance system based on the second measurement data and the second location of the UAV within the airspace. Continuing the previous example, control system 5100 controls RF signals 5110, 5112 transmitted by one of aircraft navigational aid system 5102 and the aircraft surveillance system 5104 based on the second measurement data and the second location of UAV 5114 within the airspace. Additional examples and embodiments regarding the method described in this embodiment are also discussed above, for example, with regards to FIGS. 1, 30-36, 40, 42, 44, and 47-49 described above and FIGS. 61-64 described below.

FIG. 51 further illustrates control system 5100 comprises a processor 5106 and a memory 5108. Memory 5108 comprises executable instructions that when executed by processor 5106 cause processor 5106 to perform operation in accordance with the various methods described herein. According to some embodiments, a computer program product comprised on a non-transitory computer readable medium, such as memory 5108, includes executable instructions that when executed by a processor, such as processor 5106 of control system 5100, in communication with one of an aircraft navigational aid system and an aircraft surveillance system, causes the control system to perform operations of the various methods described herein. In some embodiments, the control system 5100 is adapted to perform the various methods described herein.

The following paragraphs discuss the processes that can be used to tune the LOC centerline, LOC sector width, GP angle and GP sector width using a properly positioned and equipped drone.

Tuning the PILS to the LOC course could be accomplished by simply hovering the drone or raising the drone's ILS antenna above the runway centerline at a threshold end of a runway. The position of the drone would have to be controlled and measured within an ±0.3 m accuracy requirement. Data from the drone's ILS receiver could then be collected and transmitted to the CCS for LOC antenna element phase and amplitude and calculations and adjustments. Per Table 1 described above, the intent would be to drive the DDM to a value less than 0.42 µA at the centerline.

Next the drone could hover over the runway centerline at the threshold at 10-20 m, then fly perpendicular to the centerline to a second position at one side of the runway out to 107 m. Hovering at this location, the DDM is adjusted to as near as possible to 0.155 (150 µA). Next, the drone again flies perpendicular to the centerline to third position on the other side of the runway out to 107 m. At this third position the LOC linearity is checked. In addition, the drone could fly a vertical profile directly above the centerline at the threshold end of the runway as a check on the LOC course elevation profile. In order to be consistent with the GS coverage, which is measured relative to the touchdown point and covers up to roughly 7°, the drone could fly a vertical profile from the runway surface up to 40 m over the centerline at the threshold.

In addition, the LOC Clearance should be verified over the range of ±35° from the centerline and a distance close to the LOC. Over this azimuth span, the DDM should vary linearly from zero to 0.155 at the LOC CSW and then from there increases to 180 µA. Once DDM reaches 180 µA it must remain at that level or greater out to the ±35° azimuth positions. In order to verify this within the drone flight limitations, the drone must fly close to the LOC but in a region where the beam pattern is fully formed. This could be accomplished by hovering over the centerline at the stop end of the runway 300 m from the LOC and then flying perpendicular to the centerline ±210 m.

In order to fly through the desired range of elevation angles to measure the GPA, GPSW, and GP azimuthal region, a series of flights is required. The first step is to tune the GPA) (3° by essentially flying the drone to the point 4000 m from the touchdown point on the extended runway centerline. Then, position the drone at a height of 209 m relative to the touchdown point on the extended runway in an X-Y plane. From Table 2 described above, the angular measurement tolerance in this location is ±0.0225° which results in a maximum measurement error of ±1.6 m in the height or Z dimension.

To measure the GPSW the drone would move to a second height. Adjustments to the GP Sector Width would be made at this point and then the drone would transition to a third height. While transitioning, the GPSW linearity would be checked. Once at the third height, the GPSW can be verified. In this example, since the drone is equipped with an ILS receiver capable of simultaneously checking the LOC and the GP signal, data from both SiS can be sent simultaneously. Using this data and knowing the position of the drone within the tolerances, the accuracies of both the LOC and GP can be measured simultaneously While the drone is at this range, the drone can fly a vertical profile to sweep through a range of GP sector angles (see FIG. 47). For example, if the drone drops to a height of 50 m relative to the extended X-Y plane of the runway and then climbs to a height of 450 m, it will transverse GP angles from 0.72° to 6.42° which is sufficient to characterize the GP signal over the angles of interest. From Table 2 discussed above, the maximum measurement error tolerance is ±1.6 m in the height or Z dimension.

Another way to accomplish sweeping through the desired angle space is to hover the drone at a given height above the runway touchdown point at the centerline, then fly the drone at that height out in range on the extended centerline maintaining that height relative to the extended X-Y plane of the runway. FIG. 48 discussed above shows the resulting elevation angles to the drone's position for various height profiles. For example, if the drone is hovered at 100 m above the threshold, then flown to a range of 1000 m, the GS angle would be 5.74°. As the drone moves outbound along the extended runway centerline, the angle continues to decrease. At 4000 m from the touchdown point the angle to the drone would be approximately 1.43°. Several "cuts" in elevation could be made by flying the drone outbound at one height and then raising the height to a different level for the return flight.

A final set of flights could be made to check the azimuthal and elevation dimensions of the GP and the LOC at the 4000 m point. In this case, it would be desirable to test both the LOC and GP signals simultaneously. This could be accomplished by flying a crossing pattern as shown in FIG. 49 and discussed above. Flying this pattern allows the drone to capture and report data from both the LOC and the GP from different azimuths and elevations. For a Glide Path angle of 3°, the elevations dimensions are given by 0.76θ=2.28° to 1.24θ=3.72°. The azimuth dimension is defined by the LOC half sector width ±β, which is the case of a 4000 m runway with 300 m setback is 1.42°.

The following is a brief summary of the drone flights utilized to tune and verify the Localizer performance:

Tuning Flights
Hovering the drone 10-20 m above the runway centerline at the threshold end of the runway and adjust the LOC antenna pattern to drive the DDM to as close to zero as possible but less than 0.42 µA;
Hover over the runway centerline at the threshold at 10-20 m, then fly perpendicular to the centerline to one side of the runway out to 107 m. Hover at this point and adjust the DDM to as near as possible to 0.155 (150 µA). Repeat on the opposite side. Fly the entire path length again to verify the SiS varies linearly from the centerline to the LOC sector edges;

Verification Flights
While hovering over the runway centerline at the threshold, fly a vertical profile from zero to 40 m to check the elevation pattern of the LOC;
The LOC Signal in Space (SiS) should be verified over the range of ±35°. Over this azimuth span, the DDM should vary linearly from zero to 0.155 at the LOC CSW and then from there to 180 µA. Once DDM reaches 180 µA it must remain at that level or greater out to the ±35° azimuth positions. In order to verify this within the drone flight limitations, the drone must fly close to the LOC but in a region where the beam pattern is fully formed. This could be accomplished by hovering over the centerline at the stop end of the runway 300 m from the LOC and then flying perpendicular to the centerline ±210 m.

The following is a brief summary of the drone flights required to tune and check the Glide Path performance:

Tuning Flights
Fly the drone to the 4000 m point along the extended runway centerline at a height of 209 m above the extended runway X-Y plane. Measure and adjust the DDM to as near zero as possible but less than 4.7 µA for a GPA (3°). Measure GPA and LOC signals to verify SiS;
Once at 4000 m from the touchdown point, to measure the GPSW the drone would move from position 1 to position 3 show in FIG. 64. Adjustments to the GP Sector Width would be made at this point and then the drone would transition to point 2. Once at point 2 the GPSW can be verified.

Verification Flights
At 4000 m, fly the vertical profile from 50 m to 450 m to sweep though angles from 0.72° to 6.42° measuring the GP elevation pattern;
Flying the pattern in FIG. 49 allows the drone to capture and report data from both the LOC and the GP from different azimuths and elevations. For a Glide Path angle of 3°, the elevations dimensions are given by 0.76θ=2.28° to 1.24θ=3.72°. The azimuth dimension is defined by the LOC half sector width ±β, which is the case of a 4000 m runway with 300 m setback is ±1.42°.
Hover the drone 100 m above the runway centerline at the threshold, then fly the drone at that height above the extended runway X-Y plane out in range to sweep through the GP angles of interest. Several "cuts" in elevation could be made by flying the drone outbound at one height and then raising the height to a different level for the return flight;

REFERENCES

1. ICAO Doc 8071, Manual on Testing of Radio Navigation Aids Volume I—Testing of Ground-based Radio Navigation Systems, Fifth Edition 2018

Example embodiments of inventive concepts described above are also provided below:

Embodiment 1. A portable instrument landing system (PILS) comprising:
a plurality of antenna radio units, each antenna radio unit configured to generate a radio frequency (RF) signal for transmission by an antenna element directly coupled to the antenna radio unit;
a glideslope comprising a glideslope non-imaging antenna array of antenna elements, each antenna element of the glideslope non-imaging antenna array being directly coupled to a respective antenna radio unit of the plurality of antenna radio units, the glideslope configured to communicate, to the respective antenna radio units directly coupled to each antenna element of the glideslope non-imaging antenna array, transmission parameters for RF signals to be generated by the respective antenna radio units directly coupled to each antenna element of the glideslope non-imaging antenna array;
a localizer comprising a localizer antenna array of antenna elements, each antenna element of the localizer antenna array being directly coupled to a respective antenna radio unit of the plurality of antenna radio units, the localizer configured to communicate, to the respective antenna radio units directly coupled to each antenna element of the localizer antenna array, transmission parameters for RF signals to be generated by the respective antenna radio units directly coupled to each antenna element of the glideslope non-imaging antenna array; and
a control system configured to communicate, to one of the localizer and the glideslope, data to be used by one of the localizer and the glideslope to generate the transmission parameters for RF signals to be generated by the plurality of antenna radio units.

Embodiment 2. The PILS of embodiment 1, wherein the transmission parameters comprise one or more of a power, modulation indexes, and phase of an RF signal for transmission by an antenna element.

Embodiment 3. The PILS of embodiment 1, wherein the glideslope non-imaging antenna array is configured to be arranged in parallel to an aircraft runway;
- wherein the localizer antenna array is configured to one collapse and expand; and
- wherein the plurality of antenna radio units, glideslope, glideslope non-imagining antenna array, localizer, localizer antenna array, and control system are configured to be transported on a cargo pallet prior to deployment.

Embodiment 4. An antenna radio unit of a portable instrument landing system (PILS), comprising:
- transmission circuitry configured to:
  - receive a communication comprising transmission parameters for a radio frequency (RF) signal to be transmitted using an antenna element directly coupled to the antenna radio unit;
  - generate the RF signal using the transmission parameters; and
  - transmit the RF signal using the antenna element directly coupled to the antenna radio unit.

Embodiment 5. The antenna radio unit of embodiment 4, wherein the transmission circuitry is further configured to receive the communication comprising the transmission parameters from one of a localizer and a glideslope of the PILS.

Embodiment 6. The antenna radio unit of embodiment 4, further comprising:
- reception circuitry configured to:
  - receive the RF signal transmitted by the antenna element;
  - generate measurement data based on the received RF signal; and
  - communicate the measurement data to one of a localizer and a glideslope of the PILS.

Embodiment 7. A method, performed by an antenna radio unit of a portable instrument landing system (PILS), the method comprising:
- receiving a communication comprising transmission parameters for a radio frequency (RF) signal to be transmitted using an antenna element directly coupled to the antenna radio unit;
- generating the radio frequency RF signal using the transmission parameters; and
- transmitting the RF signal using the antenna element directly coupled to the antenna radio unit.

Embodiment 8. The method of embodiment 7, wherein receiving the communication comprising the transmission parameters comprises receiving the transmission parameters from one of a localizer and a glideslope of the PILS.

Embodiment 9. The method of embodiment 7, further comprising:
- receiving the RF signal transmitted by the antenna element;
- generating measurement data based on the received RF signal; and
- communicating the measurement data to one of a localizer and a glideslope of the PILS.

Embodiment 10. A glideslope of a portable instrument landing system (PILS) comprising:
- a non-imaging antenna array, each antenna element of the non-imaging antenna array directly coupled to a respective antenna radio unit of a plurality of antenna radio units of the PILS;
- processing circuitry in communication with each respective antenna radio unit directly coupled to a respective antenna element of the non-imaging antenna array, the processing circuitry configured to:
  - receive, from a control system of the PILS, data to be used to generate transmission parameters for radio frequency (RF) signals to be generated by the plurality of antenna radio units;
  - generate transmission parameters for radio frequency (RF) signals to be transmitted by the antenna elements of the non-imaging antenna array based on the received data;
  - communicate the transmission parameters to the antenna radio units to generate the RF signals for transmission from the antenna elements of the non-imaging antenna array.

Embodiment 11. The glideslope of embodiment 10, wherein the non-imaging antenna array is configured to be arranged in parallel to an aircraft runway.

Embodiment 12. A method, performed by a glideslope of a portable instrument landing system (PILS), the glideslope comprising a non-imaging antenna array, each antenna element of the non-imaging antenna array directly coupled to a respective antenna radio unit of a plurality of antenna radio units of the PILS, the method comprising:
- receiving, from a control system of the PILS, data to be used to generate transmission parameters for radio frequency (RF) signals to be generated by each respective radio unit of the PILS;
- generating transmission parameters for radio frequency (RF) signals to be transmitted by the antenna elements of the non-imaging antenna array based on the received data;
- communicating the transmission parameters to the respective antenna radio units to generate the RF signals for transmission from the antenna elements of the non-imaging antenna array.

Embodiment 13. A localizer of a portable instrument landing system (PILS) comprising:
- an antenna array, each antenna element of the antenna array directly coupled to a respective antenna radio unit of a plurality of antenna radio units of the PILS;
- processing circuitry in communication with each respective antenna radio unit directly coupled to a respective antenna element of the antenna array configured to:
  - receive, from a control system of the PILS, data to be used to generate transmission parameters for radio frequency (RF) signals to be generated by each respective radio unit of the PILS;
  - generate transmission parameters for radio frequency (RF) signals to be transmitted by the antenna elements of the antenna array based on the received data;
  - communicate the transmission parameters to the respective antenna radio units to generate the RF signals for transmission from the antenna elements of the antenna array.

Embodiment 14. The localizer of embodiment 13, wherein the antenna array is configured to one collapse and expand.

Embodiment 15. A method, performed by a localizer of a portable instrument landing system (PILS), the localizer comprising an antenna array, each antenna element of the antenna array directly coupled to a respective antenna radio unit of a plurality of antenna radio units of the PILS, the method comprising:

receiving, from a control system of the PILS, data to be used to generate transmission parameters for radio frequency (RF) signals to be generated by a plurality of antenna radio units of the PILS;

generating transmission parameters for radio frequency (RF) signals to be transmitted by the antenna elements of the antenna array based on the received data;

communicating the transmission parameters to the respective antenna radio units to generate the RF signals for transmission from the antenna elements of the non-imaging antenna array.

Embodiment 16. A control system of a portable instrument landing system (PILS) comprising:

a transceiver configured to communicate with an unmanned aircraft system (UAS);

a processor;

a memory comprising executable instructions that when executed by the processor causes the processor to operate to:

receive, from the UAS using the transceiver, measurement data associated with first radio frequency (RF) signals transmitted by one of a localizer and a glideslope of the PILS;

generate data to be used by one of the localizer and the glideslope to generate transmission parameters to be used by antenna radio units of the PILS directly coupled to the respective antenna elements of one of a localizer antenna array and a glideslope non-imaging antenna array to generate second RF signals to be transmitted by the antenna elements of the one of the localizer antenna array and the glideslope non-imaging antenna array; and communicate, to one of the localizer and the glideslope, the data to be used by one of the localizer and the glideslope to generate the transmission parameters.

Embodiment 17. The control system of embodiment 16, wherein the memory comprises executable instructions that when executed by the processor causes the processor to further operate to:

communicate, to the UAS using the transceiver, an instruction to fly to specific locations relative to an aircraft runway co-located with the PILS and obtain measurement data associated with the second RF signals transmitted by one of the localizer and the glideslope;

receive, from the UAS using the transceiver, the obtained measurement data responsive to communicating the instruction; and determine whether parameters of the second RF signals are within a range of values based on the obtained measurement data.

Embodiment 18. The control system of embodiment 17, wherein the memory comprises executable instructions that when executed by the processor causes the processor to further operate to:

determine the parameters of the second RF signals are not within a range of values based on the obtained measurement data;

generate maintenance data to be used by one of the localizer and the glideslope to generate maintenance transmission parameters to be used by the antenna radio units directly coupled to the respective antenna elements of the one of the localizer antenna array and the glideslope non-imaging antenna array to generate third RF signals to be transmitted by the antenna elements of the one of the localizer antenna array and the glideslope non-imaging antenna array; and communicate, to one of the localizer and the glideslope, the maintenance data to be used by one of the localizer and the glideslope to generate the maintenance transmission parameters.

Embodiment 19. A method, performed by a control system of a portable instrument landing system (PILS), the method comprising:

receiving, from an unmanned aircraft system (UAS) using a transceiver of the control system, measurement data associated with first radio frequency (RF) signals transmitted by one of a localizer and a glideslope of the PILS;

generating data to be used by one of the localizer and the glideslope to generate transmission parameters to be used by antenna radio units of the PILS directly coupled to the respective antenna elements of one of a localizer antenna array and a glideslope non-imaging antenna array to generate second RF signals to be transmitted by the antenna elements of the one of the localizer antenna array and the glideslope non-imaging antenna array; and communicating, to one of the localizer and the glideslope, the data to be used by one of the localizer and the glideslope to generate the transmission parameters.

Embodiment 20. The method of embodiment 19, further comprising:

communicating, to the UAS using the transceiver, an instruction to fly to a specific location relative to an aircraft runway co-located with the PILS and obtain measurement data associated with the second RF signals transmitted by one of the localizer and the glideslope;

receiving, from the UAS using the transceiver, the obtained measurement data responsive to communicating the instruction; and determining whether parameters of the second RF signals are within a range of values based on the obtained measurement data.

Embodiment 21. The method of embodiment 20, wherein determining whether parameters of the second RF signals are within a range of values based on the obtained measurement data comprises:

determining the parameters of the second RF signals are not within a range of values based on the obtained measurement data;

responsive to determining the parameters of the second RF signals are not within the range of values, generating maintenance data to be used by one of the localizer and the glideslope to generate maintenance transmission parameters to be used by the antenna radio units directly coupled to the respective antenna elements of the one of the localizer antenna array and the glideslope non-imaging antenna array to generate third RF signals to be transmitted by the antenna elements of the one of the localizer antenna array and the glideslope non-imaging antenna array; and communicating, to one of the localizer and the glideslope, the maintenance data to be used by one of the localizer and the glideslope to generate the maintenance transmission parameters.

Embodiment 22. The method of embodiment 19, further comprising:

receiving, from a measurement device in communication with the control system, information identifying a range between the UAS and the measurement device; and determining a location of the UAS in an airspace proximate to an aircraft runway co-located with the PILS based on the information identifying the range between the UAS and the measurement device.

Embodiment 23. The method of embodiment 22, wherein the measurement device comprises one of a radar measurement system, a laser tracking measurement system, and a transponder measurement system in communication with the measurement device.

Embodiment 24. The method of embodiment 19, further comprising:

receiving, from a measurement device in communication with the control system, information identifying a range between the UAS and the measurement device;

determining a location of the UAS in an airspace proximate to an aircraft runway co-located with the PILS based on the information identifying the range between the UAS and the measurement device;

determining the UAS needs to travel to a different location in the airspace proximate to the aircraft runway co-located with the PILS to obtain the measurement data associated with first radio frequency (RF) signals transmitted by one of the localizer and the glideslope of the PILS based the determined location of the UAS;

communicating, to the UAS, an instruction to travel the different location in the airspace proximate to the aircraft runway co-located with the PILS and obtain the measurement data at the different location.

Embodiment 25. The method of embodiment 24, wherein determining the location of the UAS in the airspace comprises determining the location of the UAS in a GPS-denied airspace proximate to the aircraft runway co-located with the PILS based on the information identifying the range between the UAS and the measurement device.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

Although the foregoing subject matter has been described in some detail by way of illustration and example for purposes of clarity of understanding, it will be understood by those skilled in the art that certain changes and modifications can be practiced within the scope of the appended claims.

We claim:

1. A method, performed by a control system in communication with one of an aircraft navigational aid system and an aircraft surveillance system, the method comprising:

obtaining measurement data associated with radio frequency (RF) signals transmitted by the one of the aircraft navigational aid system and the aircraft surveillance system from an unmanned aerial vehicle (UAV) reporting the measurement data;

determining whether the measurement data indicates the RF signals are within a range of values based on a location of the UAV in an airspace proximate to the one of the aircraft navigational aid system and the aircraft surveillance system;

determining a modification of a transmission parameter associated with the RF signals, transmitted by the one of the aircraft navigational aid system and the aircraft surveillance system, to adjust the RF signals to be within the range of values when the RF signals have been determined to not be within the range of values; and controlling the RF signals transmitted by the one of the aircraft navigational aid system and the aircraft surveillance system by communicating, to the one of the aircraft navigational aid system and the aircraft surveillance system, an instruction to modify the transmission parameter associated with the RF signals based on the determined modification.

2. The method of claim 1, wherein the aircraft navigational aid system comprises at least one of a localizer system, a glidepath system, a Very-High-Frequency Omni-Range (VOR) system, a Tactical Air Navigation (TACAN) system, and a Distance Measuring Equipment (DME) system; and
  wherein the aircraft surveillance system comprises a Radar surveillance system.

3. The method of claim 1, further comprising:
communicating, to the UAV, an instruction to fly to a desired location within the airspace; and
determining whether an actual location of the UAV is within a predetermined threshold of the desired location within the airspace.

4. The method of claim 3, further comprising:
responsive to determining the actual location of the UAV is within the predetermined threshold, communicating, to the UAV, an instruction to report the measurement data from UAV measurement of the RF signals transmitted by the one of the aircraft navigational aid system and the aircraft surveillance system; and
wherein obtaining the measurement data comprises receiving, from the UAV, the measurement data reported by the UAV from measurement of the RF signals responsive to communicating the instruction to report the measurement data.

5. The method of claim 3, further comprising:
communicating, to the UAV, a second instruction to adjust an actual position of the UAV to be within the predetermined threshold in response to determining the actual location of the UAV is not within the predetermined threshold of the desired location within the airspace;
responsive to communicating the second instruction, determining the adjusted actual location of the UAV is located within the predetermined threshold; and
responsive to determining the adjusted actual location of the UAV is located within the predetermined threshold, communicating, to the UAV, an instruction to report measurement data from UAV measurement of the RF signals transmitted by the one of the aircraft navigational aid system and the aircraft surveillance system; and
wherein obtaining the measurement data comprises receiving, from the UAV, the measurement data reported by the UAV from measurement of the RF signals responsive to communicating the instruction to report the measurement data.

6. The method of claim 3, wherein determining whether the actual location of the UAV is within a predetermined threshold of the desired location within the airspace comprises:
obtaining location information identifying the actual location of the UAV within the airspace from at least one of a measurement device of the control system and the UAV; and
determining whether the actual location of the UAV is within the predetermined threshold of the desired location within the airspace based on the location information.

7. The method of claim 6, wherein the airspace proximate to the one of the aircraft navigational aid system and the aircraft surveillance system is a Global Navigation Satellite System (GNSS)-denied airspace; and
wherein the obtaining the location information comprises obtaining the location information identifying the actual location of the UAV within the GNSS-denied airspace from the measurement device of the control system.

8. The method of claim 3, wherein the instruction to fly to the desired location within the airspace further comprises an instruction for the UAV to hover at the desired location within the airspace.

9. The method of claim 4, wherein the instruction to report measurement data from UAV measurement of the RF signals transmitted by the one of the aircraft navigational aid system and the aircraft surveillance system comprises an instruction to report measurement of the RF signals while hovering at the desired location within the airspace.

10. The method of claim 1, the method further comprising:
communicating, to the UAV, an instruction to report updated measurement of modified RF signals transmitted by the one of the aircraft navigational aid system and the aircraft surveillance system;
receiving, from the UAV, updated measurement data associated with modified RF signals transmitted by the one of the aircraft navigational aid system and the aircraft surveillance system; and
determining whether the updated measurement data indicates the modified RF signals are within the range of values.

11. The method of claim 10, the method further comprising:
responsive to determining the updated measurement data indicates the modified RF signals are within the range of values, communicating, to the UAV, an instruction to fly the UAV to a second desired location within the airspace to measure the RF signals transmitted by the one of the aircraft navigational aid system and the aircraft surveillance system.

12. The method of claim 10, the method further comprising:
responsive to determining the updated measurement data indicates the modified RF signals are within the range of values, communicating, to the UAV, an instruction to land the UAV.

13. The method of claim 1, wherein determining modification of the transmission parameter associated with the RF signals comprises determining modification of a transmission parameter of an antenna element of an antenna array of the one of the aircraft navigational aid system and the aircraft surveillance system is required; and
wherein communicating the instruction to modify the transmission parameter comprises communicating, to the one of the aircraft navigational aid system and the aircraft surveillance system, an instruction to modify the transmission parameter of the antenna element and an identification of the antenna element of the antenna array.

14. The method of claim 13, the method further comprising:
communicating, to the one of the aircraft navigational aid system and the aircraft surveillance system, an instruction to transmit a modified RF signal based on the modified transmission parameter;
communicating, to the UAV, an instruction to report updated measurement data from measurement of the modified RF signal;
receiving, from the UAV, the updated measurement data associated with the modified RF signal transmitted; and
determining whether the updated measurement data indicates the modified RF signal transmitted is within the range of values.

15. The method of claim 13, the method further comprising:

communicating, to the one of the aircraft navigational aid system and the aircraft surveillance system, an instruction to transmit a modified RF signal based on the modified transmission parameter through only the antenna element of the antenna array;

communicating, to the UAV, an instruction to report updated measurement data from measurement of the modified RF signal;

receiving, from the UAV, the updated measurement data associated with the modified RF signal transmitted only from the antenna element of the antenna array; and determining whether the updated measurement data indicates the modified RF signal transmitted only from the antenna element of the antenna array is within the range of values.

16. The method of claim 15, wherein determining whether the updated measurement data indicates the modified RF signal transmitted only from the antenna element of the antenna array is within the second range of values comprises determining the additional measurement data is within the range of values; the method further comprising:

responsive to determining the additional measurement data is within the range of values, communicating, to the one of the aircraft navigational aid system and the aircraft surveillance system, an instruction to reactivate all antenna elements of the antenna array.

17. The method of claim 15, wherein the instruction to transmit the modified RF signal further comprises an instruction to cease transmission from all other antenna elements of the antenna array.

18. The method of claim 1, the method further comprising:

communicating, to the UAV, an instruction to report second measurement data measurement of RF signals transmitted by the one of the aircraft navigational aid system and the aircraft surveillance system at a second location within the airspace;

obtaining, from the UAV, the second measurement data associated with RF signals transmitted by the one of the aircraft navigational aid system and the aircraft surveillance system;

determining whether the second measurement data indicates the RF signals are within a second range of values based on the second location of the UAV within the airspace; and controlling the RF signals transmitted by the one of the aircraft navigational aid system and the aircraft surveillance system based on the second measurement data and the second location of the UAV within the airspace.

19. A control system in communication with one of an aircraft navigational aid system and an aircraft surveillance system, the control system comprising:

a processor; and a memory comprising executable instructions that when executed by the processor cause the processor to perform operations comprising:

obtaining measurement data associated with radio frequency (RF) signals transmitted by the one of the aircraft navigational aid system and the aircraft surveillance system from an unmanned aerial vehicle (UAV) reporting the measurement data;

determining whether the measurement data indicates the RF signals are within a range of values based on a location of the UAV in an airspace proximate to the one of the aircraft navigational aid system and the aircraft surveillance system;

determining a modification of a transmission parameter associated with the RF signals, transmitted by the one of the aircraft navigational aid system and the aircraft surveillance system, to adjust the RF signals to be within the range of values when the RF signals have been determined to not be within the range of values; and controlling the RF signals transmitted by the one of the aircraft navigational aid system and the aircraft surveillance system by communicating, to the one of the aircraft navigational aid system and the aircraft surveillance system, an instruction to modify the transmission parameter associated with the RF signals based on the determined modification.

20. The control system of claim 19, wherein the aircraft navigational aid system comprises at least one of a localizer system, a glidepath system, a Very-High-Frequency Omni-Range (VOR) system, a Tactical Air Navigation (TACAN) system, and a Distance Measuring Equipment (DME) system; and wherein the aircraft surveillance system comprises a Radar surveillance system.

21. The control system of claim 19, wherein the memory further comprises instructions that when executed by the processor cause the processor to perform further operations comprising:

communicating, to the UAV, an instruction to fly to a desired location within the airspace; and determining whether an actual location of the UAV is within a predetermined threshold of the desired location within the airspace.

22. The control system of claim 21, wherein the memory further comprises instructions that when executed by the processor cause the processor to perform further operations comprising:

responsive to determining the actual location of the UAV is within the predetermined threshold, communicating, to the UAV, an instruction to report the measurement data from UAV measurement of the RF signals transmitted by the one of the aircraft navigational aid system and the aircraft surveillance system; and receiving, from the UAV, the measurement data reported by the UAV from measurement of the RF signals responsive to communicating the instruction to report the measurement data.

23. The control system of claim 21, wherein the memory further comprises instructions that when executed by the processor cause the processor to perform further operations comprising:

communicating, to the UAV, a second instruction to adjust an actual position of the UAV to be within the predetermined threshold in response to determining the actual location of the UAV is not within the predetermined threshold of the desired location within the airspace;

responsive to communicating the second instruction, determining the adjusted actual location of the UAV is located within the predetermined threshold; and responsive to determining the adjusted actual location of the UAV is located within the predetermined threshold, communicating, to the UAV, an instruction to report measurement data from UAV measurement of the RF signals transmitted by the one of the aircraft navigational aid system and the aircraft surveillance system; and wherein obtaining the measurement data comprises receiving, from the UAV, the measurement data reported by the UAV from measurement of the RF signals responsive to communicating the instruction to report the measurement data.

24. The control system of claim 21, wherein the memory further comprises instructions that when executed by the processor cause the processor to perform further operations comprising:
obtaining location information identifying the actual location of the UAV within the airspace from at least one of a measurement device of the control system and the UAV; and
determining whether the actual location of the UAV is within the predetermined threshold of the desired location within the airspace based on the location information.

25. The control system of claim 24, wherein the airspace proximate to the one of the aircraft navigational aid system and the aircraft surveillance system is a Global Navigation Satellite System (GNSS)-denied airspace; and
wherein the memory further comprises instructions that when executed by the processor cause the processor to perform further operations comprising obtaining the location information identifying the actual location of the UAV within the GNSS-denied airspace from the measurement device of the control system.

26. The control system of claim 21, wherein the instruction to fly to the desired location within the airspace further comprises an instruction for the UAV to hover at the desired location within the airspace.

27. The control system of claim 22, wherein the instruction to report measurement data from UAV measurement of the RF signals transmitted by the one of the aircraft navigational aid system and the aircraft surveillance system comprises an instruction to report measurement of the RF signals while hovering at the desired location within the airspace.

28. The control system of claim 19, wherein the memory further comprises instructions that when executed by the processor cause the processor to perform further operations comprising:
communicating, to the UAV, an instruction to report updated measurement of modified RF signals transmitted by the one of the aircraft navigational aid system and the aircraft surveillance system;
receiving, from the UAV, updated measurement data associated with modified RF signals transmitted by the one of the aircraft navigational aid system and the aircraft surveillance system; and
determining whether the updated measurement data indicates the modified RF signals are within the range of values.

29. The control system of claim 28, wherein the memory further comprises instructions that when executed by the processor cause the processor to perform further operations comprising:
responsive to determining the updated measurement data indicates the modified RF signals are within the range of values, communicating, to the UAV, an instruction to fly the UAV to a second desired location within the airspace to measure the RF signals transmitted by the one of the aircraft navigational aid system and the aircraft surveillance system.

30. The control system of claim 29, wherein the memory further comprises instructions that when executed by the processor cause the processor to perform further operations comprising:
responsive to determining the updated measurement data indicates the modified RF signals are within the range of values, communicating, to the UAV, an instruction to land the UAV.

31. The control system of claim 28, wherein the memory further comprises instructions that when executed by the processor cause the processor to perform further operations comprising:
determining modification of a transmission parameter of an antenna element of an antenna array of the one of the aircraft navigational aid system and the aircraft surveillance system is required; and
communicating, to the one of the aircraft navigational aid system and the aircraft surveillance system, an instruction to modify the transmission parameter of the antenna element and an identification of the antenna element of the antenna array.

32. The control system of claim 31, wherein the memory further comprises instructions that when executed by the processor cause the processor to perform further operations comprising:
communicating, to the one of the aircraft navigational aid system and the aircraft surveillance system, an instruction to transmit a modified RF signal based on the modified transmission parameter;
communicating, to the UAV, an instruction to report updated measurement data from measurement of the modified RF signal;
receiving, from the UAV, the updated measurement data associated with the modified RF signal transmitted; and
determining whether the updated measurement data indicates the modified RF signal transmitted is within the range of values.

33. The control system of claim 32, wherein the memory further comprises instructions that when executed by the processor cause the processor to perform further operations comprising:
communicating, to the one of the aircraft navigational aid system and the aircraft surveillance system, an instruction to transmit a modified RF signal based on the modified transmission parameter through only the antenna element of the antenna array;
communicating, to the UAV, an instruction to report updated measurement data from measurement of the modified RF signal;
receiving, from the UAV, the updated measurement data associated with the modified RF signal transmitted only from the antenna element of the antenna array; and
determining whether the updated measurement data indicates the modified RF signal transmitted only from the antenna element of the antenna array is within the range of values.

34. The control system of claim 33, wherein the memory further comprises instructions that when executed by the processor cause the processor to perform further operations comprising:
determining the additional measurement data is within the range of values; and
responsive to determining the additional measurement data is within the range of values, communicating, to the one of the wherein the memory further comprises instructions that when executed by the processor cause the processor to perform further operations comprising, an instruction to reactivate all antenna elements of the antenna array.

35. The control system of claim 32, wherein the instruction to transmit the modified RF signal further comprises an instruction to cease transmission from all other antenna elements of the antenna array.

36. The control system of claim 19, wherein the memory further comprises instructions that when executed by the processor cause the processor to perform further operations comprising:
    communicating, to the UAV, an instruction to report second measurement data measurement of RF signals transmitted by the one of the aircraft navigational aid system and the aircraft surveillance system at a second location within the airspace;
    obtaining, from the UAV, the second measurement data associated with RF signals transmitted by the one of the aircraft navigational aid system and the aircraft surveillance system;
    determining whether the second measurement data indicates the RF signals are within a second range of values based on the second location of the UAV within the airspace; and
    controlling the RF signals transmitted by the one of the aircraft navigational aid system and the aircraft surveillance system based on the second measurement data and the second location of the UAV within the airspace.

37. A computer program product comprised on a non-transitory computer readable medium, the computer program product includes executable instructions that when executed by a processor of a control system in communication with one of an aircraft navigational aid system and an aircraft surveillance system, causes the control system perform operations of the method of claim 1.

38. A control system in communication with one of an aircraft navigational aid system and an aircraft surveillance system, the control system adapted to perform the method of claim 1.

* * * * *